(12) United States Patent
Dawson et al.

(10) Patent No.: US 11,929,572 B2
(45) Date of Patent: Mar. 12, 2024

(54) CONNECTOR SYSTEM INCLUDING AN INTERLOCK SYSTEM

(71) Applicant: Eaton Intelligent Power Limited, Dublin (IE)

(72) Inventors: James Dawson, Carol Stream, IL (US); Jason Degen, Carol Stream, IL (US); Brantley Natter, Carol Stream, IL (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 17/640,967

(22) PCT Filed: Jul. 29, 2021

(86) PCT No.: PCT/US2021/043686
§ 371 (c)(1),
(2) Date: Mar. 7, 2022

(87) PCT Pub. No.: WO2022/026695
PCT Pub. Date: Feb. 3, 2022

(65) Prior Publication Data
US 2022/0271468 A1 Aug. 25, 2022

Related U.S. Application Data

(60) Provisional application No. 63/058,061, filed on Jul. 29, 2020.

(51) Int. Cl.
*H01R 13/44* (2006.01)
*B60R 16/03* (2006.01)
(Continued)

(52) U.S. Cl.
CPC ............. *H01R 13/44* (2013.01); *B60R 16/03* (2013.01); *H01R 13/052* (2013.01); *H01R 13/15* (2013.01);
(Continued)

(58) Field of Classification Search
CPC ...... H01R 13/44; H01R 13/15; H01R 13/428; H01R 2201/26; B60R 16/03
See application file for complete search history.

(56) References Cited

U.S. PATENT DOCUMENTS

| 4,201,438 A | 5/1980 | Shea |
| 4,416,504 A | 11/1983 | Sochor |

(Continued)

FOREIGN PATENT DOCUMENTS

| CN | 1722537 A | 1/2006 |
| CN | 102714369 A | 10/2012 |

(Continued)

OTHER PUBLICATIONS

USCAR-2, Rev. 6.
(Continued)

*Primary Examiner* — Thanh Tam T Le
(74) *Attorney, Agent, or Firm* — Meunier Carlin & Curfman LLC

(57) ABSTRACT

The connector system is configured for use in a power distribution system of a motor vehicle, and wherein the connector system includes a female housing, female terminal assembly, and a female interlock (FIL) assembly. The female housing having an arrangement of side walls that define a receptacle that is configured to receive the female terminal assembly. The female interlock (FIL) assembly positioned within the female terminal assembly that resides within the receptacle of the female housing to define a fully assembled female state $S_{FAF}$, whereby the FIL assembly is configured to be coupled to an interlock circuit that prevents electrical current from flowing through the female terminal assembly prior to connection of the female terminal assembly to a male terminal assembly.

34 Claims, 69 Drawing Sheets

(51) Int. Cl.
*H01R 13/05* (2006.01)
*H01R 13/15* (2006.01)
*H01R 13/187* (2006.01)
*H01R 13/42* (2006.01)
*H01R 13/428* (2006.01)
*H01R 13/631* (2006.01)
*H01R 13/641* (2006.01)

(52) U.S. Cl.
CPC .......... *H01R 13/187* (2013.01); *H01R 13/42* (2013.01); *H01R 13/428* (2013.01); *H01R 13/631* (2013.01); *H01R 13/641* (2013.01); *H01R 2201/26* (2013.01)

(56) References Cited

U.S. PATENT DOCUMENTS

| | | | |
|---|---|---|---|
| 4,534,610 A | | 8/1985 | Takihara |
| 4,540,235 A | | 9/1985 | Lolic |
| 4,583,812 A | | 4/1986 | Gross, Jr. |
| 4,593,464 A | * | 6/1986 | Williams ............... H01R 24/38 |
| | | | 228/136 |
| 4,632,483 A | | 12/1986 | Verin |
| 4,713,018 A | | 12/1987 | Sutton |
| 4,895,531 A | | 1/1990 | Guido |
| 4,902,244 A | | 2/1990 | Endo |
| 4,932,877 A | | 6/1990 | Zinn |
| 1,938,720 A | | 7/1990 | Romak |
| 4,975,066 A | | 12/1990 | Sucheski |
| 4,983,127 A | | 1/1991 | Kawai |
| 5,007,865 A | | 4/1991 | Jakobeit |
| 5,035,661 A | | 7/1991 | Steinhardt |
| 5,042,433 A | | 8/1991 | Monnier |
| 5,062,918 A | | 11/1991 | Zodrow |
| 5,094,636 A | | 3/1992 | Zinn |
| 5,102,752 A | | 4/1992 | Hope |
| 5,120,255 A | | 6/1992 | Kouda |
| 5,162,004 A | | 11/1992 | Kuzuno |
| 5,169,336 A | | 12/1992 | Taguchi |
| 5,188,545 A | | 2/1993 | Hass |
| 5,240,439 A | | 8/1993 | Egenolf |
| 5,273,766 A | | 12/1993 | Long |
| 5,288,252 A | | 2/1994 | Steinhardt |
| 5,295,873 A | | 3/1994 | Walbrecht |
| 5,334,058 A | | 8/1994 | Hotea |
| 5,338,229 A | | 8/1994 | Egenolf |
| 5,361,377 A | | 11/1994 | Miller |
| 5,362,262 A | | 11/1994 | Hotea |
| 5,391,097 A | | 2/1995 | Kerul |
| 5,415,571 A | | 5/1995 | Lutsch |
| 5,419,723 A | | 5/1995 | Gerard |
| 5,437,566 A | | 8/1995 | Zinn |
| 5,486,123 A | | 1/1996 | Miyazaki |
| 5,536,184 A | | 7/1996 | Wright |
| 5,551,897 A | | 9/1996 | Alwine |
| 5,562,506 A | | 10/1996 | Wright |
| 5,573,434 A | | 11/1996 | Ittah |
| 5,607,328 A | | 3/1997 | Joly |
| 5,624,283 A | | 4/1997 | Hotea |
| 5,664,972 A | | 9/1997 | Zinn |
| 5,716,245 A | | 2/1998 | Kameyama |
| 5,810,627 A | | 9/1998 | Gierut |
| 5,827,094 A | | 10/1998 | Aizawa |
| 5,863,225 A | | 1/1999 | Liebich |
| 5,868,590 A | | 2/1999 | Dobbelaere |
| 5,938,485 A | | 8/1999 | Hotea |
| 5,941,740 A | | 8/1999 | Neuer |
| 5,951,338 A | | 9/1999 | Seko |
| 5,954,548 A | | 9/1999 | Stabroth |
| 5,966,291 A | | 10/1999 | Hermann |
| 5,975,964 A | | 11/1999 | Seko |
| 5,980,336 A | | 11/1999 | Hall |
| 6,042,433 A | | 3/2000 | Chen |
| 6,062,918 A | | 5/2000 | Myer |
| 6,095,867 A | | 8/2000 | Brandt |
| 6,102,752 A | | 8/2000 | Bommel |
| 6,126,495 A | | 10/2000 | Lolic |
| 6,186,840 B1 | | 2/2001 | Geltsch |
| 6,257,931 B1 | | 7/2001 | Sakurai |
| 6,261,116 B1 | | 7/2001 | Ceru |
| 6,273,766 B1 | | 8/2001 | Zennamo, Jr. |
| 6,361,377 B1 | | 3/2002 | Saka |
| 6,371,813 B2 | | 4/2002 | Ramey |
| 6,382,999 B1 | * | 5/2002 | Mou ................... H01R 13/7032 |
| | | | 200/51.09 |
| 6,390,830 B1 | | 5/2002 | Onizuka |
| 6,394,858 B1 | | 5/2002 | Geltsch |
| 6,402,571 B1 | | 6/2002 | Muller |
| 6,475,040 B1 | | 11/2002 | Myer |
| 6,514,098 B2 | | 2/2003 | Marpoe, Jr. |
| 6,561,841 B2 | | 5/2003 | Norwood |
| 6,565,396 B2 | | 5/2003 | Saka |
| 6,679,736 B2 | | 1/2004 | Saka |
| 6,695,644 B2 | | 2/2004 | Zhao |
| 6,722,926 B2 | | 4/2004 | Chevassus-More |
| 6,761,577 B1 | | 7/2004 | Koehler |
| 6,814,625 B2 | | 11/2004 | Richmond |
| 6,824,170 B2 | | 11/2004 | Lee |
| 6,872,103 B1 | | 3/2005 | Flieger |
| 6,921,283 B2 | | 7/2005 | Zahlit |
| 6,994,600 B2 | | 2/2006 | Coulon |
| 7,014,515 B2 | | 3/2006 | Lutsch |
| 7,150,660 B2 | | 12/2006 | Allgood |
| 7,175,488 B2 | | 2/2007 | Pavlovic |
| 7,192,318 B2 | | 3/2007 | Hotea |
| 7,278,891 B2 | | 10/2007 | Cvasa |
| 7,300,319 B2 | | 11/2007 | Lutsch |
| 7,314,377 B2 | | 1/2008 | Northey |
| 7,329,132 B1 | | 2/2008 | Kamath |
| 7,329,158 B1 | | 2/2008 | Roberts et al. |
| 7,338,305 B2 | | 3/2008 | Norwood |
| 7,491,100 B2 | | 2/2009 | Johannes |
| 7,494,352 B2 | | 2/2009 | Furio |
| 7,497,723 B2 | | 3/2009 | Brassell |
| 7,503,776 B1 | | 3/2009 | Pavlovic |
| 7,520,773 B2 | | 4/2009 | Siebens |
| 7,563,133 B2 | | 7/2009 | Stein |
| 7,568,921 B2 | | 8/2009 | Pavlovic |
| 7,595,715 B2 | | 9/2009 | Pavlovic |
| 7,613,003 B2 | | 11/2009 | Pavlovic |
| 7,647,954 B2 | | 1/2010 | Garber |
| 7,651,344 B2 | * | 1/2010 | Wu ................... H01R 13/6585 |
| | | | 439/910 |
| 7,682,180 B2 | | 3/2010 | Brown |
| 7,713,096 B2 | | 5/2010 | Pavlovic |
| 7,758,369 B2 | | 7/2010 | Miller |
| 7,766,706 B2 | | 8/2010 | Kawamura |
| 7,780,489 B2 | | 8/2010 | Stuklek |
| 7,837,519 B2 | | 11/2010 | Copper |
| 7,874,851 B2 | | 1/2011 | Shimizu |
| 7,876,193 B2 | | 1/2011 | Pavlovic |
| 7,892,050 B2 | * | 2/2011 | Pavlovic ............... H01R 13/112 |
| | | | 439/857 |
| 7,927,127 B1 | | 4/2011 | Glick |
| 7,942,682 B2 | | 5/2011 | Copper |
| 7,942,683 B2 | | 5/2011 | Copper |
| 7,963,782 B2 | | 6/2011 | Hughes |
| 7,976,351 B2 | | 7/2011 | Boemmel |
| 7,988,505 B2 | | 8/2011 | Hotea |
| 8,111,052 B2 | | 2/2012 | Glovinsky |
| 8,128,426 B2 | | 3/2012 | Glick |
| 8,162,672 B2 | * | 4/2012 | Huang ................... H01R 13/11 |
| | | | 439/63 |
| 8,167,337 B2 | | 5/2012 | Bruno |
| 8,202,124 B1 | | 6/2012 | Natter |
| 8,206,175 B2 | | 6/2012 | Boyd |
| 8,235,292 B2 | | 8/2012 | Talboys |
| 8,242,874 B2 | | 8/2012 | Pavlovic |
| 8,277,243 B1 | | 10/2012 | Hernandez |
| 8,282,429 B2 | | 10/2012 | Glick |
| 8,366,497 B2 | | 2/2013 | Glick |
| 8,388,389 B2 | | 3/2013 | Costello |
| 8,422,230 B2 | | 4/2013 | Aiba |
| 8,430,689 B2 | | 4/2013 | Myer |

(56) References Cited

U.S. PATENT DOCUMENTS

| | | |
|---|---|---|
| 8,446,733 B2 | 5/2013 | Hampo |
| 8,449,338 B2 | 5/2013 | Gong |
| 8,475,220 B2 | 7/2013 | Glick |
| 8,651,892 B2 | 2/2014 | Arant |
| 8,662,935 B2 | 3/2014 | Jouas |
| 8,668,506 B2 | 3/2014 | Stack |
| 8,678,867 B2 | 3/2014 | Glick |
| 8,758,043 B2 | 6/2014 | Ohyama |
| 8,795,007 B2 | 8/2014 | Itou |
| 8,827,729 B2 * | 9/2014 | Gunreben ............ H01R 13/70 439/188 |
| 8,840,436 B2 | 9/2014 | Mott |
| 8,858,264 B2 | 10/2014 | Mott |
| 8,858,274 B2 | 10/2014 | Jakoplic |
| 8,941,731 B2 | 1/2015 | Barba |
| 8,944,844 B2 | 2/2015 | Myer |
| 8,956,190 B2 | 2/2015 | Natter |
| 8,968,021 B1 | 3/2015 | Kennedy |
| 8,974,244 B2 | 3/2015 | Aihara |
| 8,992,270 B2 * | 3/2015 | Glick ............... H01R 13/187 439/843 |
| 8,998,655 B2 | 4/2015 | Glick |
| 9,011,186 B2 | 4/2015 | Wirth |
| 9,048,552 B2 | 6/2015 | Eyles |
| 9,059,542 B2 | 6/2015 | Oh |
| 9,077,114 B2 | 7/2015 | Oh |
| 9,142,902 B2 | 9/2015 | Glick |
| 9,166,322 B2 | 10/2015 | Glick |
| 9,190,756 B2 | 11/2015 | Glick |
| 9,225,116 B2 | 12/2015 | McKibben |
| 9,236,682 B2 | 1/2016 | Glick |
| 9,257,804 B1 | 2/2016 | Beck |
| 9,293,852 B2 * | 3/2016 | Glick ................ H01R 13/18 |
| 9,300,069 B2 | 3/2016 | Morello |
| 9,353,894 B2 | 5/2016 | Richards |
| 9,356,394 B2 | 5/2016 | Kennedy |
| 9,368,904 B2 | 6/2016 | Natter |
| 9,379,470 B2 | 6/2016 | Glick |
| 9,431,740 B2 | 8/2016 | Glick |
| 9,437,974 B2 | 9/2016 | Glick |
| 9,444,168 B2 | 9/2016 | Horiuchi |
| 9,444,205 B2 * | 9/2016 | Rangi ............... H01R 24/86 |
| 9,455,516 B2 | 9/2016 | Gutenschwager |
| 9,502,783 B2 | 11/2016 | Martin |
| 9,525,254 B2 * | 12/2016 | Chen ............... H01R 27/02 |
| 9,537,241 B2 | 1/2017 | Rivera |
| 9,548,553 B2 | 1/2017 | Glick |
| 9,583,860 B1 | 2/2017 | Dewitte |
| 9,608,369 B1 | 3/2017 | Brandt |
| 9,620,869 B2 | 4/2017 | Listing |
| 9,653,859 B1 * | 5/2017 | Moore ............... H01R 13/41 |
| 9,680,256 B1 | 6/2017 | Lane |
| 9,705,229 B2 | 7/2017 | Yasukazu |
| 9,705,254 B2 | 7/2017 | Lampert |
| 9,711,885 B2 | 7/2017 | Hamai |
| 9,748,693 B1 | 8/2017 | Exenberger |
| 9,841,454 B2 | 12/2017 | Gelonese |
| 9,847,591 B2 | 12/2017 | Glick |
| 9,876,317 B2 | 1/2018 | Glick |
| 9,905,950 B2 | 2/2018 | Marsh |
| 9,905,953 B1 * | 2/2018 | Pavlovic ............ H01R 4/48 |
| 9,905,955 B2 | 2/2018 | Endo |
| 9,948,044 B2 | 4/2018 | Harris, III |
| 10,014,614 B2 | 7/2018 | Davies |
| 10,014,631 B1 | 7/2018 | Chambly |
| 10,038,278 B2 | 7/2018 | Lane |
| 10,044,140 B1 | 8/2018 | Gianrossi |
| 10,122,117 B2 | 11/2018 | Miller |
| 10,135,168 B2 | 11/2018 | Pavlovic |
| 10,178,754 B2 | 1/2019 | Kobayashi |
| 10,184,970 B2 | 1/2019 | Maalouf |
| 10,193,247 B1 * | 1/2019 | Glick ............... H01R 13/18 |
| 10,218,117 B1 | 2/2019 | Probert |
| 10,276,959 B2 | 4/2019 | Lehner |
| 10,283,889 B2 * | 5/2019 | Glick ............... H01R 13/11 |
| 10,355,414 B1 | 7/2019 | Alvarado |
| 10,396,482 B2 * | 8/2019 | Glick ............... H01R 13/08 |
| 10,594,058 B2 | 3/2020 | Kan |
| 10,693,252 B2 | 6/2020 | Pavlovic |
| 10,797,427 B2 * | 10/2020 | Dupont ............ H01R 13/6271 |
| 11,069,999 B2 * | 7/2021 | Fisher ............... H01R 13/08 |
| 11,223,150 B2 | 1/2022 | Pavlovic |
| 11,239,597 B2 | 2/2022 | Dawson |
| 11,296,462 B2 | 4/2022 | Schneider |
| 11,398,696 B2 | 7/2022 | Pavlovic |
| 11,411,336 B2 * | 8/2022 | Pavlovic ............ H04L 67/10 |
| 11,476,609 B2 | 10/2022 | Pavlovic |
| 2001/0019924 A1 | 9/2001 | Heimueller |
| 2001/0021602 A1 | 9/2001 | Zanten |
| 2002/0016964 A1 | 2/2002 | Aratani |
| 2002/0019156 A1 | 2/2002 | Fukamachi |
| 2002/0049005 A1 | 4/2002 | Leve |
| 2002/0081888 A1 | 6/2002 | Regnier |
| 2002/0180272 A1 | 12/2002 | Yuasa |
| 2004/0150224 A1 | 8/2004 | Lee |
| 2005/0134037 A1 | 6/2005 | Bruno |
| 2005/0211934 A1 | 9/2005 | Garber |
| 2006/0040555 A1 | 2/2006 | Chen |
| 2006/0172618 A1 | 8/2006 | Yamashita |
| 2007/0123093 A1 | 5/2007 | Lutsch |
| 2007/0149050 A1 | 6/2007 | Oka |
| 2009/0197457 A1 | 8/2009 | Lanni |
| 2010/0056106 A1 | 3/2010 | Korhonen |
| 2011/0130023 A1 | 6/2011 | Kataoka |
| 2011/0168778 A1 | 7/2011 | Talboys |
| 2011/0171843 A1 | 7/2011 | Casses et al. |
| 2012/0094551 A1 | 4/2012 | Corman |
| 2012/0129407 A1 | 5/2012 | Glick |
| 2012/0244756 A1 | 9/2012 | Jouas |
| 2013/0002102 A1 | 1/2013 | Chen |
| 2013/0004050 A1 | 1/2013 | Wu |
| 2013/0040505 A1 | 2/2013 | Hirakawa |
| 2013/0078874 A1 | 3/2013 | Tomoya |
| 2013/0109224 A1 | 5/2013 | Chin |
| 2013/0210292 A1 | 8/2013 | Schmidt |
| 2013/0215573 A1 | 8/2013 | Wagner |
| 2013/0337702 A1 | 12/2013 | Pavlovic |
| 2014/0087601 A1 | 3/2014 | Glick |
| 2014/0193995 A1 | 7/2014 | Barthelmes |
| 2014/0227915 A1 | 8/2014 | Glick |
| 2014/0244998 A1 | 8/2014 | Amenedo |
| 2015/0038000 A1 | 2/2015 | Glick |
| 2015/0072207 A1 | 3/2015 | Soleski |
| 2015/0074996 A1 | 3/2015 | Glick |
| 2015/0079859 A1 | 3/2015 | Glick |
| 2015/0162706 A1 | 6/2015 | Kennedy |
| 2015/0255912 A1 | 9/2015 | Natter |
| 2015/0255924 A1 | 9/2015 | Glick |
| 2015/0280381 A1 | 10/2015 | Rangi et al. |
| 2015/0365400 A1 | 12/2015 | Cox |
| 2016/0028169 A1 | 1/2016 | Glick |
| 2016/0043505 A1 | 2/2016 | Wu |
| 2016/0336572 A1 | 11/2016 | Yoshida |
| 2017/0019381 A1 | 1/2017 | Khazan |
| 2017/0134424 A1 | 5/2017 | Egorov |
| 2017/0294764 A1 | 10/2017 | Shimizu |
| 2017/0338600 A1 | 11/2017 | Tanaka |
| 2018/0090900 A1 | 3/2018 | Horiuchi |
| 2018/0191095 A1 | 7/2018 | Pavlovic |
| 2018/0219305 A1 | 8/2018 | Wavering |
| 2018/0269624 A1 | 9/2018 | Masaaki |
| 2018/0351282 A1 | 12/2018 | Duan |
| 2019/0052025 A1 | 2/2019 | Buechli |
| 2019/0089083 A1 | 3/2019 | Pavlovic |
| 2019/0372262 A1 | 12/2019 | Christiano |
| 2020/0395700 A1 | 12/2020 | Pavlovic |
| 2021/0167538 A1 | 6/2021 | Pavlovic |
| 2022/0131299 A1 | 4/2022 | Pavlovic |

FOREIGN PATENT DOCUMENTS

| | | |
|---|---|---|
| CN | 103022756 | 4/2013 |
| CN | 103141000 | 6/2013 |
| CN | 203193080 | 9/2013 |

(56) References Cited

FOREIGN PATENT DOCUMENTS

| | | |
|---|---|---|
| CN | 2015100485492 | 5/2015 |
| CN | 105225040 | 1/2016 |
| CN | 206098831 U | 4/2017 |
| CN | 206962160 | 2/2018 |
| CN | 107863610 | 3/2018 |
| CN | 111937250 | 11/2020 |
| DE | 4215162 A1 | 12/1992 |
| DE | 4139100 C1 | 1/1993 |
| DE | 19817924 | 10/1999 |
| DE | 102013211208 | 12/2014 |
| EP | 1291979 | 12/2004 |
| JP | H1040995 | 2/1998 |
| JP | H1050376 | 2/1998 |
| JP | H1050377 | 2/1998 |
| JP | 2011049107 | 3/2011 |
| JP | 2012043739 | 3/2012 |
| JP | 2016529675 A | 9/2016 |
| JP | 2017010755 | 1/2017 |
| JP | 6989715 | 1/2022 |
| KR | 20160138442 | 12/2016 |
| WO | 2017195092 | 11/2017 |
| WO | 2019164536 | 8/2019 |
| WO | 2019229587 | 12/2019 |
| WO | 2019236976 | 12/2019 |
| WO | 2019237009 | 12/2019 |
| WO | 2019237046 | 12/2019 |
| WO | WO 2020/150399 | 7/2020 |
| WO | WO 2021/050499 | 3/2021 |

OTHER PUBLICATIONS

USCAR-38, Rev. 1.
USCAR-37, Rev. 1.
USCAR-25, Rev. 3.
USCAR-21, Rev. 3.
USCAR-12, Rev. 5.
International Search Report from PCT/US2018/019787 dated Nov. 26, 2018 (3 pages).
Written Opinion from PCT/US2018/019787 dated Nov. 26, 2018 (10 pages).
International Search Report and Written Opinion issued in PCT/US2019/036070, dated Sep. 27, 2019, 8 pages.
International Search Report and Written Opinion issued in PCT/US2019/036010, dated Sep. 30, 2019, 13 pages.
International Search Report and written Opinion issued in PCT/US2019/036127, dated Oct. 4, 2019, 11 pages.
International Search Report and written Opinion issued in PCT/US2020/049870, dated Dec. 10, 2020, 20 pages.
International Search Report and written Opinion issued in PCT/US20/013757, dated Dec. 10, 2020, 7 pages.
International Search Report and Written Opinion issued in PCT/US20/14484, dated Mar. 31, 2020, 7 pages.
International Search Report and Written Opinion issued in PCT/US21/33446, dated Aug. 24, 2021, 17 pages.
International Search Report and Written Opinion issued in PCT/US21/43788, dated Dec. 23, 2021, 23 pages.
International Search Report and Written Opinion issued in PCT/US21/47180, dated Jan. 6, 2022, 18 pages.
Search Report & Written Opinion issued in Int'l Appl. No. PCT/US2021/043686 (2022).
Website entitled High Power Lock Box, available at: <https://web.archive.org/web/20200812181656/https://royalpowersolutions.com/products/battery-power-electronics/high-power-lock-box> (Royal Power Solutions) Aug. 12, 2020.

* cited by examiner

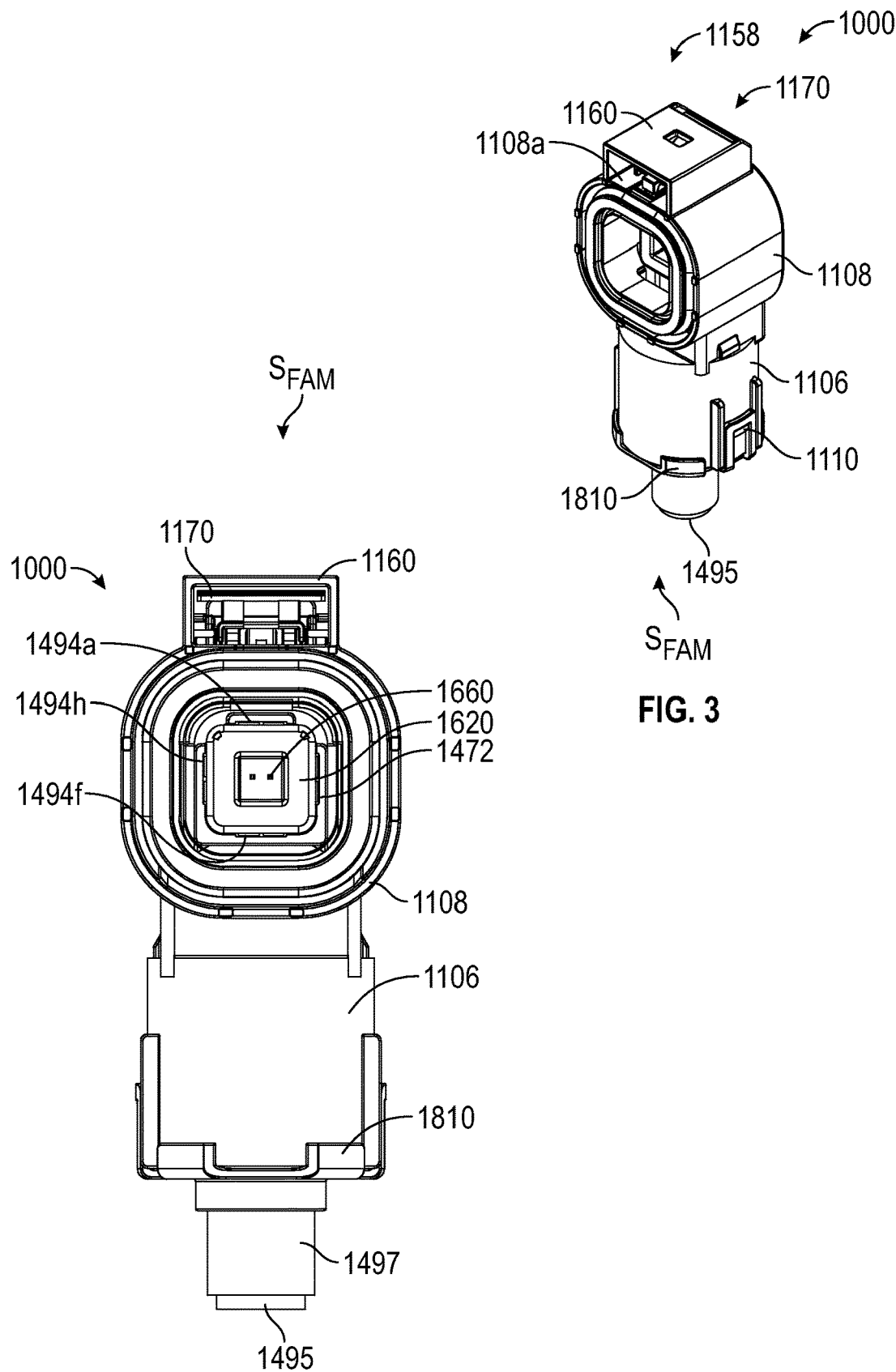

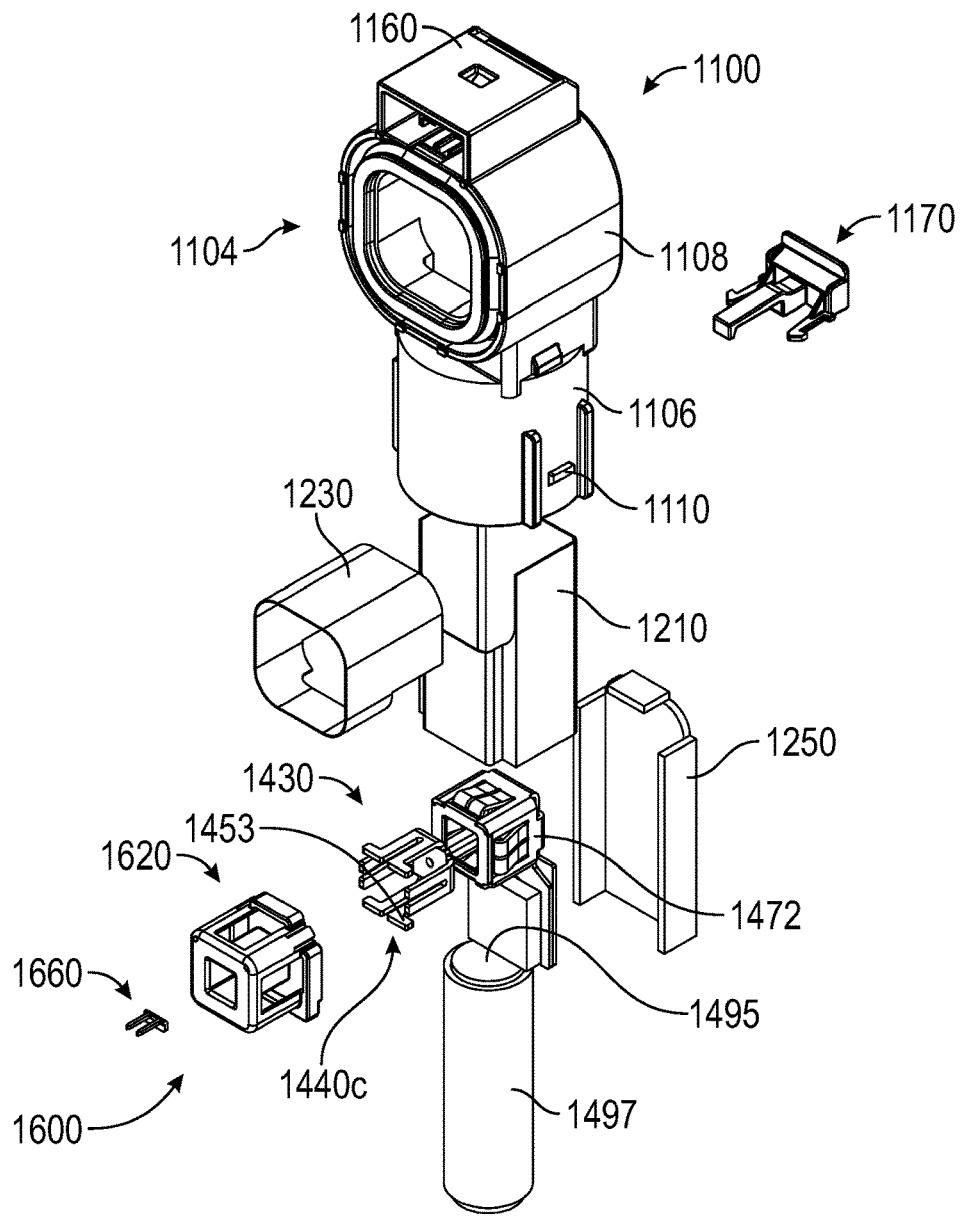
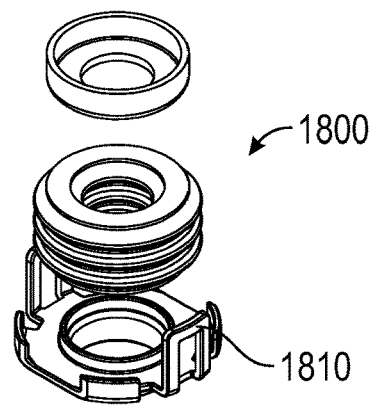
FIG. 5

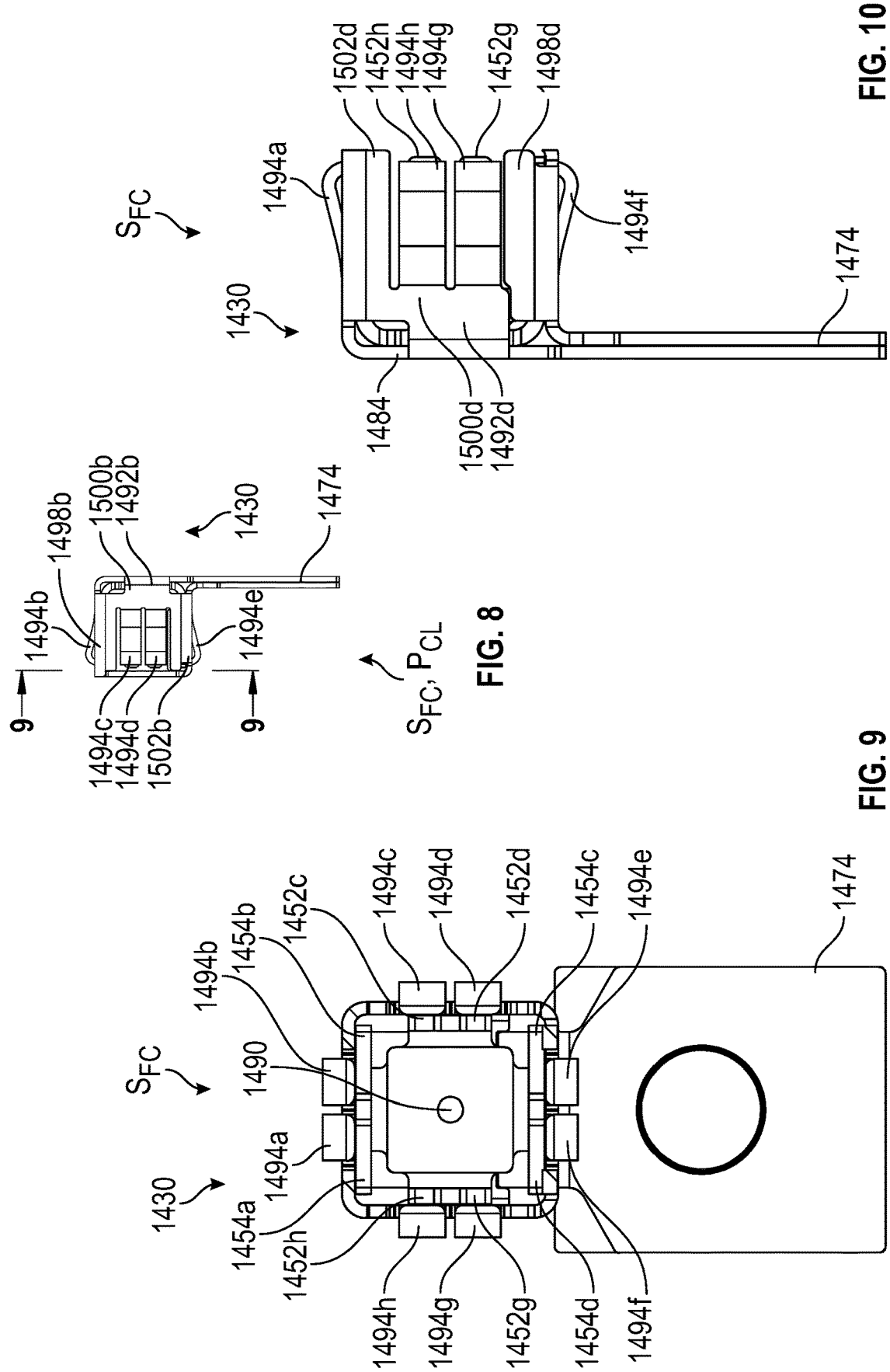

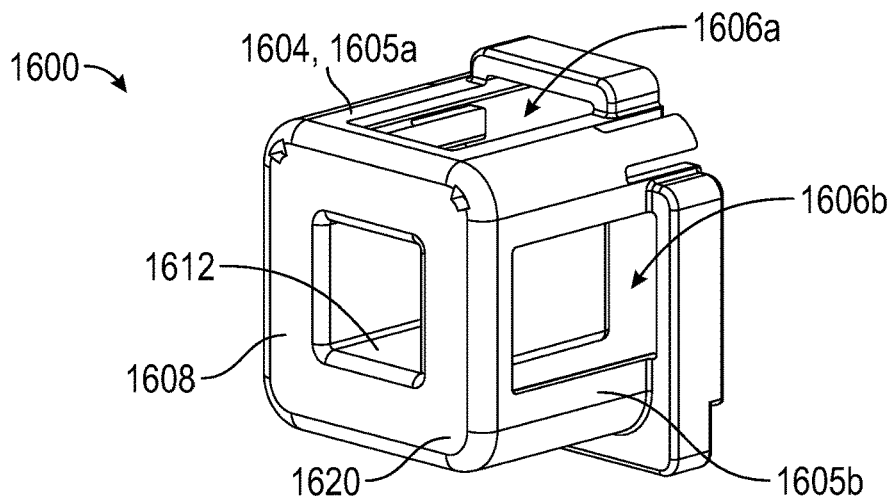
FIG. 16
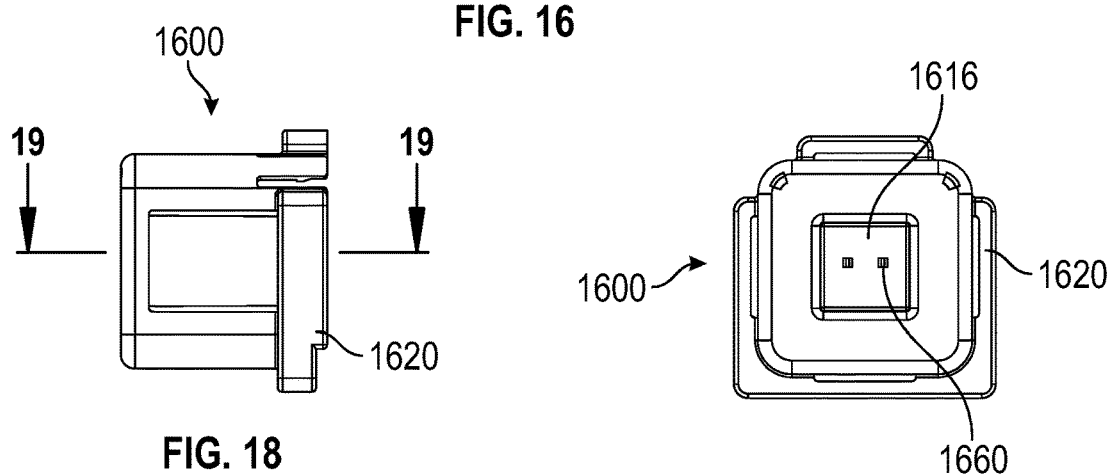
FIG. 18
FIG. 17
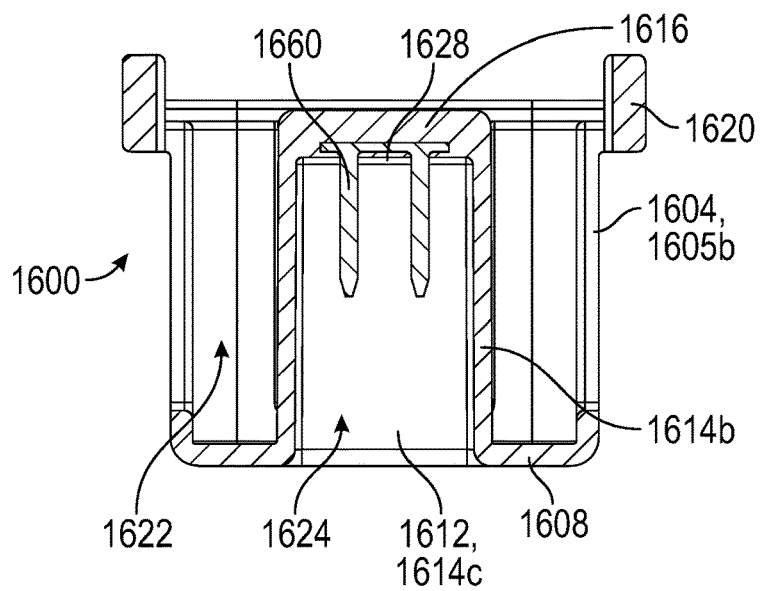
FIG. 19

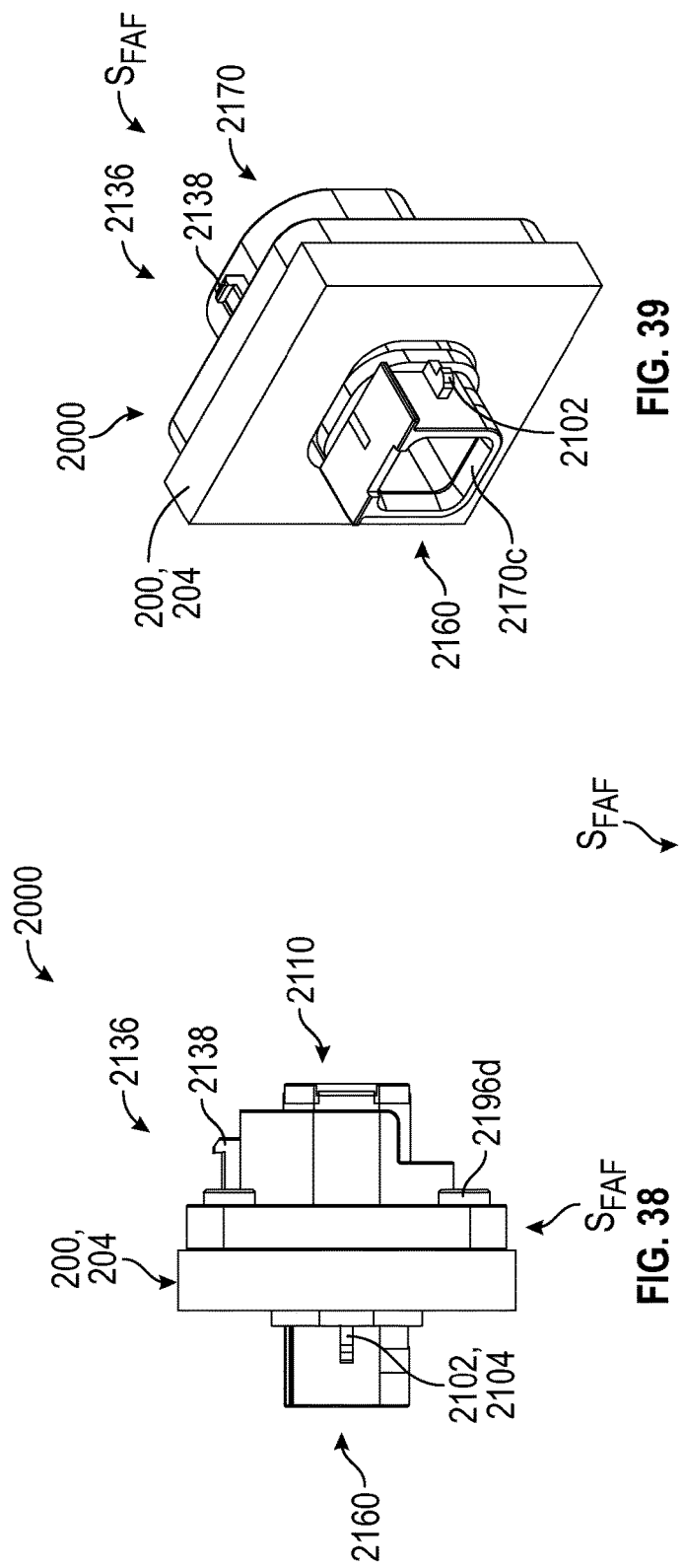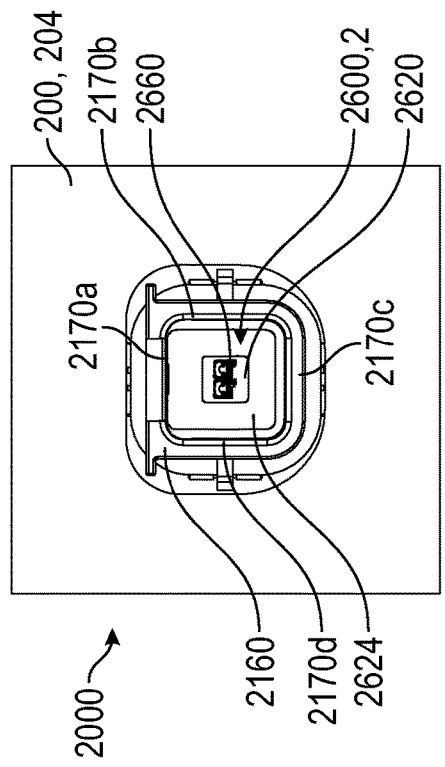

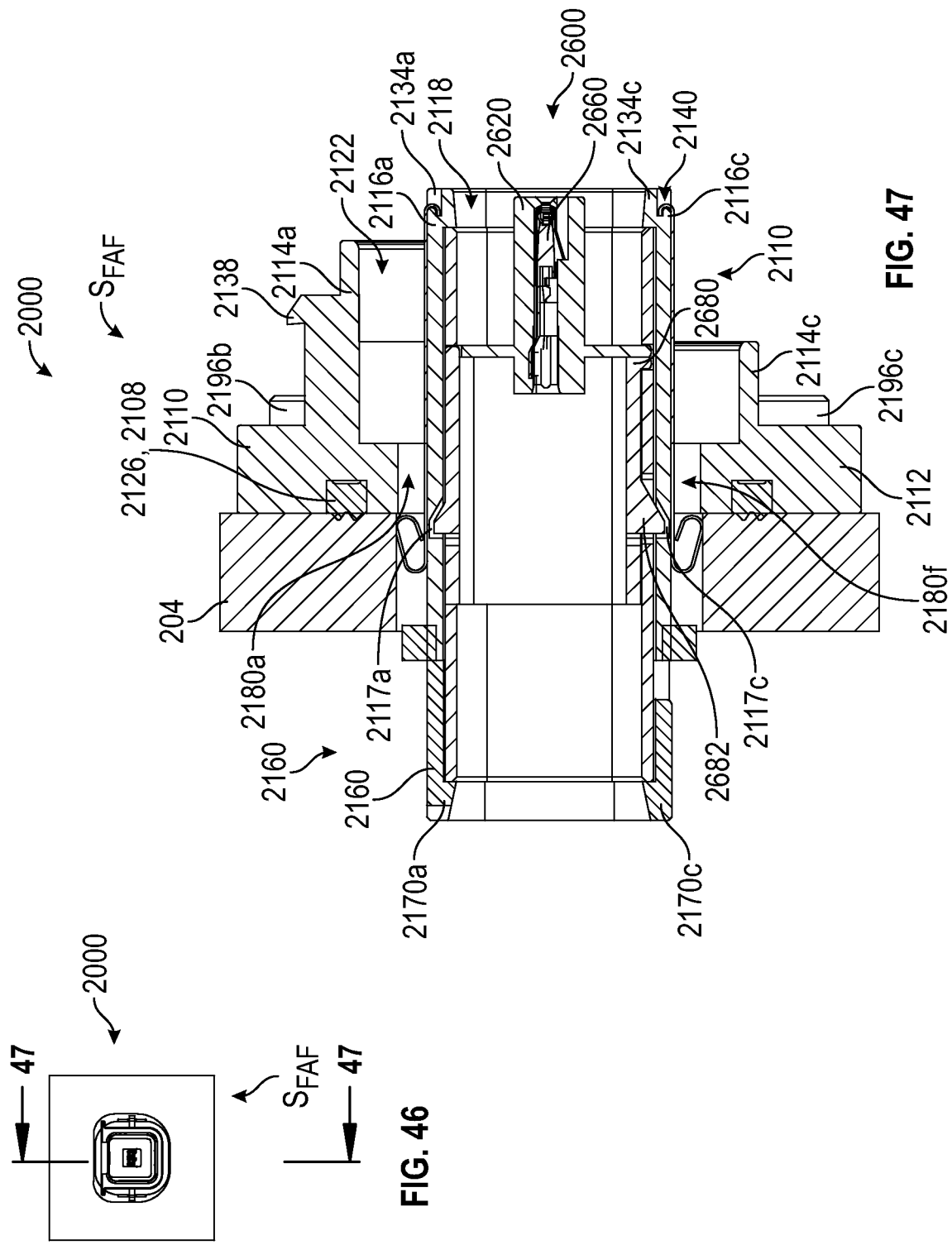

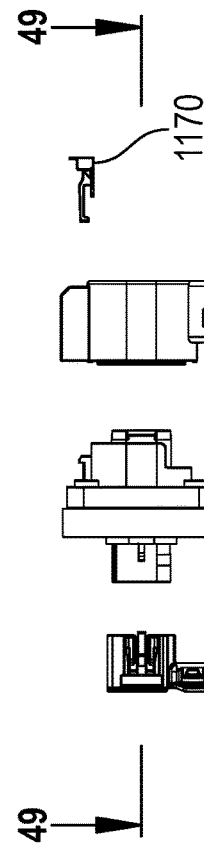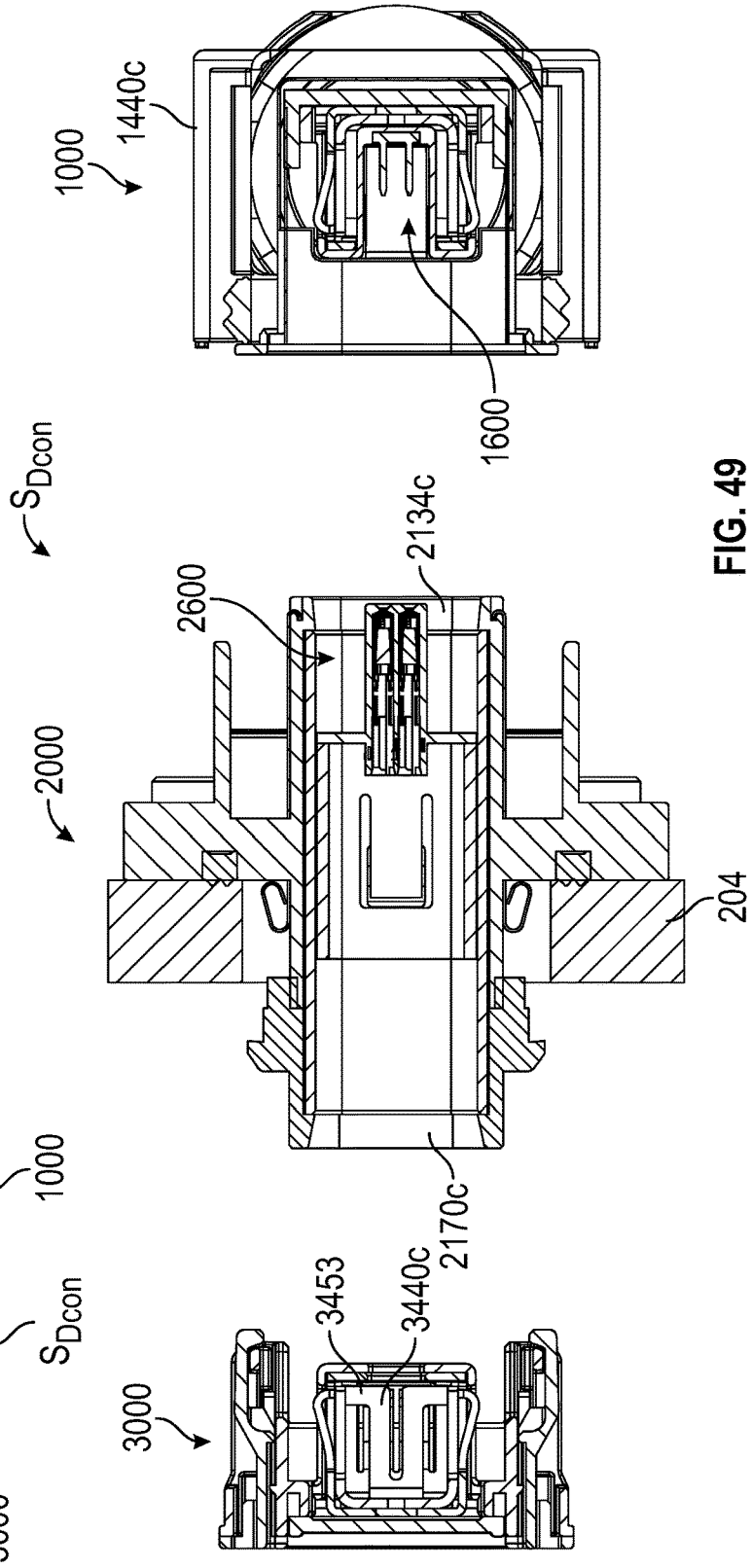

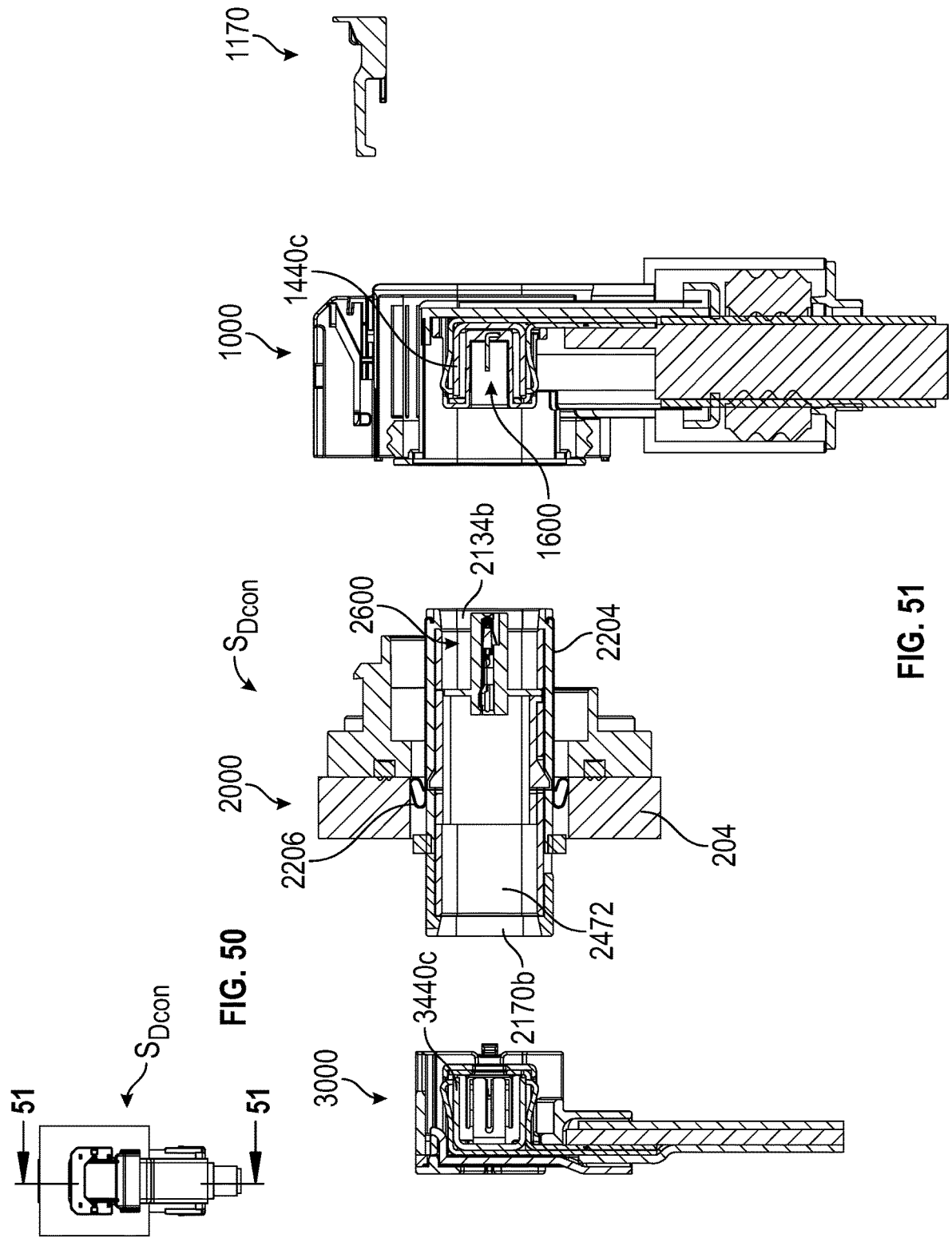

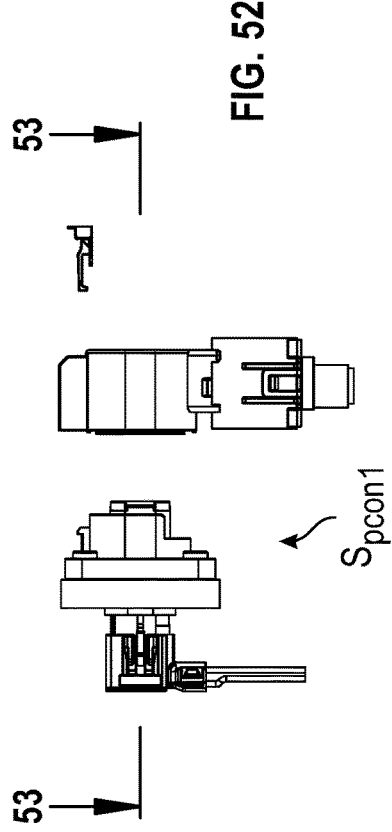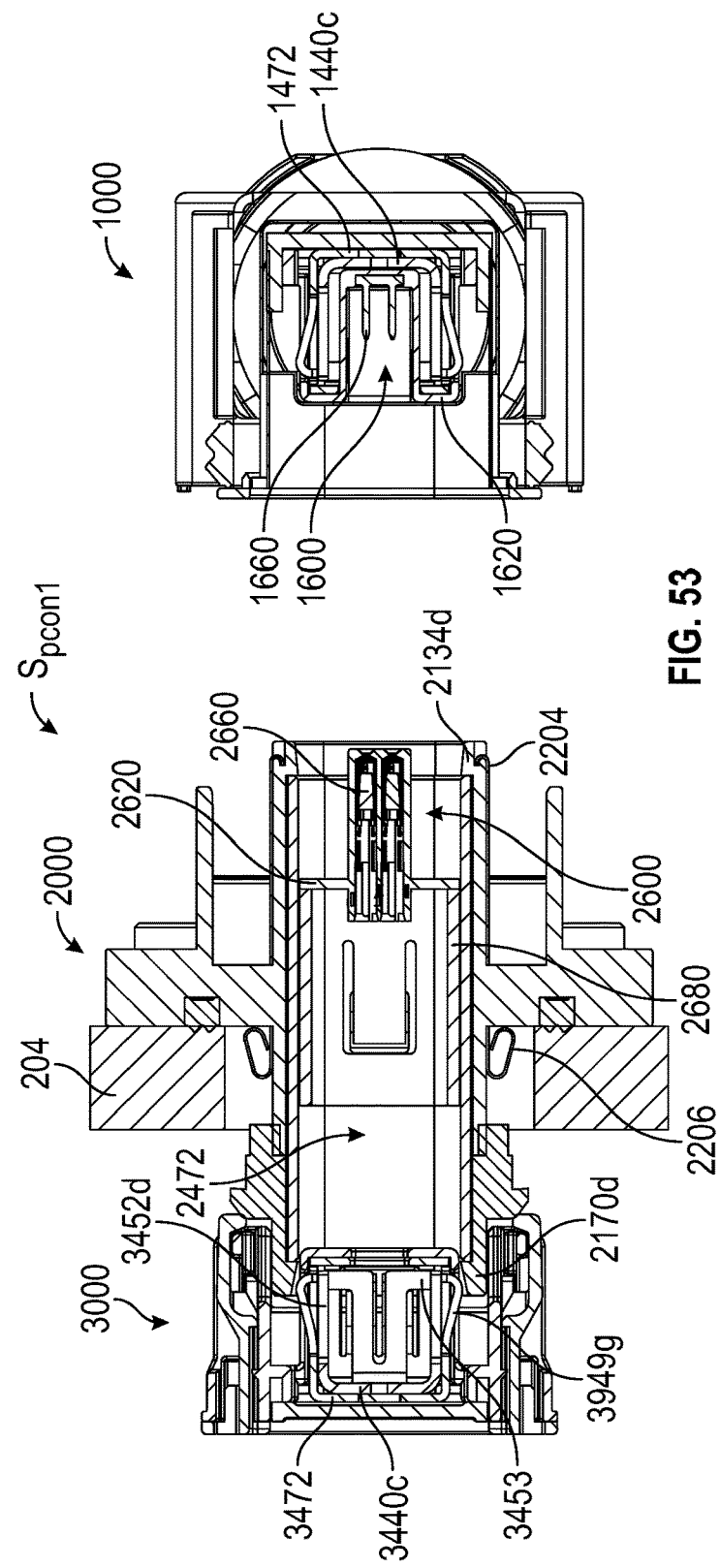
FIG. 52
FIG. 53

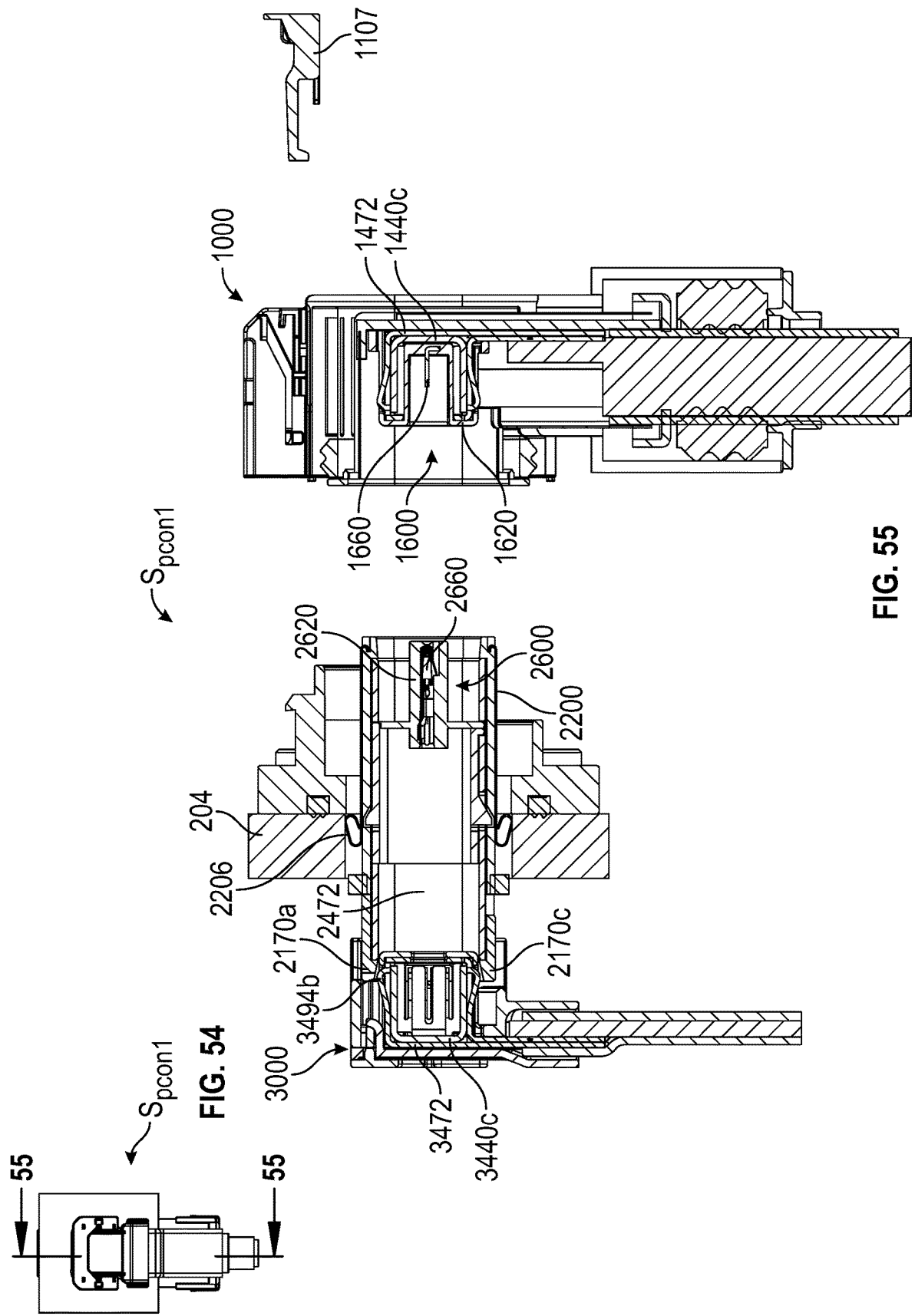

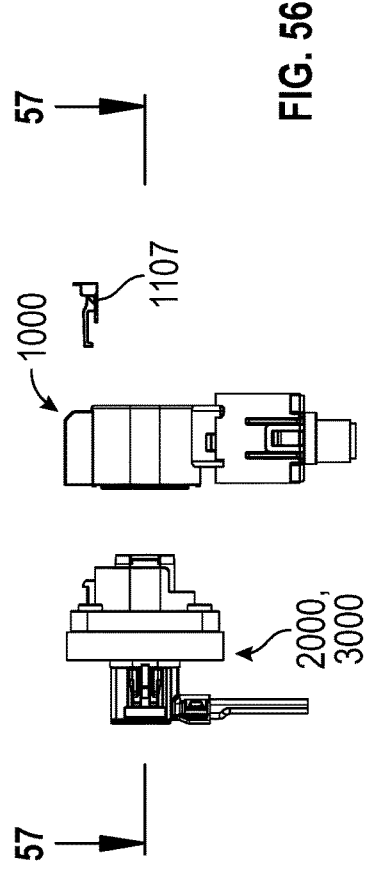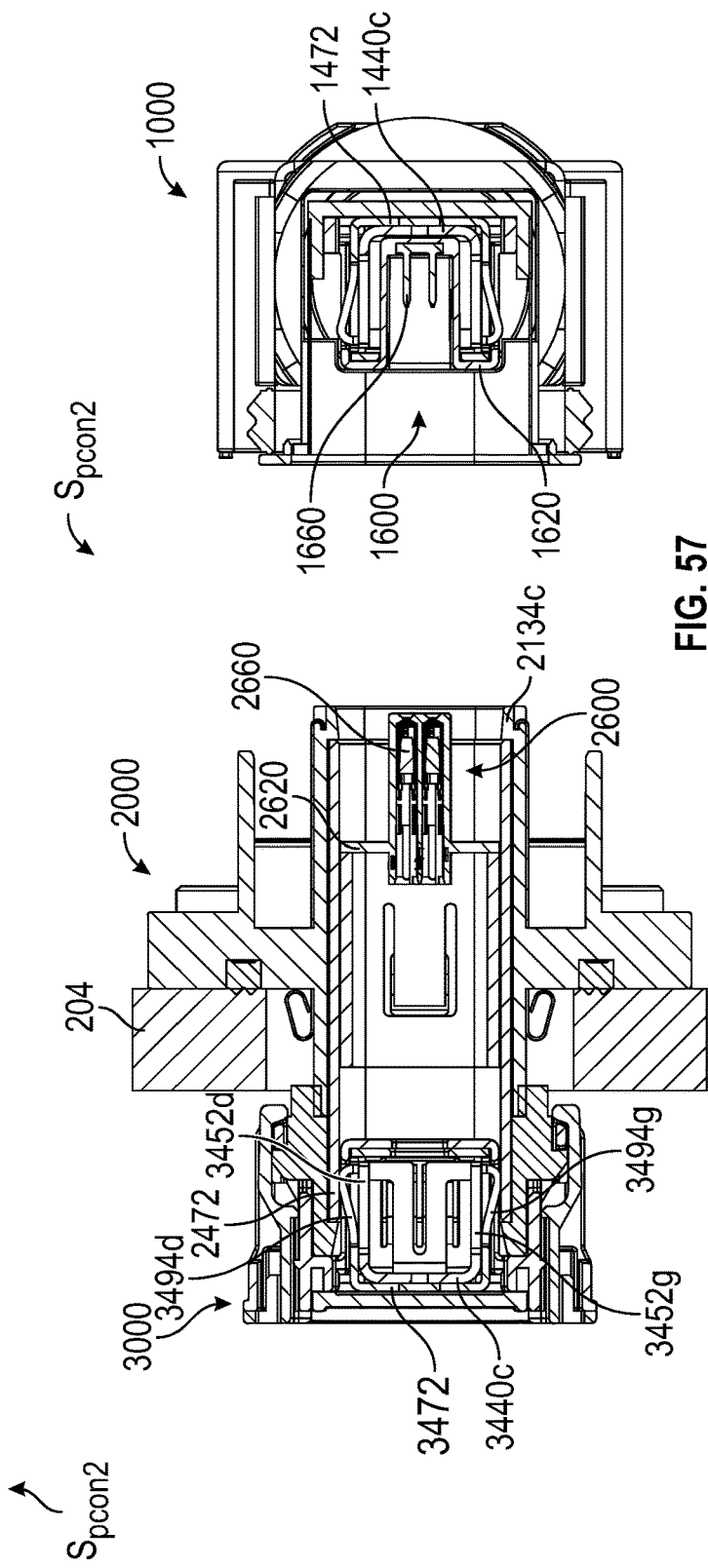
FIG. 56
FIG. 57

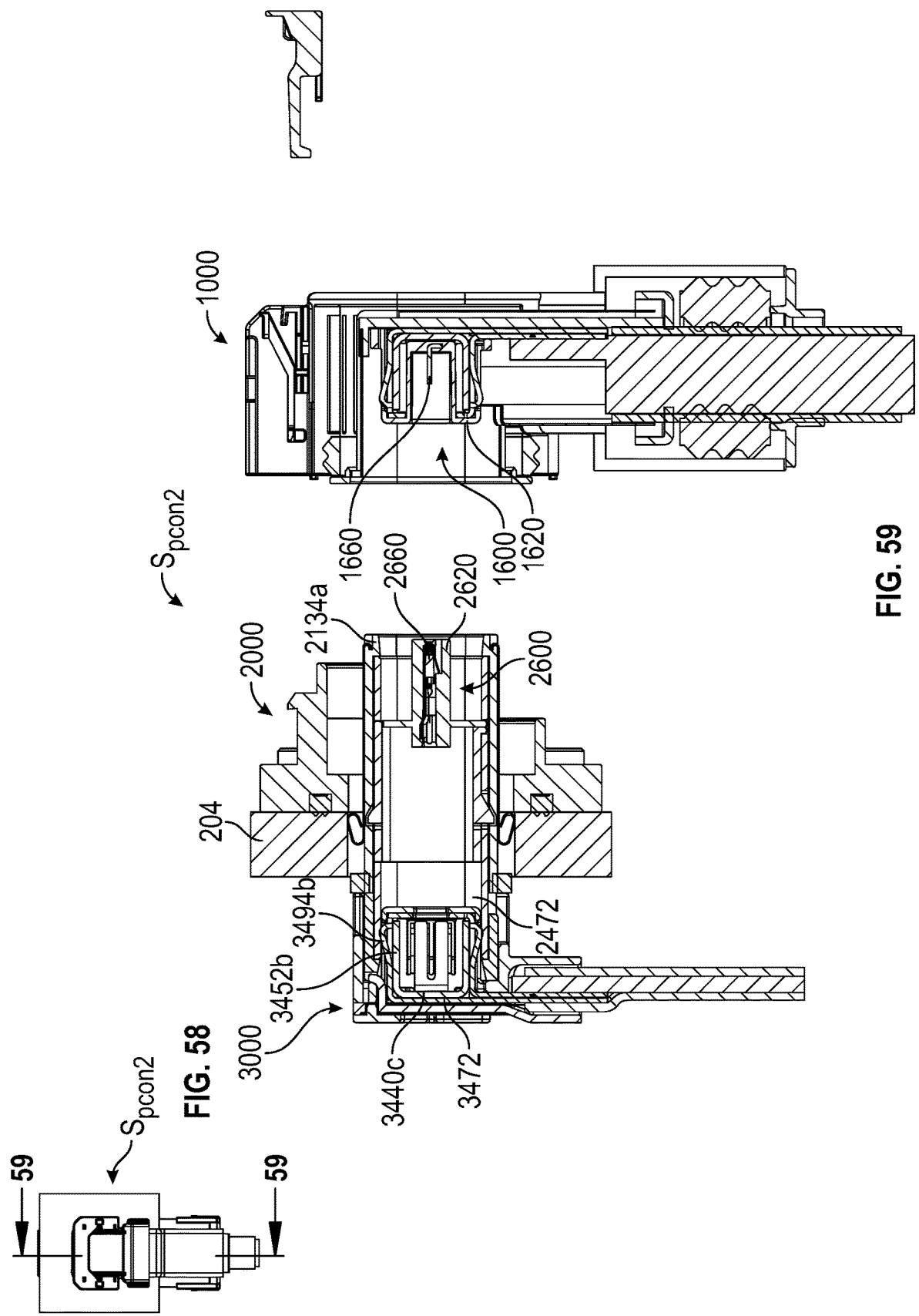

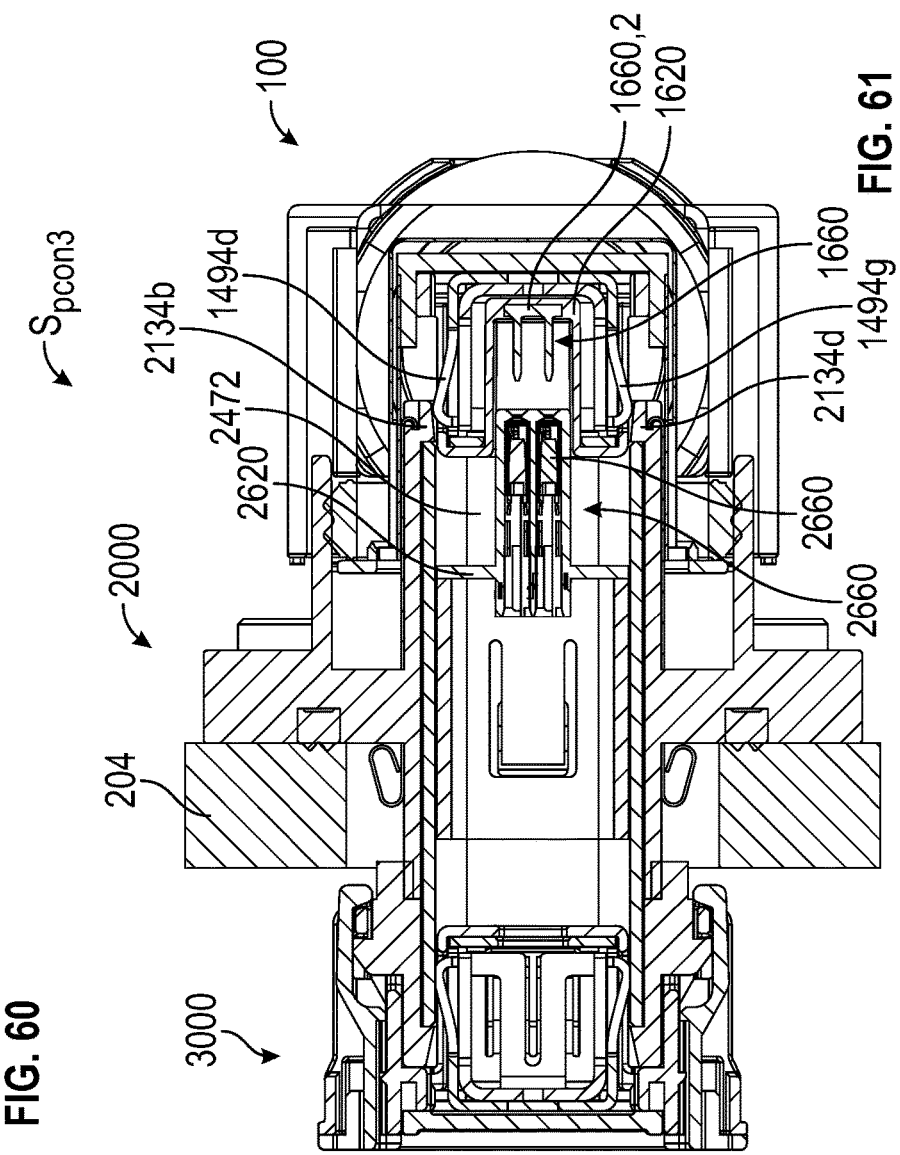
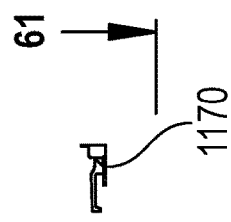
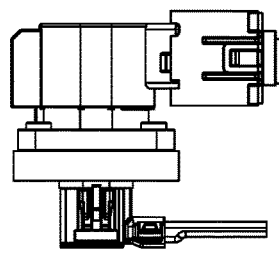
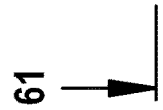

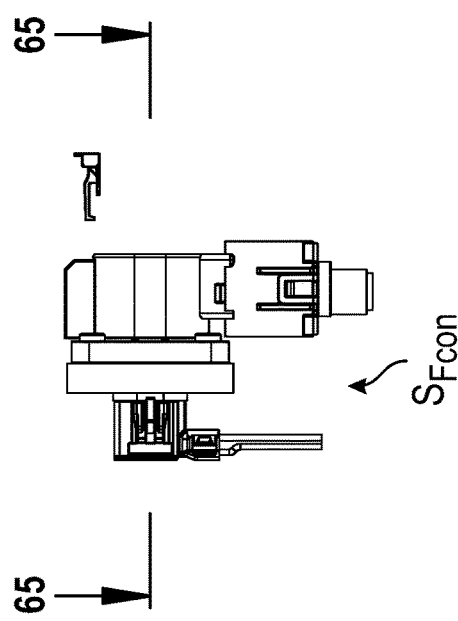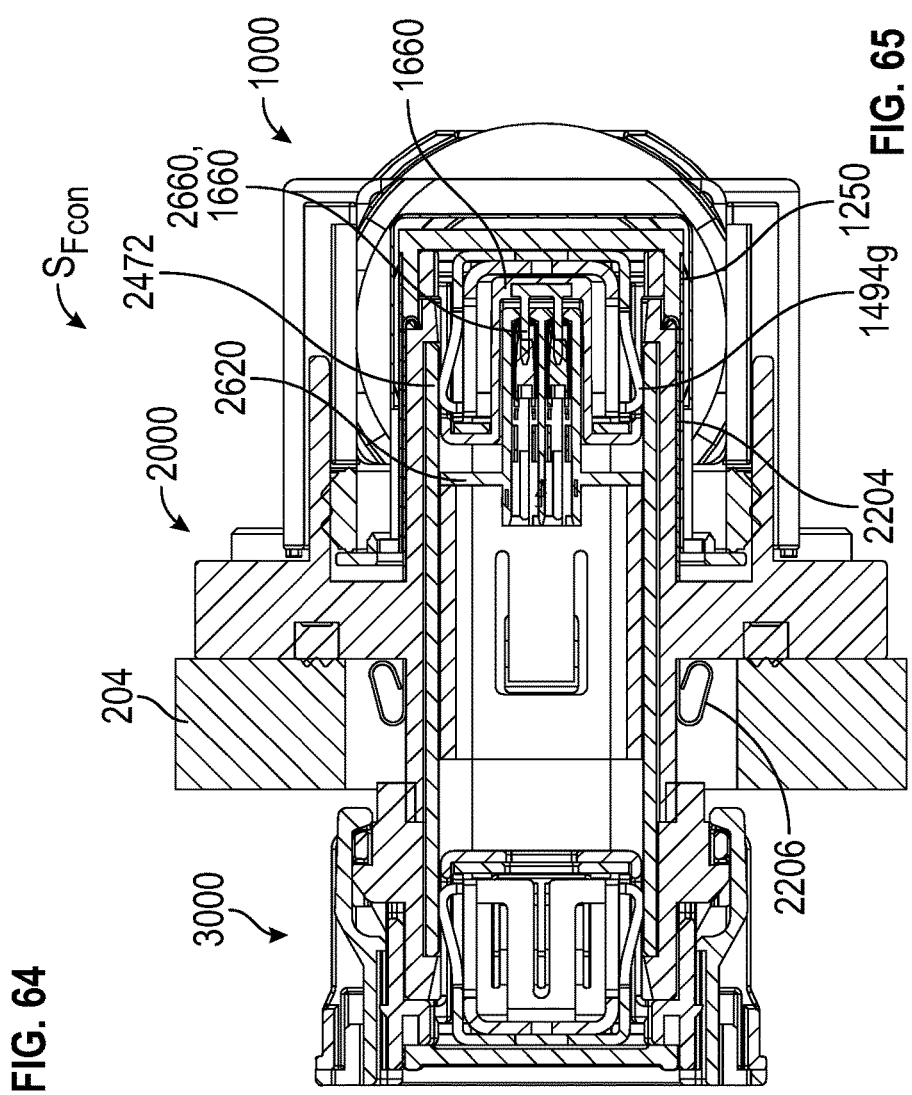

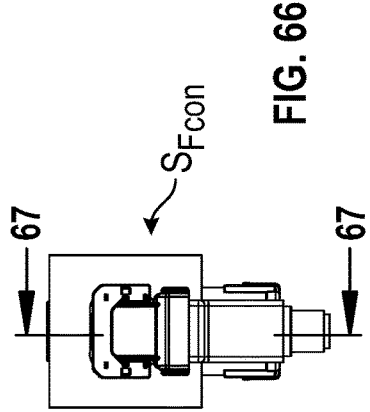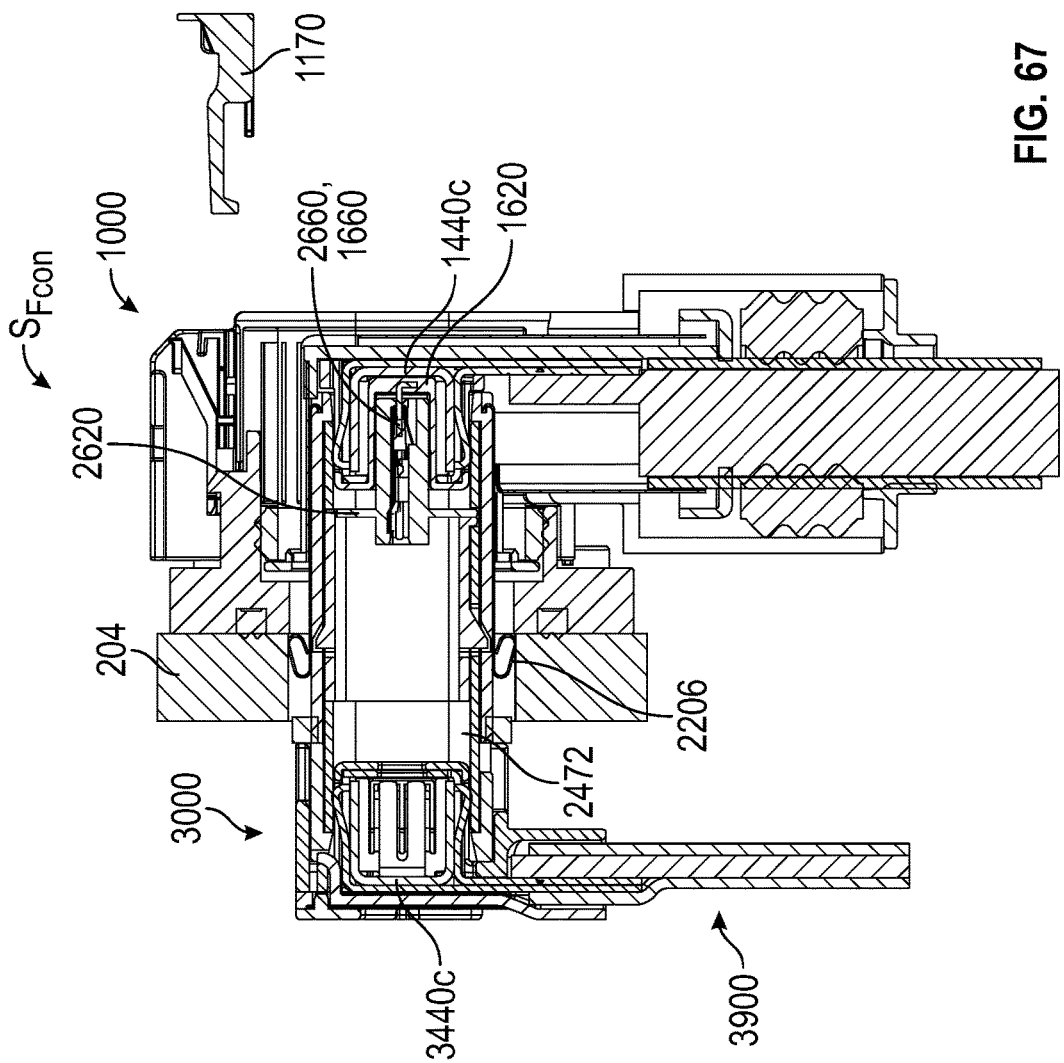

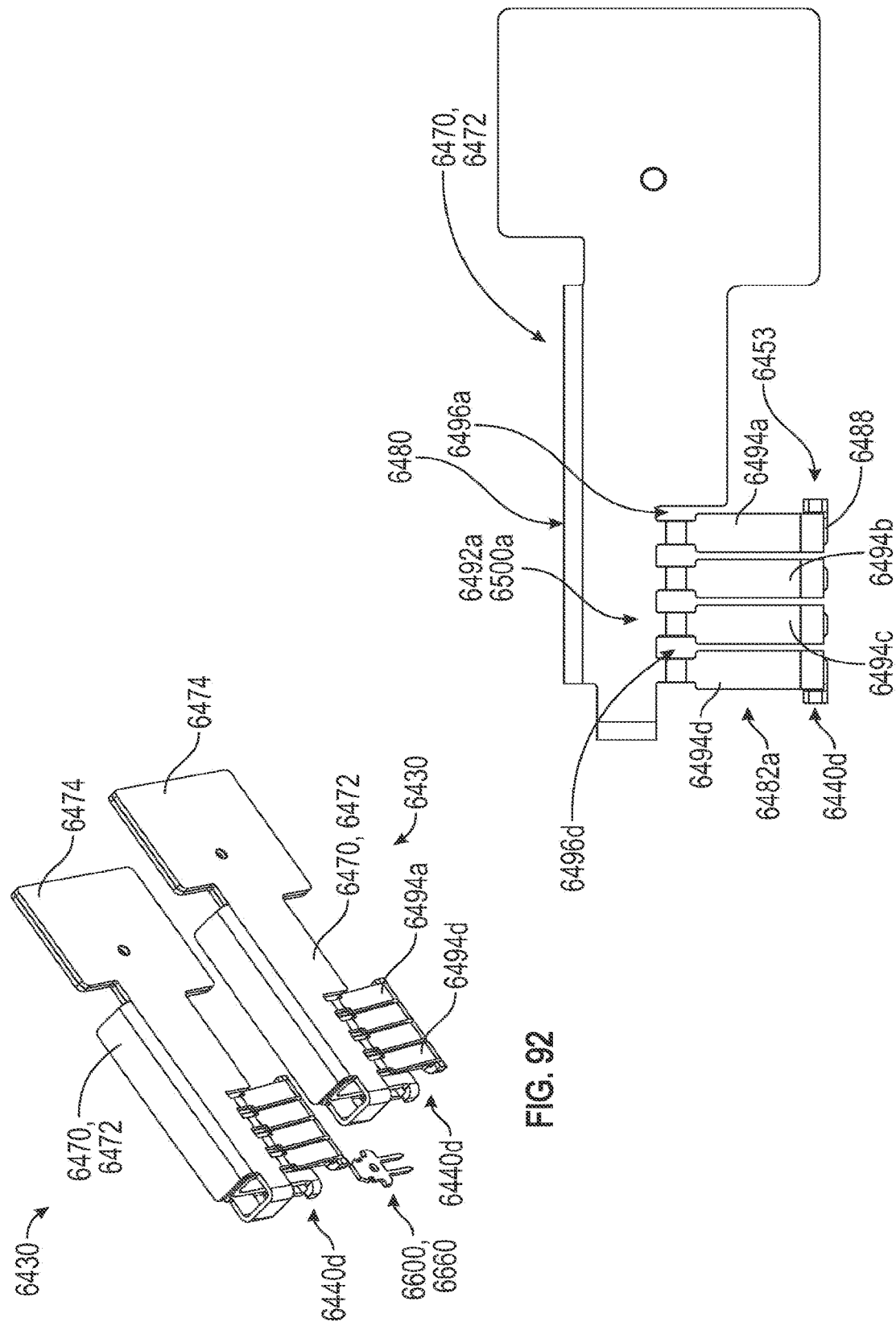

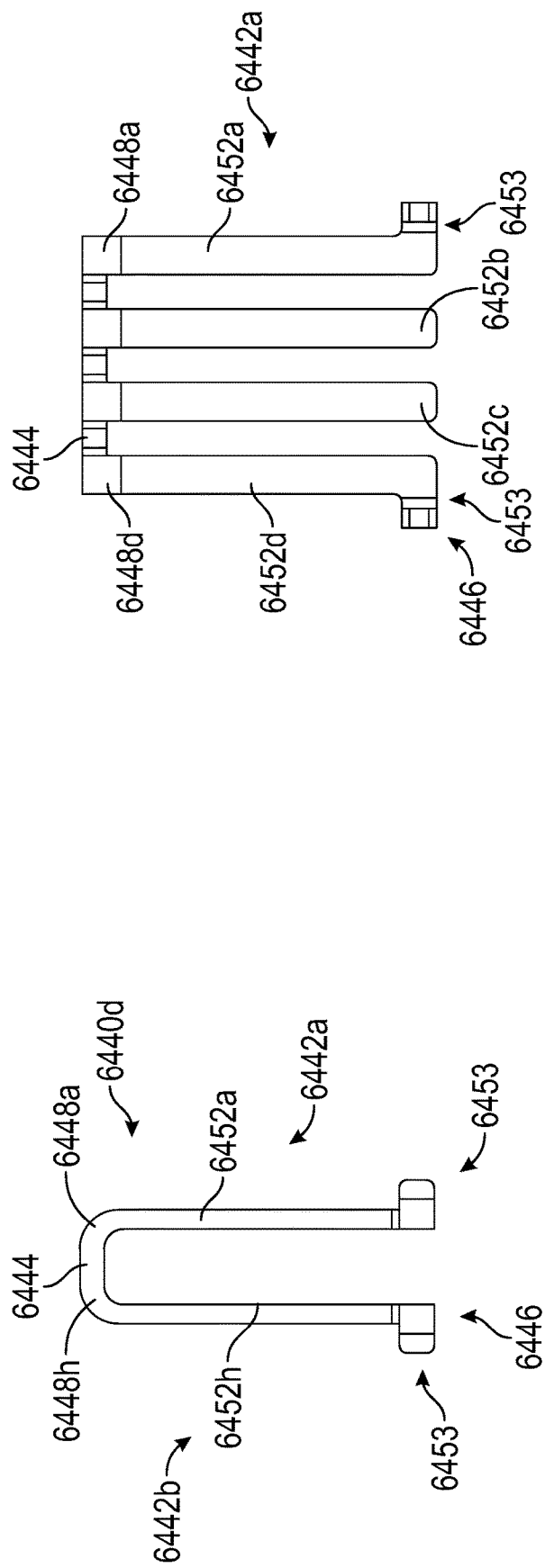
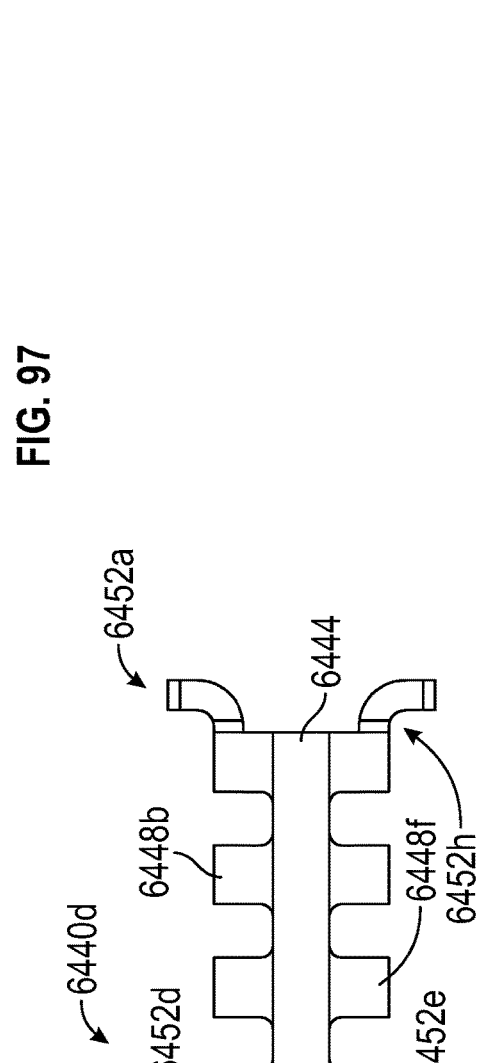
FIG. 97
FIG. 98
FIG. 96

CONNECTOR SYSTEM INCLUDING AN INTERLOCK SYSTEM

CROSS REFERENCE TO RELATED APPLICATIONS

This application is a U.S. nationalization under 35 U.S.C. § 371 of International Application No. PCT/US2021/043686, filed Jul. 29, 2021, which claims the benefit from U.S. provisional patent application 63/058,061, filed Jul. 29, 2020, the disclosures of which are incorporated herein by reference in their entireties.

FIELD OF DISCLOSURE

The present disclosure relates to a connector system, more specifically a connector system that includes an interlock assembly, and most specifically an innovative connector system that includes a high voltage interlock assembly.

BACKGROUND

Over the past several decades, the number of electrical components used in automobiles, and other on-road and off-road vehicles such as pick-up trucks, commercial vans and trucks, semi-trucks, motorcycles, all-terrain vehicles, and sports utility vehicles (collectively "motor vehicles") has increased dramatically. Electrical components are used in motor vehicles for a variety of reasons, including but not limited to, monitoring, improving and/or controlling vehicle performance, emissions, safety and creates comforts to the occupants of the motor vehicles. Considerable time, resources, and energy have been expended to develop power distribution components that meet the varied needs and complexities of the motor vehicle market; however, conventional power distribution components suffer from a variety of shortcomings.

Motor vehicles are challenging electrical environments for both the electrical components and the connector assemblies due to a number of conditions, including but not limited to, space constraints that make initial installation difficult, harsh operating conditions, large ambient temperature ranges, prolonged vibration, heat loads, and longevity, all of which can lead to component and/or connector failure. For example, incorrectly installed connectors, which typically occur in the assembly plant, and dislodged connectors, which typically occur in the field, are two significant failure modes for the electrical components and motor vehicles. Each of these failure modes leads to significant repair and warranty costs. For example, the combined annual accrual for warranty by all of the automotive manufacturers and their direct suppliers is estimated to be between 50 billion and 150 billion, worldwide. In light of these challenging electrical environments, considerable time, money, and energy have been expended to find power distribution components that meet the needs of the markets. This disclosure addresses the shortcomings of conventional power distribution components. A full discussion of the features and advantages of the present disclosure is deferred to the following detailed description, which proceeds with reference to the accompanying drawings.

SUMMARY

The present disclosure relates to a connector system for use in an airplane, motor vehicle, a military vehicle (e.g., tank, personnel carrier, heavy-duty truck, and troop transporter), a bus, a locomotive, a tractor, marine applications (e.g., cargo ship, tanker, pleasure boat, submarine and sailing yacht) telecommunications hardware (e.g., server), a battery pack, a 24-48 volt system, for a high-power application, for a high-current application, for a high-voltage application.

Specifically, the invention that is discussed herein is a connector system, which can be used to electrically connect a power source to other power distribution components or assemblies. This connector system includes an interlock system (IL), which insures that current is not applied to the connector system prior to the full engagement of the exterior male connector assembly with the intermediate female connector assembly. It should be understood that when the IL is used in high voltage situations, the IL may be referred to as a high voltage interlock system (HVIL). This connector system also includes an innovative spring member with centering means that ensures proper relative positioning of the components of the connector system, including the spring member and the male terminal.

In one embodiment, the connector system is configured for use in a power distribution system of a motor vehicle, and wherein the connector system includes a female housing, female terminal assembly, and a female interlock (FIL) assembly. The female housing having an arrangement of side walls that define a receptacle that is configured to receive the female terminal assembly. The female interlock (FIL) assembly positioned within the female terminal assembly that resides within the receptacle of the female housing to define a fully assembled female state $S_{FAF}$, whereby the FIL assembly is configured to be coupled to an interlock circuit that prevents electrical current from flowing through the female terminal assembly prior to connection of the female terminal assembly to a male terminal assembly.

In another embodiment, the connector system includes a female connector assembly has: (i) a female housing having an arrangement of side walls that define a receptacle; (ii) a female terminal assembly residing within the receptacle of the female housing; and (iii) a female interlock (FIL) assembly having a receiver that is positioned within the female terminal assembly that resides within the receptacle of the female housing to define a fully assembled female state $S_{FAF}$.

In a further embodiment, the connector system having an intermediate female connector assembly, a first male connector assembly, and a second male connector assembly. The intermediate female connector assembly includes: (i) a female terminal assembly and (ii) a female interlock (FIL) assembly positioned within the female terminal assembly to define a fully assembled female state $S_{FAF}$ The a first male connector assembly including an first male terminal assembly, while the second male connector assembly includes: (i) a second male terminal assembly and (ii) a male interlock (MIL) assembly positioned within the second male terminal assembly to define a fully assembled male state $S_{FAM}$. And wherein the female terminal assembly includes a receptacle dimensioned to receive both a portion of the first male connector assembly and a portion of the second male connector assembly in a fully connected state $S_{FCON}$.

In another embodiment, the connector system includes a male terminal assembly having a male terminal body and an internal spring member. The male terminal body includes at least one contact arm and a side wall arrangement defining a spring receiver, while the internal spring member includes: (i) at least one spring arm having an elongated main body portion with a free end and (ii) a projection that extends laterally from the free end of the main body portion. And wherein the internal spring member resides within the spring receiver to define a fully coupled state $S_{FC}$ whereby the projection resides adjacent an inner surface of the spring receiver to facilitate alignment of the internal spring member within the spring receiver.

In an additional embodiment, the connector system includes first male terminal assembly, a second male terminal assembly, a housing configured to surround an extent of both of the first male terminal assembly and the second male terminal assembly, and a male interlock (MIL) assembly positioned within the housing and between the first male terminal assembly and the second male terminal assembly. Wherein the first male terminal assembly has: (i) a first male terminal body formed from a first material and having a contact arm and a spring receiver, and (ii) a first internal spring member formed from a second material and having a spring arm, and wherein the first internal spring member is dimensioned to reside within the spring receiver of the first male terminal body. And the second male terminal assembly has: (i) a second male terminal body formed from the first material and having a contact arm and a spring receiver, and (ii) a second internal spring member formed from the second material and having a spring arm, and wherein the second internal spring member is dimensioned to reside within the spring receiver of the second male terminal body. Additional structural and functional aspects and benefits of the power distribution components are disclosed in the Detailed Description section and the Figures.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings:

FIG. 3 is a perspective view of the exterior male connector assembly of FIG. 1, wherein the exterior male connector assembly is in a fully assembled state ($S_{FA}$);

FIG. 4 is a front view of the exterior male connector assembly of FIG. 3;

FIG. 5 is an exploded view of the exterior male connector assembly of FIG. 3, wherein the exterior male connector assembly has an exterior housing, an male interlock assembly and an exterior terminal assembly;

FIG. 8 is a side view of the exterior terminal assembly in a fully coupled state ($S_{FC}$);

FIG. 9 is a frontal view of a cross-section of the exterior terminal assembly taken along the 9-9 line of FIG. 8;

FIG. 10 is a side view of the cross-section of the exterior terminal assembly taken along the 9-9 line of FIG. 8;

FIG. 16 is a perspective view of the male interlock assembly of FIG. 3;

FIG. 17 is a frontal view of the male interlock assembly of FIG. 3;

FIG. 18 is a side view of the male interlock assembly of FIG. 3;

FIG. 19 is a cross-sectional view of the male interlock assembly taken along the 19-19 line of FIG. 18;

FIG. 38 is a side view of the intermediate female connector assembly of FIG. 1, wherein the intermediate female connector assembly is in a fully assembled state ($S_{FA}$);

FIG. 39 is a perspective view of the intermediate female connector assembly of FIG. 38;

FIG. 40 is a front view of the intermediate female connector assembly of FIG. 38;

FIG. 46 is a front view of the intermediate female connector assembly of FIG. 39, wherein the intermediate female connector assembly is in a fully assembled state ($S_{FA}$);

FIG. 47 is a cross-sectional view of the intermediate female connector assembly taken along the 47-47 line of FIG. 46;

FIG. 48 is a side view of the connector system in a disconnected state ($S_{DCON}$);

FIG. 49 is a cross-sectional view of the connector system taken along the 49-49 line of FIG. 48;

FIG. 50 is a rear view of the connector system in a disconnected state ($S_{DCON}$);

FIG. 51 is a cross-sectional view of the connector system taken along the 51-51 line of FIG. 50;

FIG. 52 is a side view of the connector system in a first partially connected state ($S_{PCON1}$);

FIG. 53 is a cross-sectional view of the connector system taken along the 53-53 line of FIG. 52;

FIG. 54 is a rear view of the connector system in a first partially connected state ($S_{PCON1}$);

FIG. 55 is a cross-sectional view of the connector system taken along the 55-55 line of FIG. 54;

FIG. 56 is a side view of the connector system in a second partially connected state ($S_{PCONN2}$);

FIG. 57 is a cross-sectional view of the connector system taken along the 57-57 line of FIG. 56;

FIG. 58 is a rear view of the connector system in a second partially connected state ($S_{PCON2}$);

FIG. 59 is a cross-sectional view of the connector system taken along the 59-59 line of FIG. 58;

FIG. 60 is a side view of the connector system in a third partially connected state ($S_{PCON3}$);

FIG. 61 is a cross-sectional view of the connector system taken along the 61-61 line of FIG. 60;

FIG. 64 is a side view of the connector system in a fully connected state ($S_{FCON}$);

FIG. 65 is a cross-sectional view of the connector system taken along the 65-65 line of FIG. 64;

FIG. 66 is a rear view of the connector system in a fully connected state ($S_{FCON}$);

FIG. 67 is a cross-sectional view of the connector system taken along the 67-67 line of FIG. 66;

FIG. 92 is a perspective view of the male interlock assembly and the plurality of male terminal assemblies of FIG. 91;

FIG. 93 is a side view of a male terminal assembly of FIG. 92, wherein the male terminal assembly includes a male terminal body and a male spring member;

FIG. 96 is a top view of the male spring member of FIG. 91;

FIG. 97 is a side view of the male spring member of FIG. 91;

FIG. 98 is a front view of the male spring member of FIG. 91;

DETAILED DESCRIPTION

Figure 1:
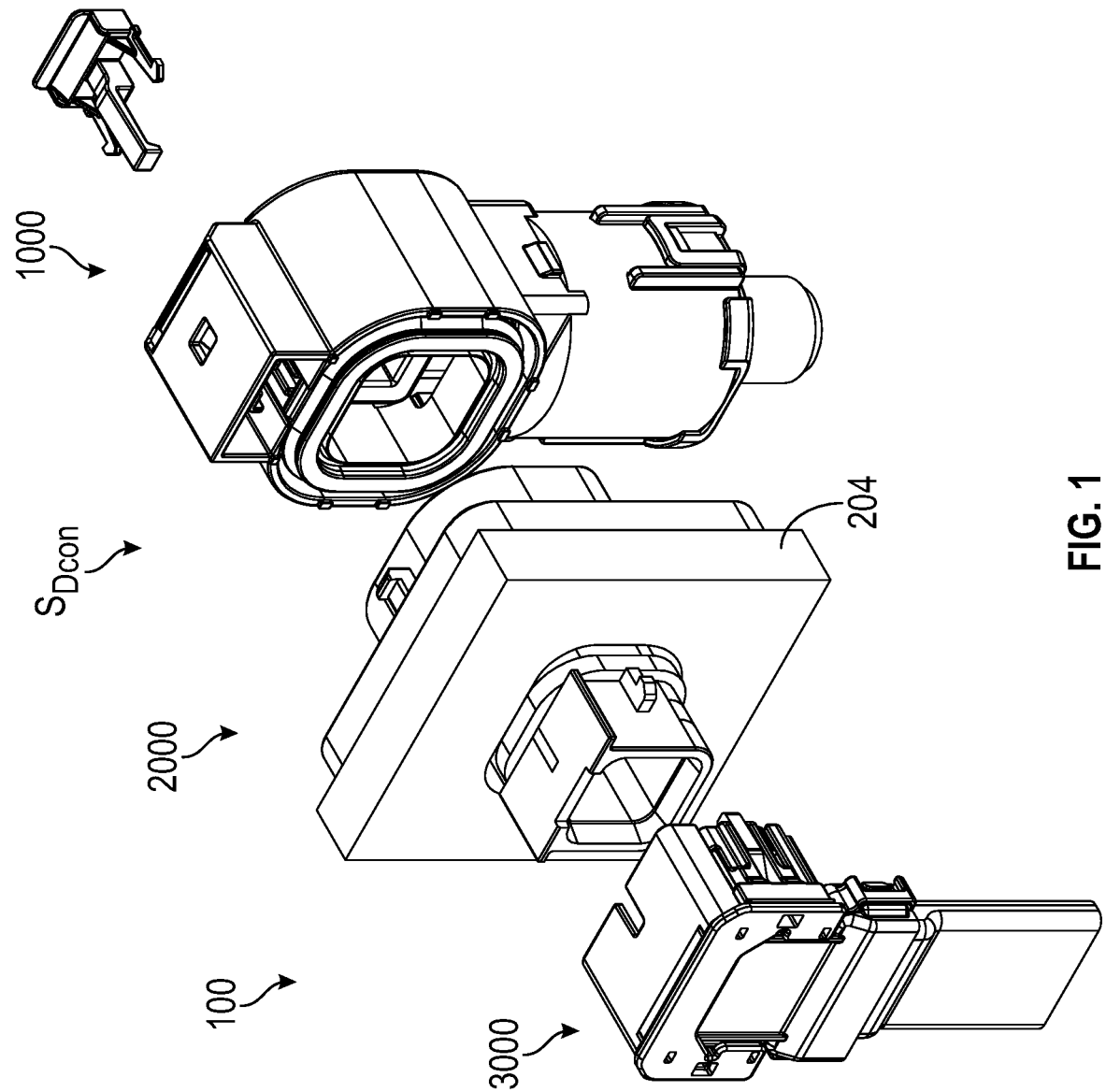
FIG. 1 is a perspective view of a first embodiment of a connector system having an interior male connector assembly, intermediate female connector assembly, and an exterior male connector assembly, wherein the connector system is in a disconnected state ($S_{DCON}$)
Figure 2:
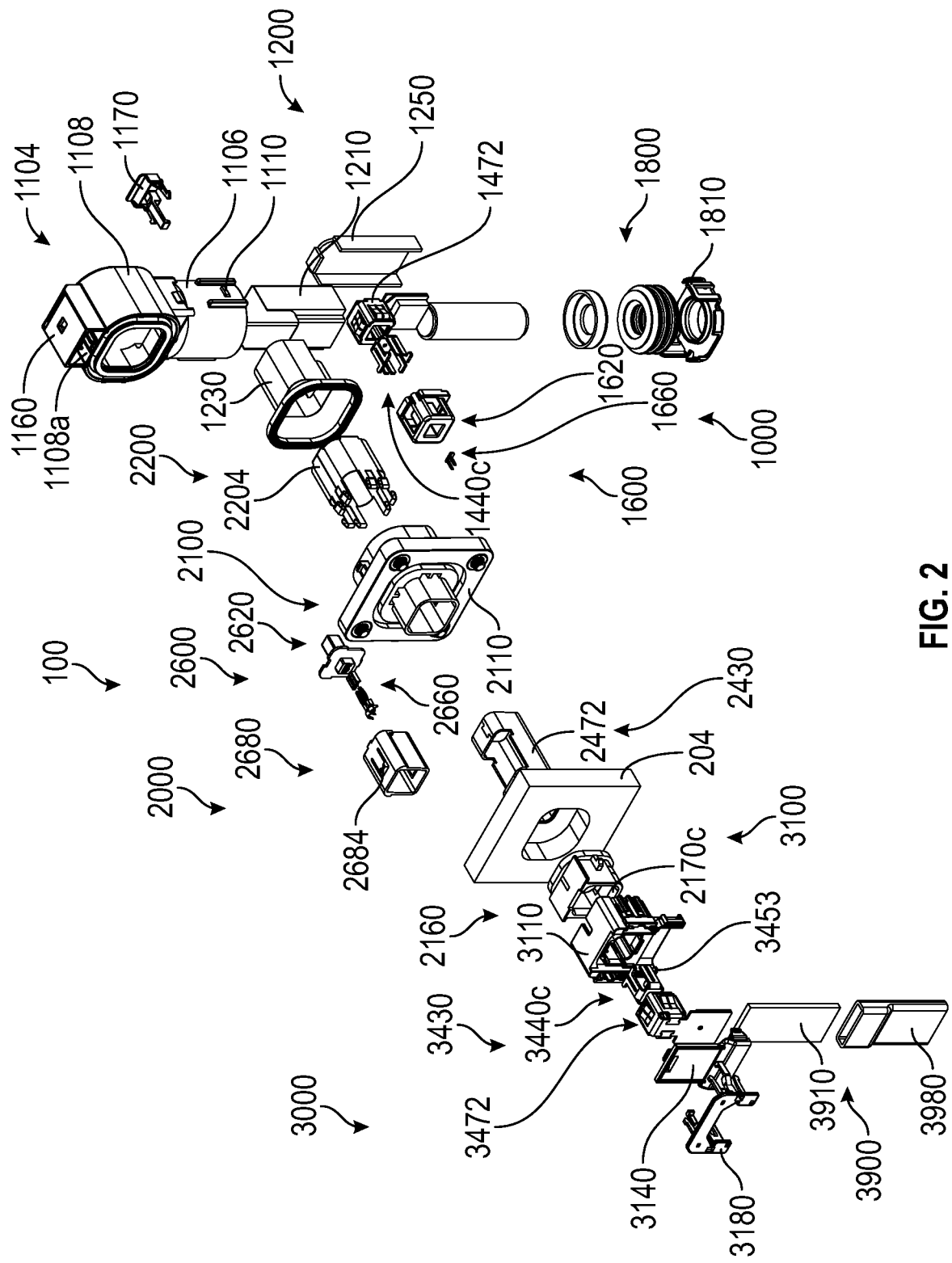
FIG. 2 is an exploded view of the connector system of FIG. 1.

In the following detailed description, numerous specific details are set forth by way of examples in order to provide a thorough understanding of the relevant teachings. However, it should be apparent to those skilled in the art that the present teachings may be practiced without such details. In other instances, well-known methods, procedures, components, and/or circuitry have been described at a relatively high-level, without detail, in order to avoid unnecessarily obscuring aspects of the present teachings.

While this disclosure includes a number of embodiments in many different forms, there is shown in the drawings and will herein be described in detail particular embodiments with the understanding that the present disclosure is to be considered as an exemplification of the principles of the disclosed methods and systems, and is not intended to limit the broad aspects of the disclosed concepts to the embodiments illustrated. As will be realized, the disclosed methods and systems are capable of other and different configurations and several details are capable of being modified all without departing from the scope of the disclosed methods and systems. For example, one or more of the following embodiments, in part or whole, may be combined consistently with the disclosed methods and systems. Accordingly, the drawings and detailed descriptions are to be regarded as illustrative in nature, not restrictive or limiting.

The Figures show two embodiments of connector systems 100, 5100 which is designed to mechanically and electrically couple one device or component to another device or component within a power distribution system or environment. For example, a device or component may be a current supplying device or component (e.g., power source, such as an alternator or battery) and the other device or component may be current drawing device or component (e.g., radiator fan, heated seat, power distribution component, or another current drawing component). Said power distribution system or environment that includes the connector systems 100, 5100 may be installed within an airplane, motor vehicle, a military vehicle (e.g., tank, personnel carrier, heavy-duty truck, and troop transporter), a bus, a locomotive, a tractor, a boat, a submarine, a battery pack, a 24-48 volt system, for a high-power application, for a high-current application, for a high-voltage application. In these applications, the power distribution components is essential to meet industry standards, production, and performance requirements of the power distribution system and the motor vehicle. It should be understood that multiple connector systems 100, 5100 could be used in a single application.

Various aspects of the first embodiment of the connector system 100 are disclosed herein. Specifically, the connector system 100 is comprised of: (i) a male connector assembly—namely, an exterior male connector assembly—or a second connector assembly 1000, (ii) a female connector assembly—namely, an interior female connector assembly 2000, and (iii) a male connector assembly—namely, an interior male connector assembly—or a first connector assembly 3000. Additionally and as shown in at least FIGS. 3, 4, 39 and 43, the connector system 100 includes a connector position assurance ("CPA") assembly 102, which is comprised of: (i) a male CPA assembly 1158 with a CPA receiver 1160 and a CPA member 1170, and (ii) a female CPA assembly 2136 with a CPA coupler 2138.

FIGS. 3-10 and 15-27 show various views and components of the exterior male connector assembly 1000. The exterior male connector assembly 1000 is primarily composed of: (i) an exterior male housing assembly 1100, (ii) an exterior male shielding assembly 1200, (iii) an exterior male terminal assembly 1430, (iv) a male interlock (MIL) assembly 1600, and (v) a strain relief assembly 1800;

FIGS. 28-37 show various views and components of the interior male connector assembly 3000. The interior male connector assembly 3000 is primarily composed of: (i) an interior male housing assembly 3100, (ii) an interior male terminal assembly 3430, and (iii) a busbar assembly 3900;

FIGS. 38-47 show various views and components of the intermediate female connector assembly 2000. The intermediate female connector assembly 2000 is primarily composed of: (i) intermediate female housing assembly 2100, (ii) an intermediate female shielding assembly 2200, (iii) a female terminal assembly 2430, and (iv) a female interlock assembly (FIL) 2600; and FIGS. 48-71 show a progression of where the system 100 moves from a disconnected state $S_{DCON}$ to a ready to use state $S_R$.

Figure 74A:
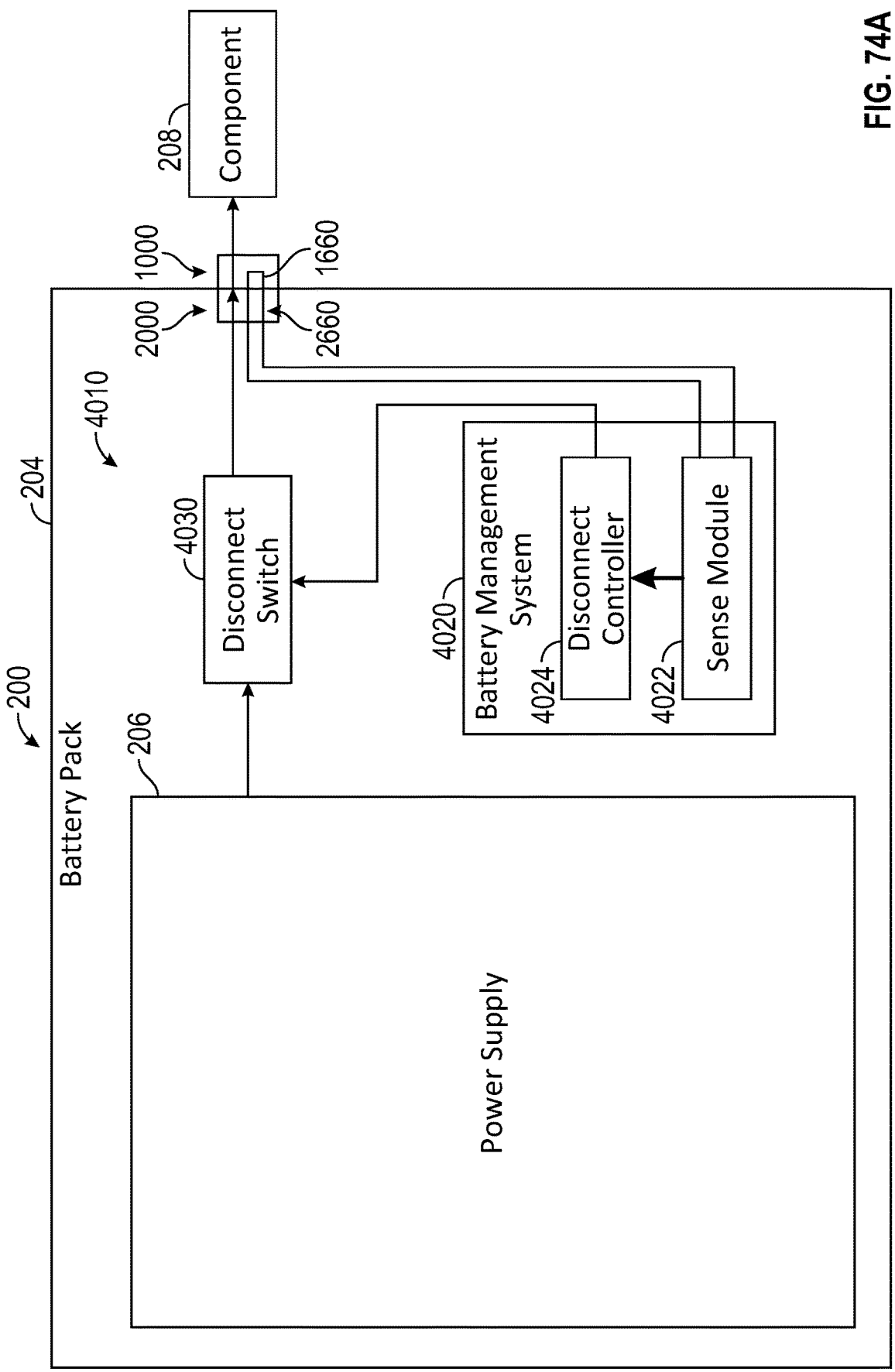
FIG. 74A is a block diagram shown one configuration that where the first embodiment of the connector system may be utilized.
Figure 74B:
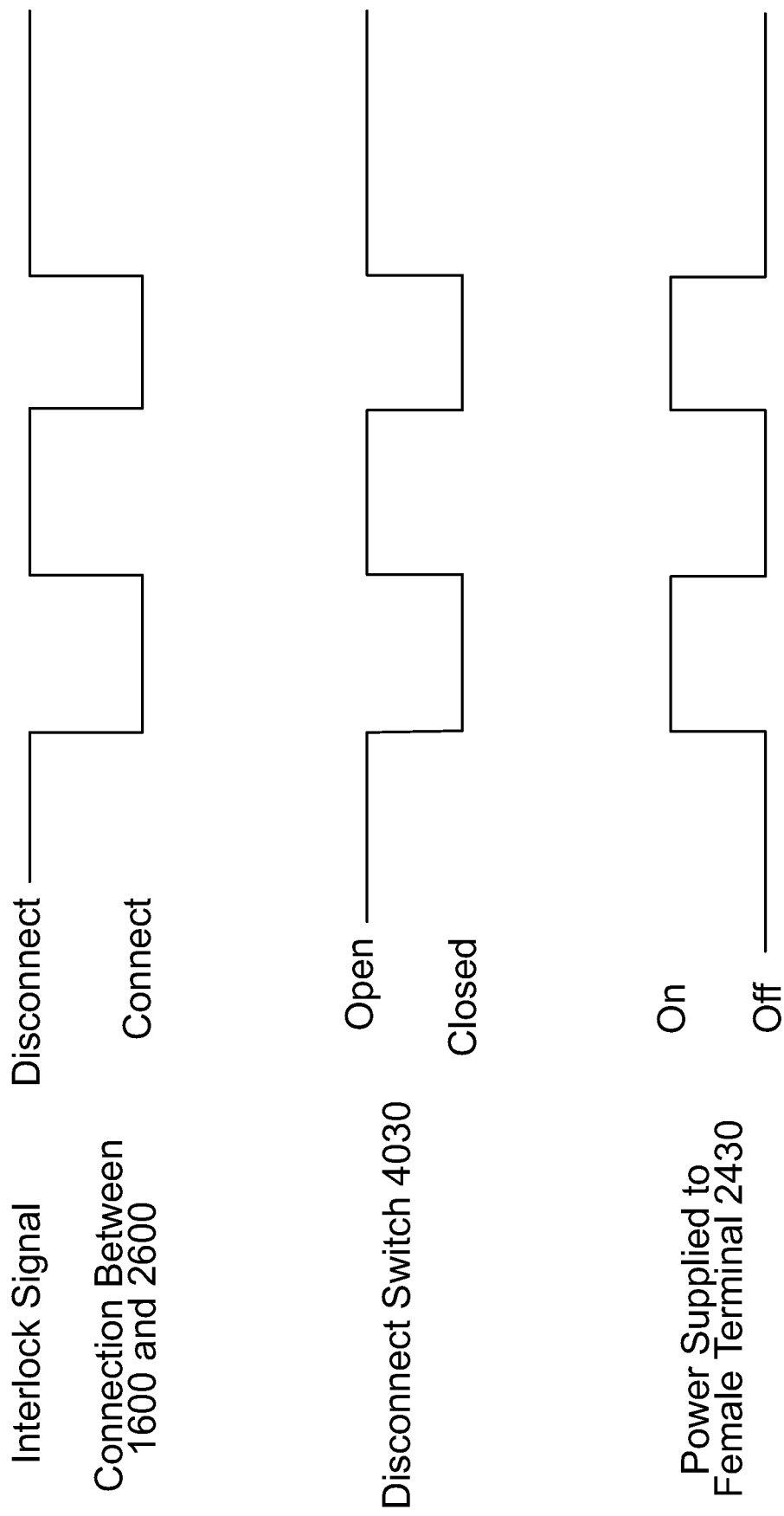
FIG. 74B is a timing chart of three signals contained within the connector system.
Figure 75:
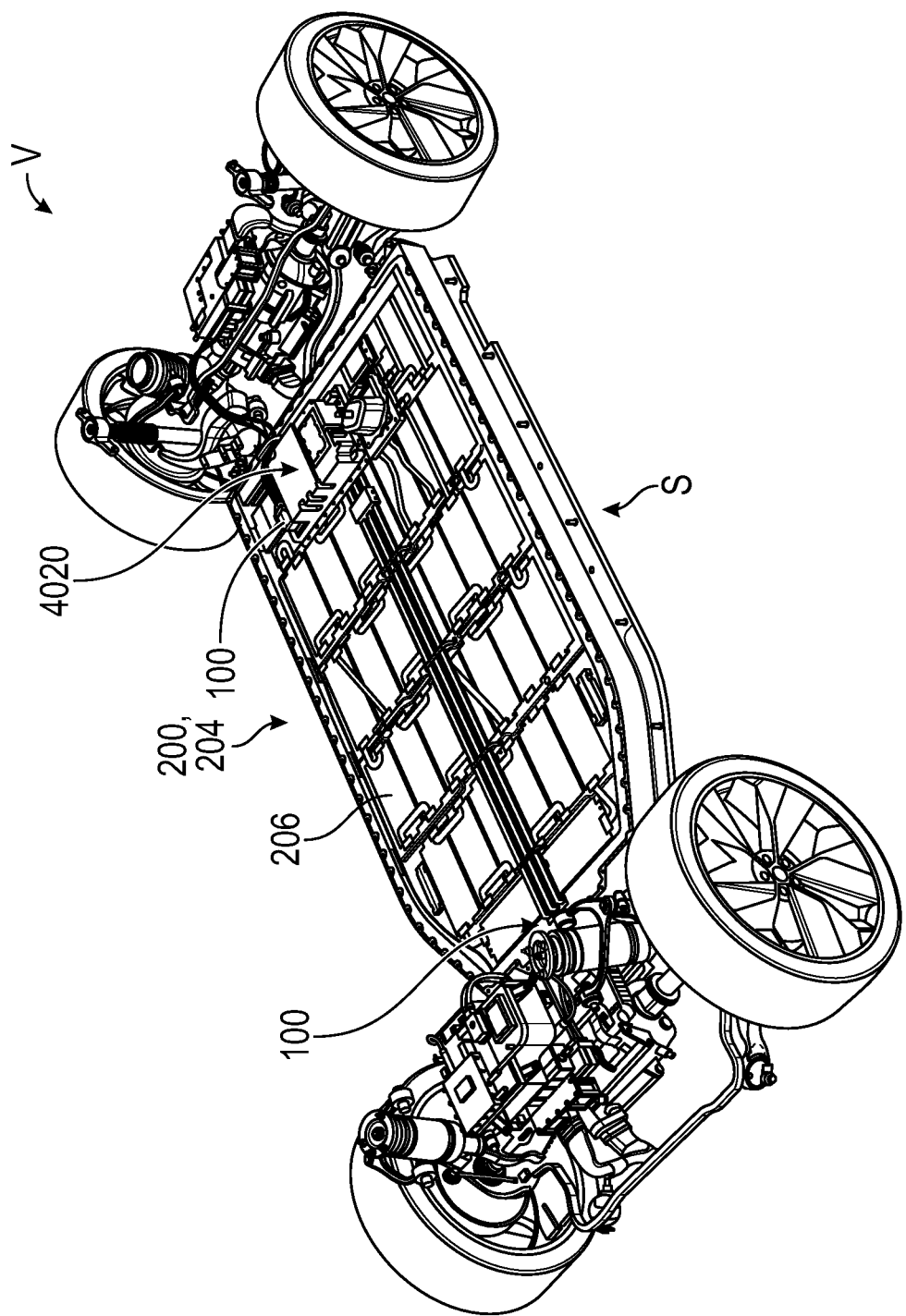
FIG. 75 is a perspective view of a vehicle skateboard having a battery pack, wherein the vehicle skateboard includes the first embodiment of the connector system.
Figure 76:
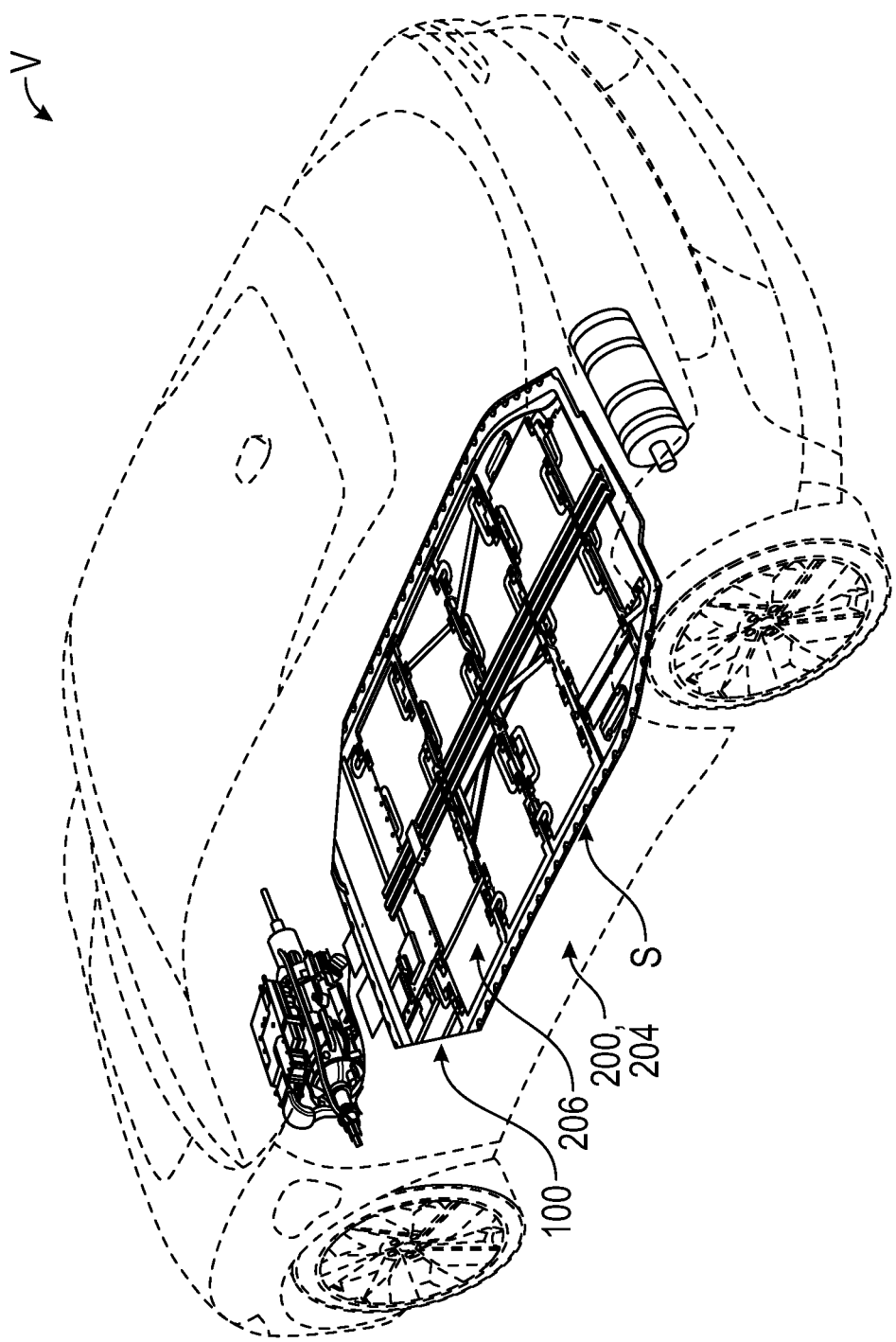
FIG. 76 is a perspective view of a vehicle having a battery pack, wherein the vehicle includes the first embodiment of the connector system.
Figure 77:
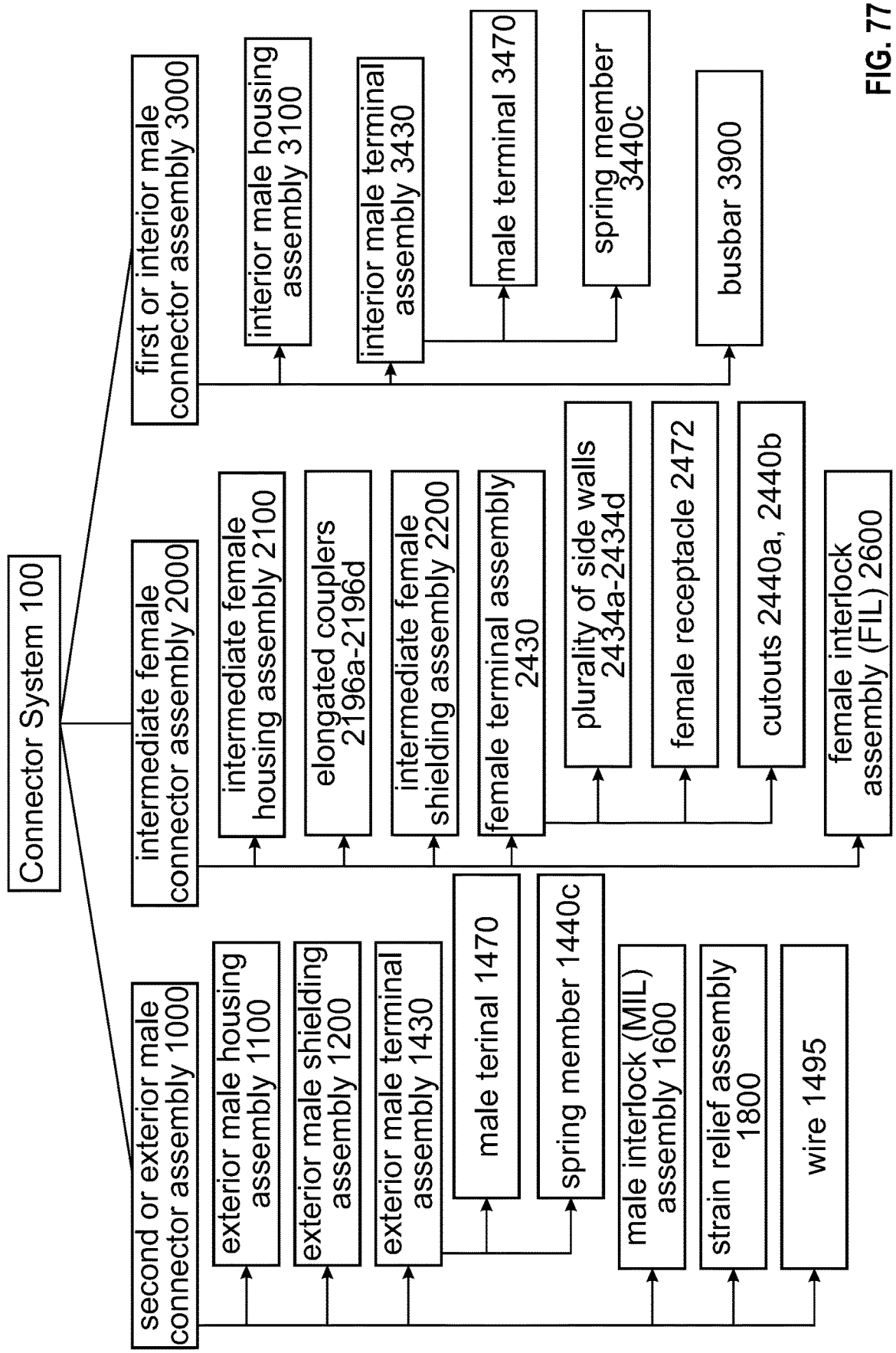
FIG. 77 is a block diagram showing components of the connector system.
Figure 78:
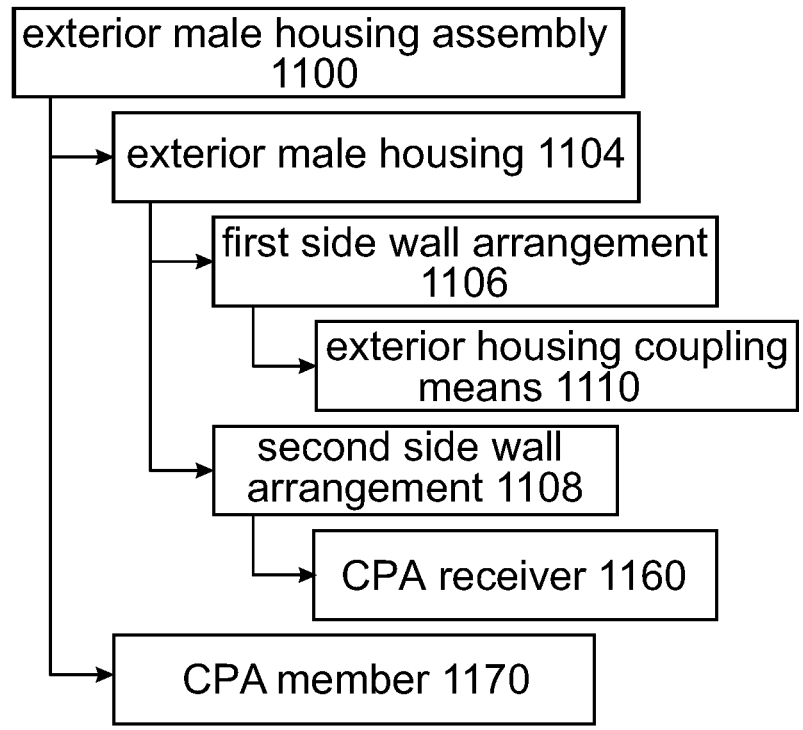
FIG. 78 is a block diagram showing components of the exterior housing assembly.
Figure 79:
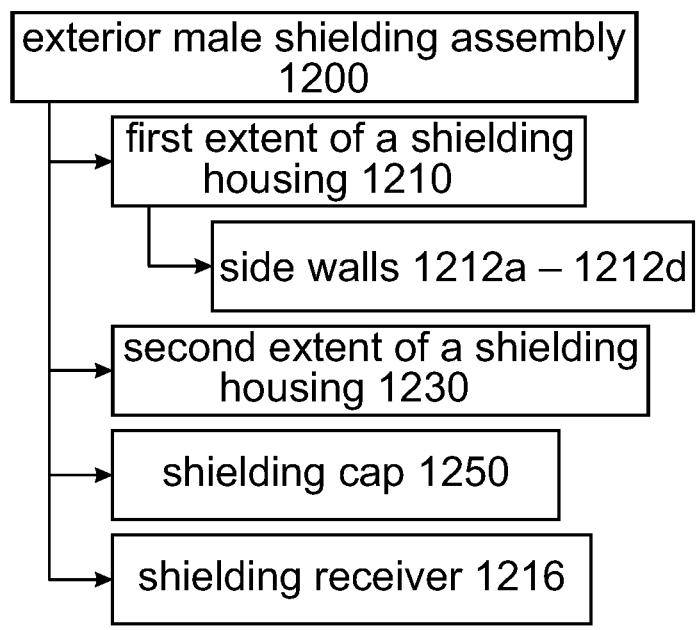
FIG. 79 is a block diagram showing components of the exterior shielding assembly.
Figure 80:
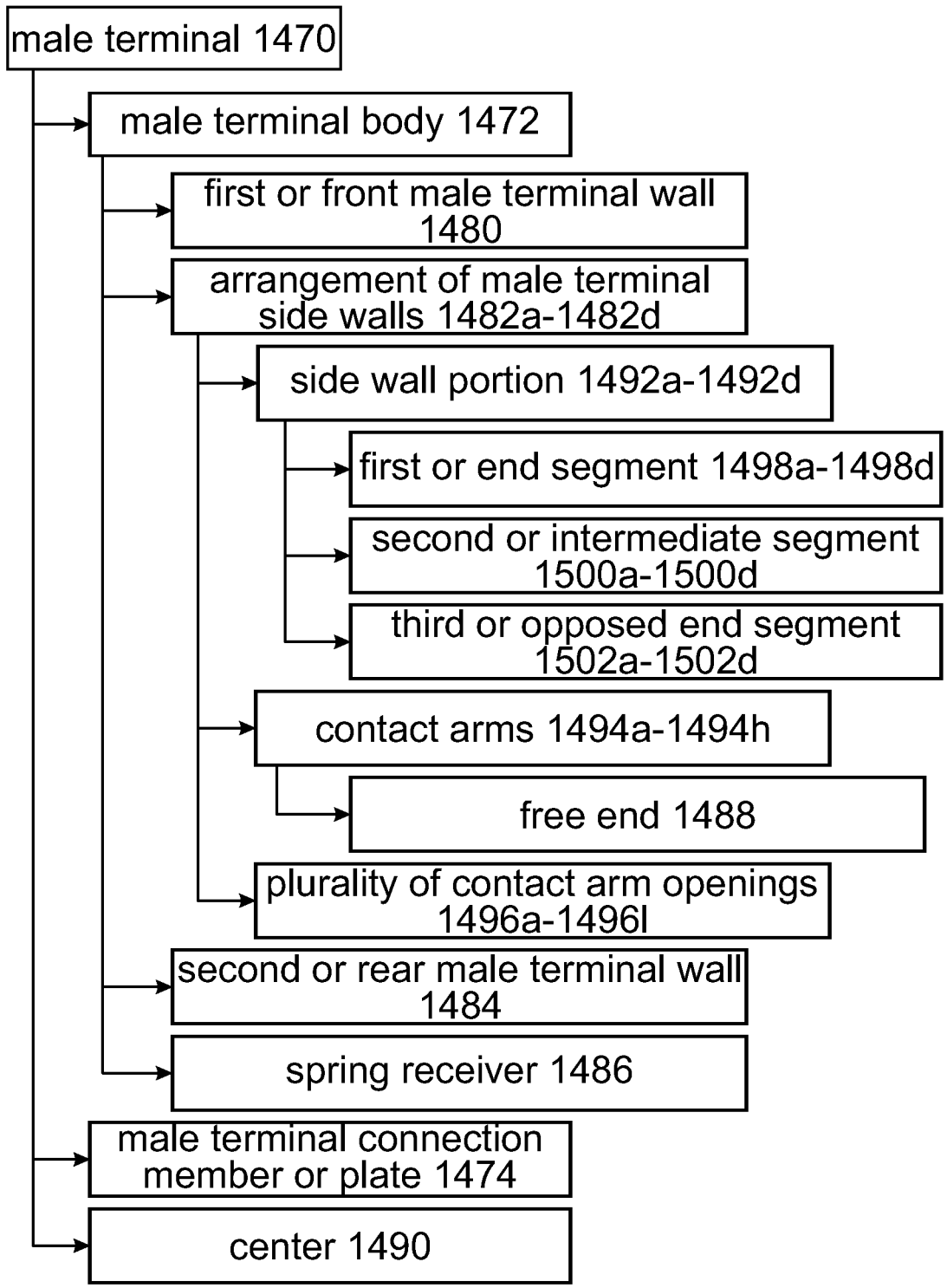
FIG. 80 is a block diagram showing components of the male terminal.
Figure 81:
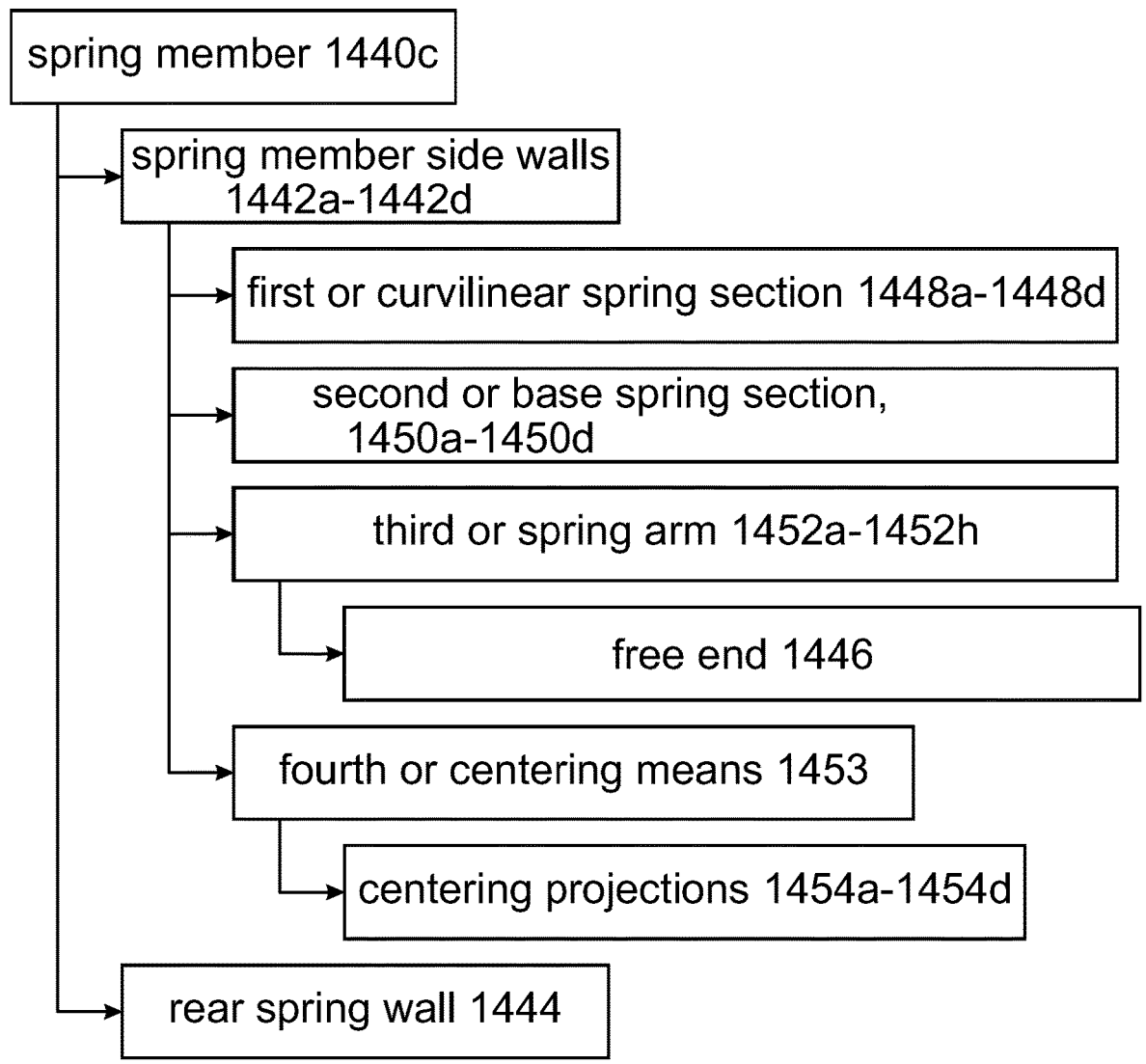
FIG. 81 is a block diagram showing components of the spring member.
Figure 82:
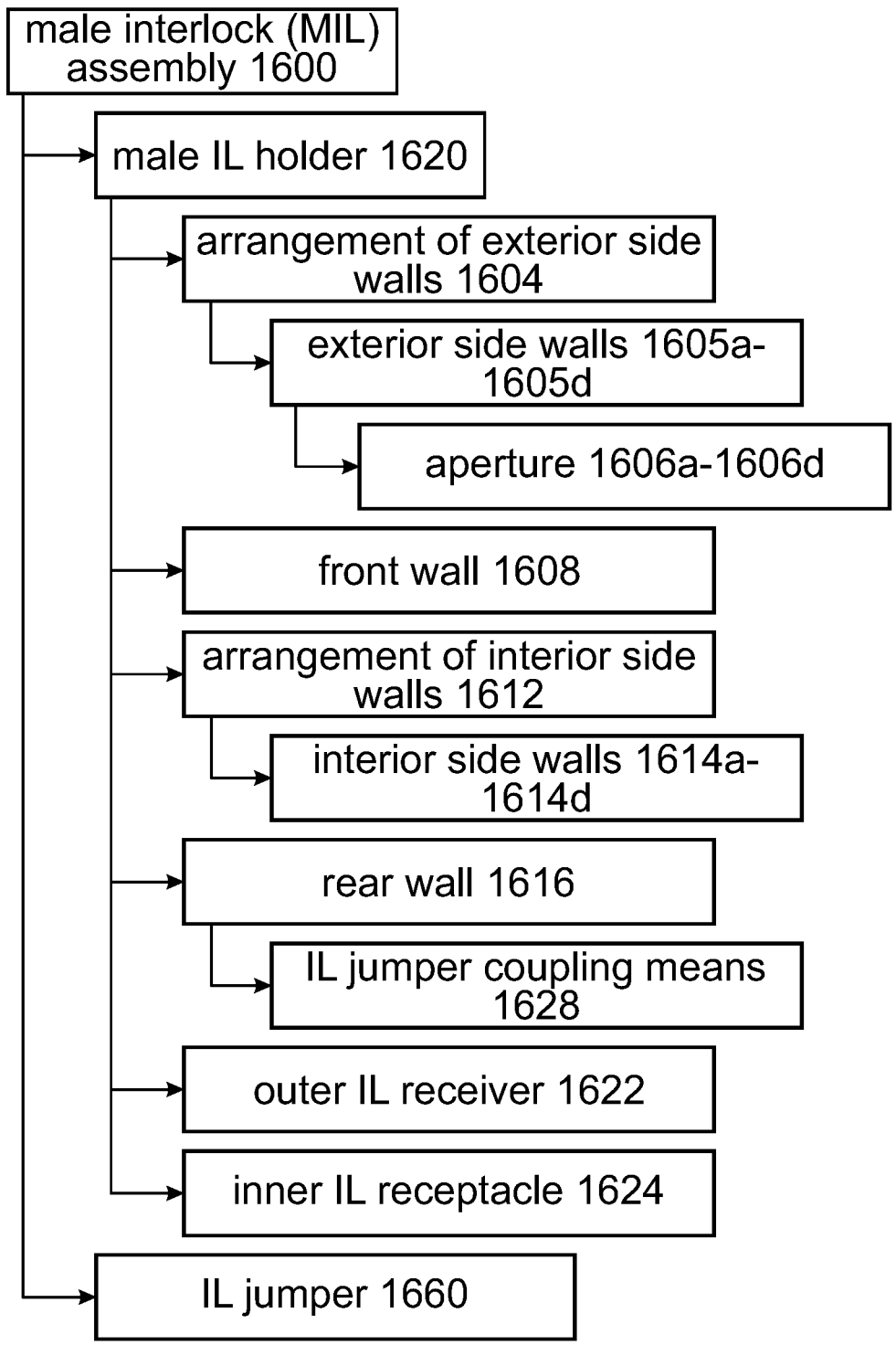
FIG. 82 is a block diagram showing components of the male interlock (MIL) assembly.
Figure 83:
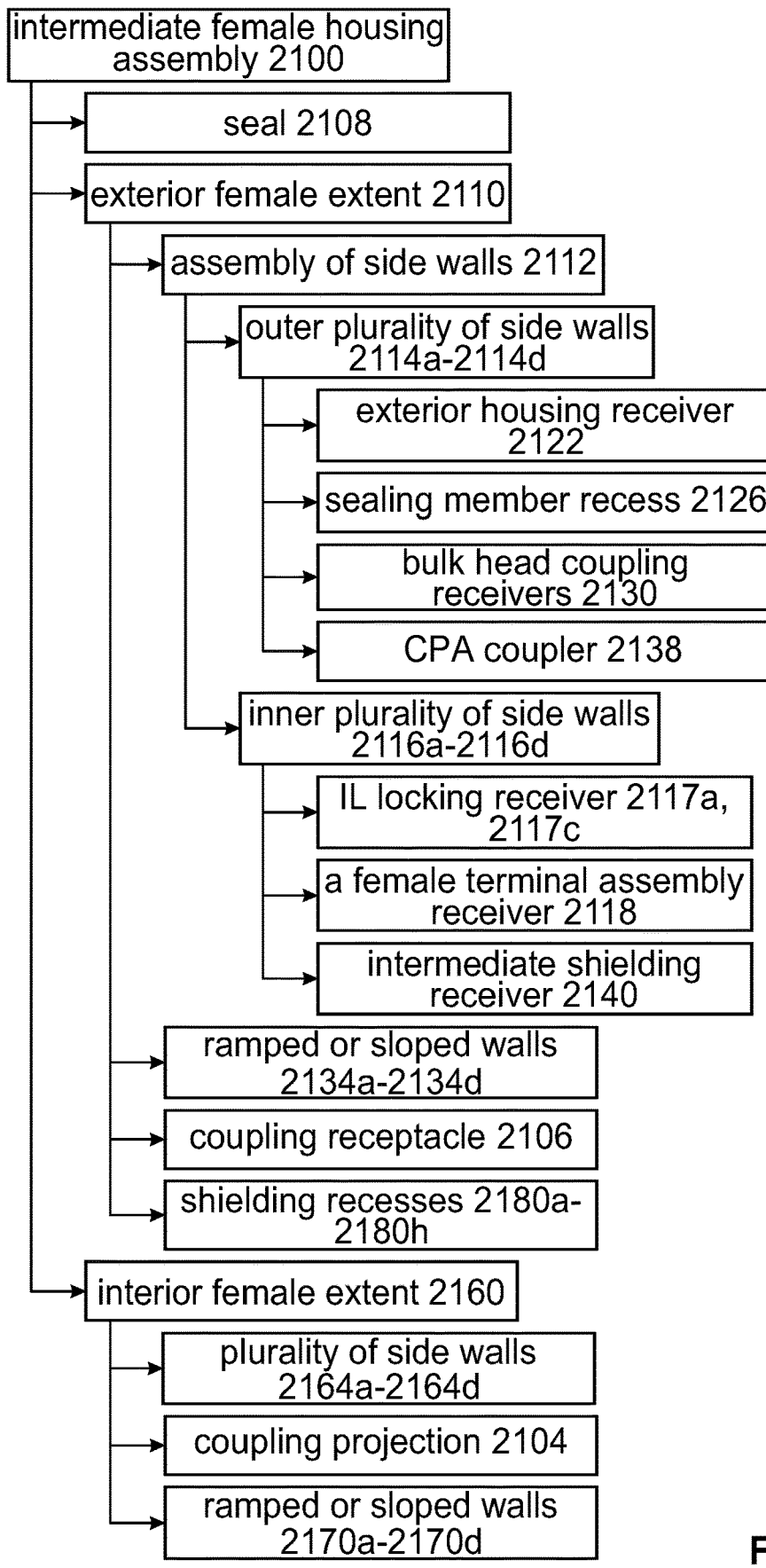
FIG. 83 is a block diagram showing components of the intermediate housing assembly.
Figure 84:
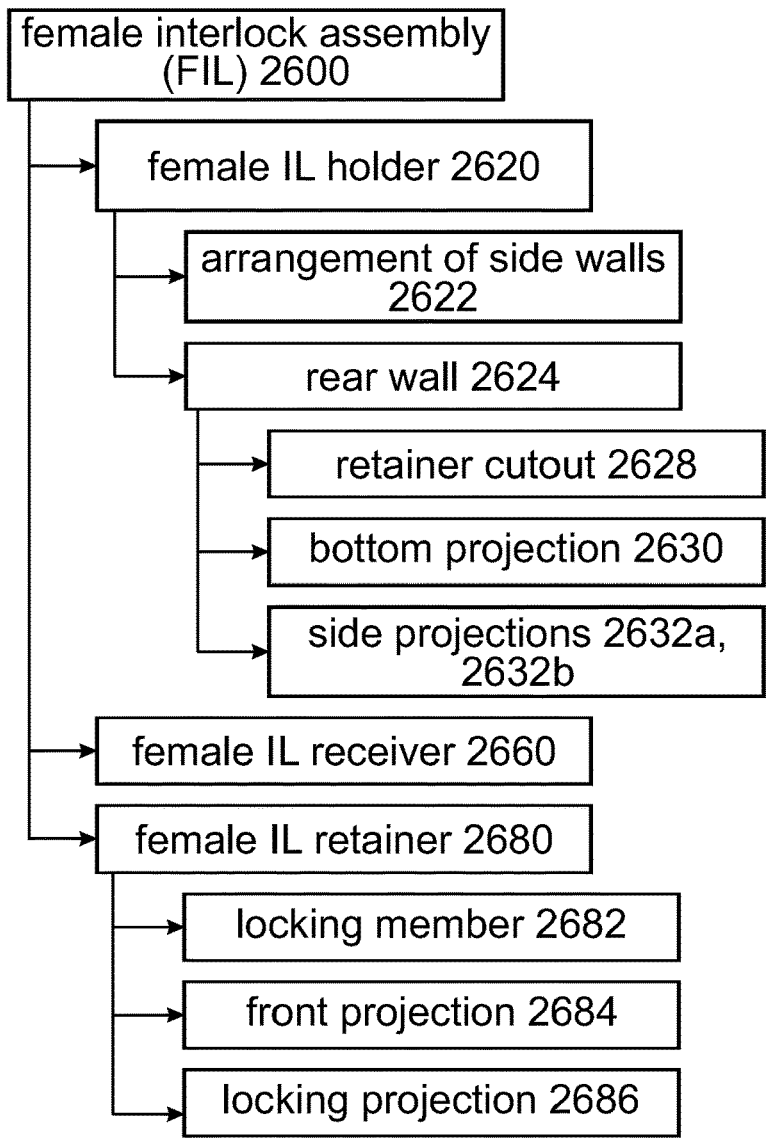
FIG. 84 is a block diagram showing components of the female interlock (FIL) assembly.
Figure 85:
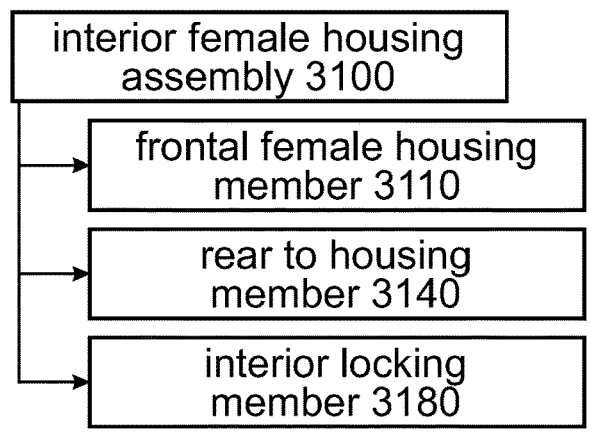
FIG. 85 is a block diagram showing components of the interior housing assembly.
Figure 86:
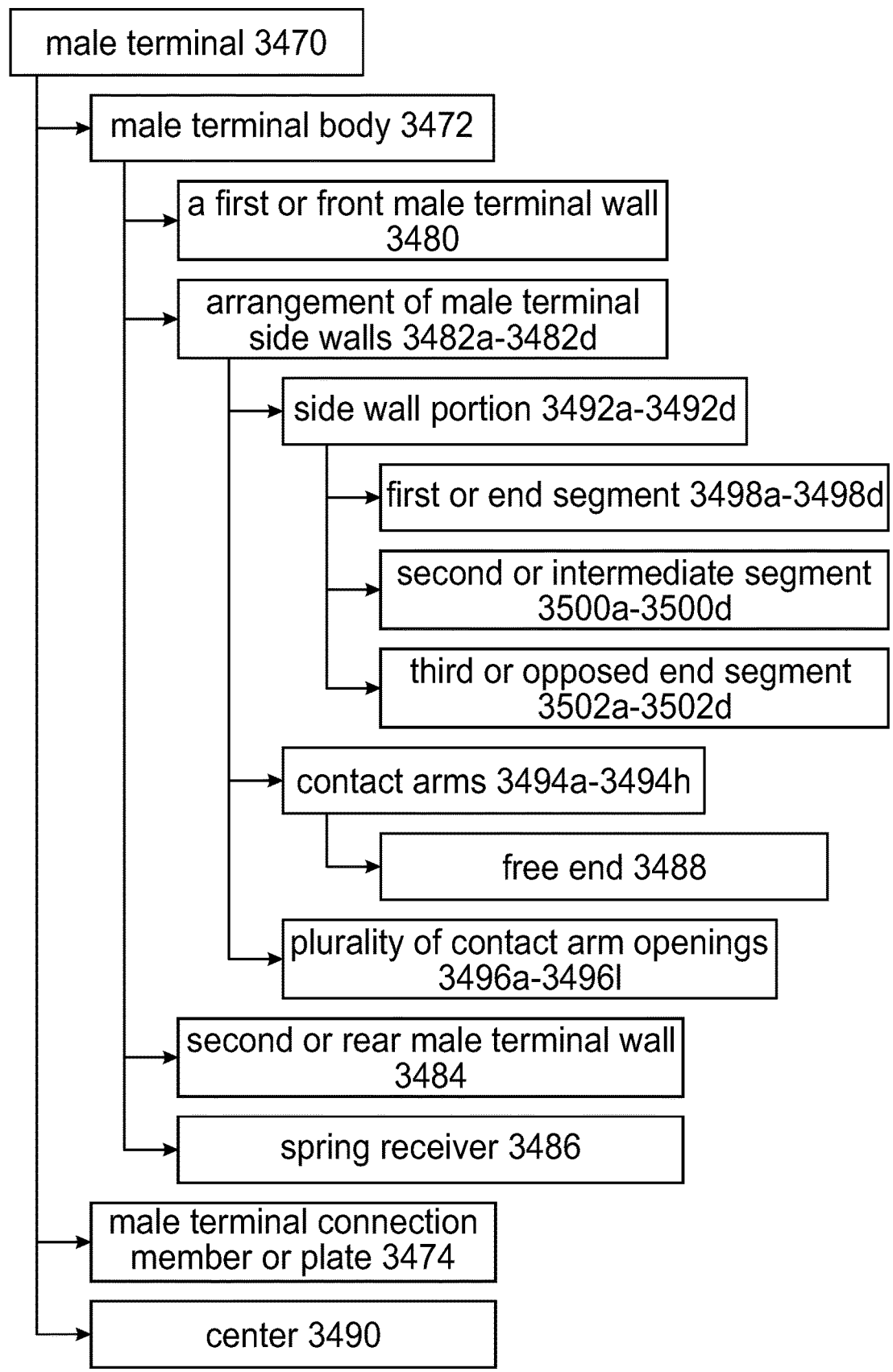
FIG. 86 is a block diagram showing components of the male terminal.
Figure 87:
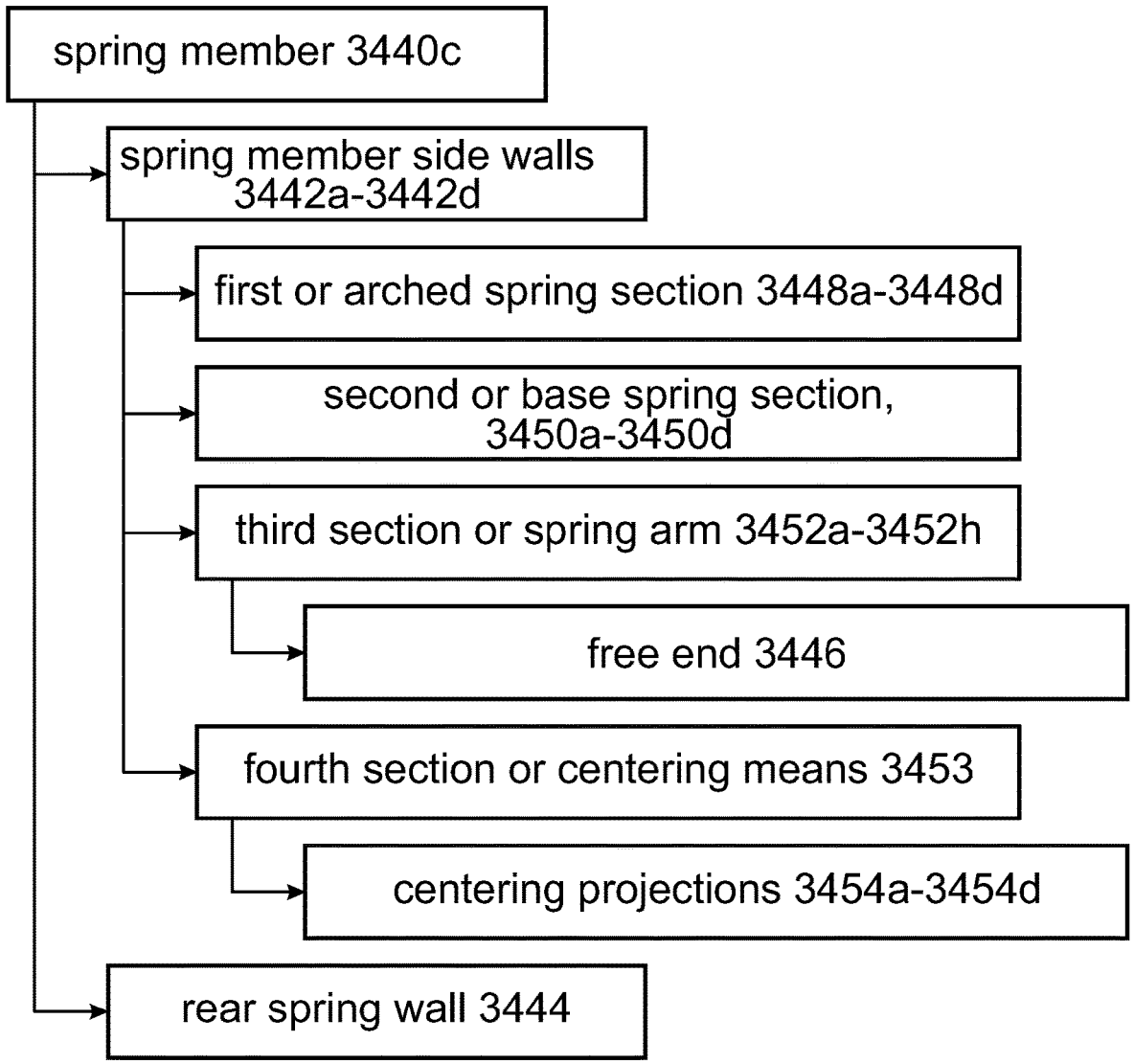
FIG. 87 is a block diagram showing components of the spring member.
Figure 88:
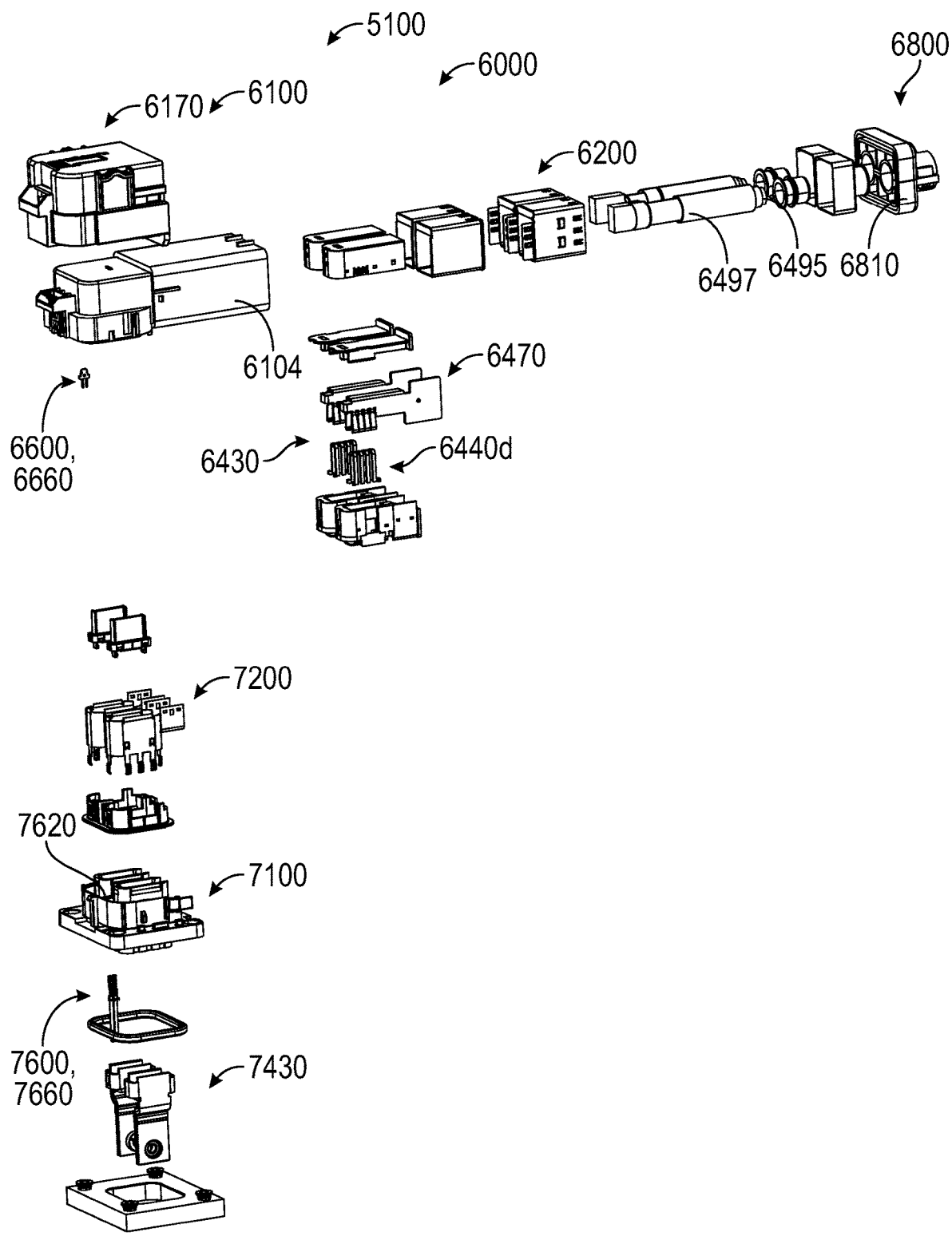
FIG. 88 is a perspective exploded view of a second embodiment of a connector system having a male connector assembly and a female connector assembly.

An exemplary application of the connector system 100 is shown in FIGS. 74-76, wherein the connector system 100 is used in connection with a battery pack 200 installed in a vehicle skateboard S, wherein the vehicle skateboard S is installed in vehicle V. The battery pack 200 (see FIG. 74) is configured to be positioned within the vehicle skateboard S (see FIG. 75), both of which are configured to be positioned within a motor vehicle 700 (see FIG. 76). In one embodiment, the connector system 100 may be designed such that second or male connector assembly 1000 is positioned external to the side wall 204 of the battery pack 200, the intermediate female connector assembly 2000 is designed to extend through the side wall 204 of the battery pack 200, and the first or male connector assembly 3000 is positioned within the side wall 204 of the battery pack 200. Other embodiments, configurations, and uses for the connector system 100 is described within this application and are contemplated by this disclosure.

Various aspects of the second embodiment of the connector system 5100 are disclosed herein. Specifically, the connector system 5100 is comprised of a male connector assembly 1000 and a female connector assembly 2000.

Figure 89:
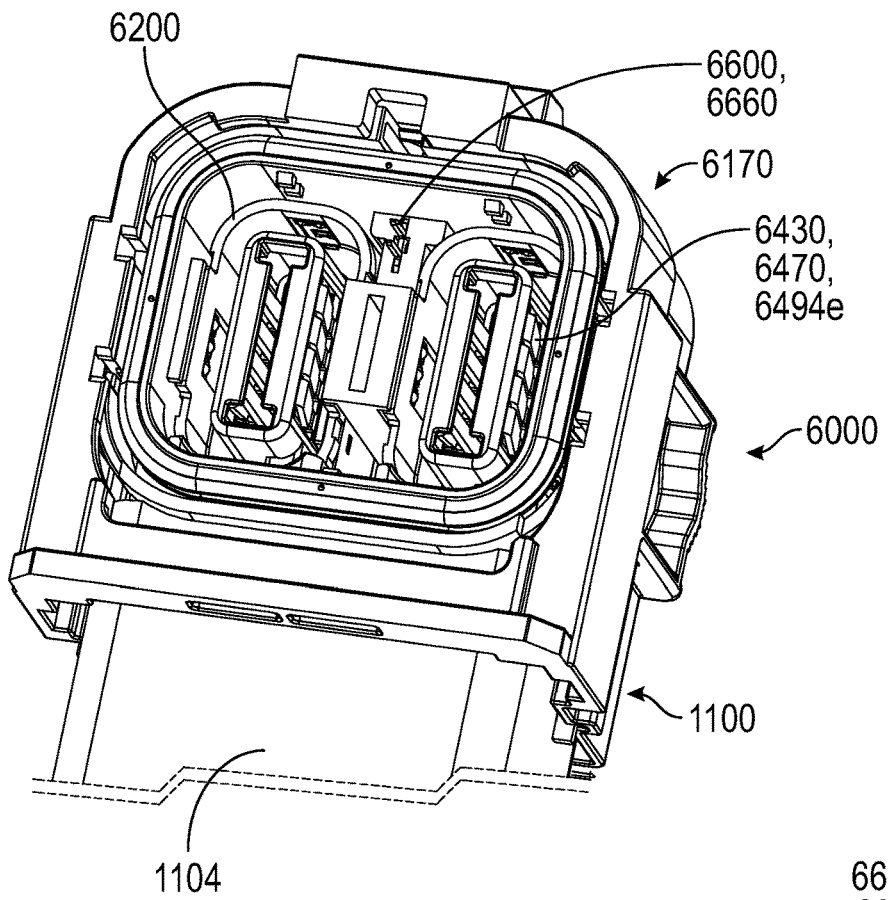
FIG. 89 is a perspective view of the male connector assembly of FIG. 88, wherein the male connector assembly is in a fully assembled state ($S_{FA}$)
Figure 90:
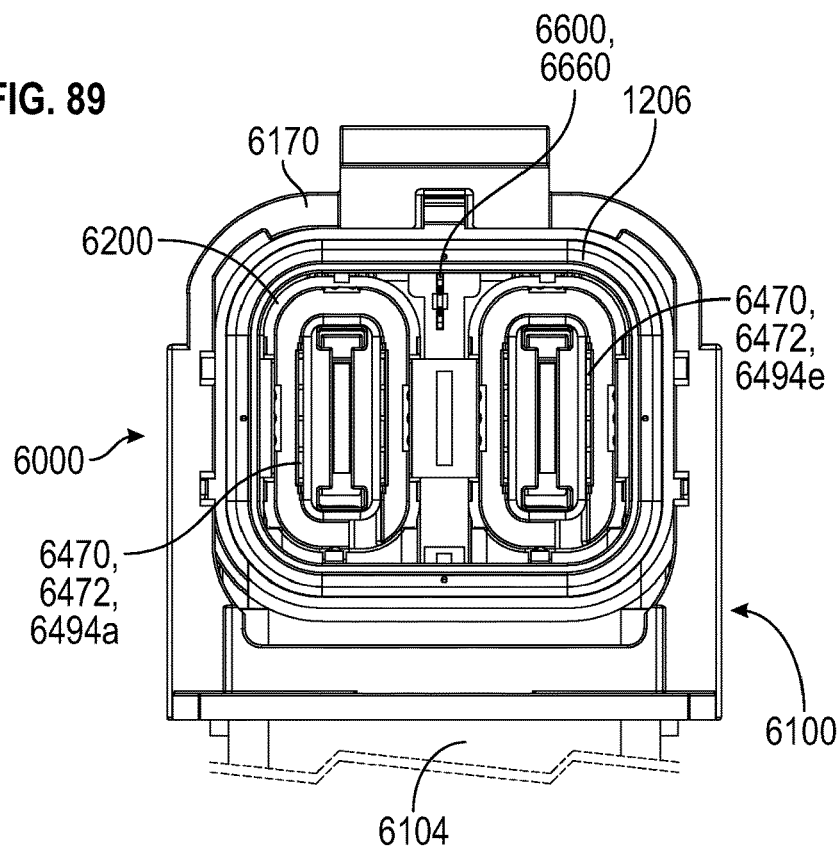
FIG. 90 is a front view of the male connector assembly of FIG. 88.
Figure 91:
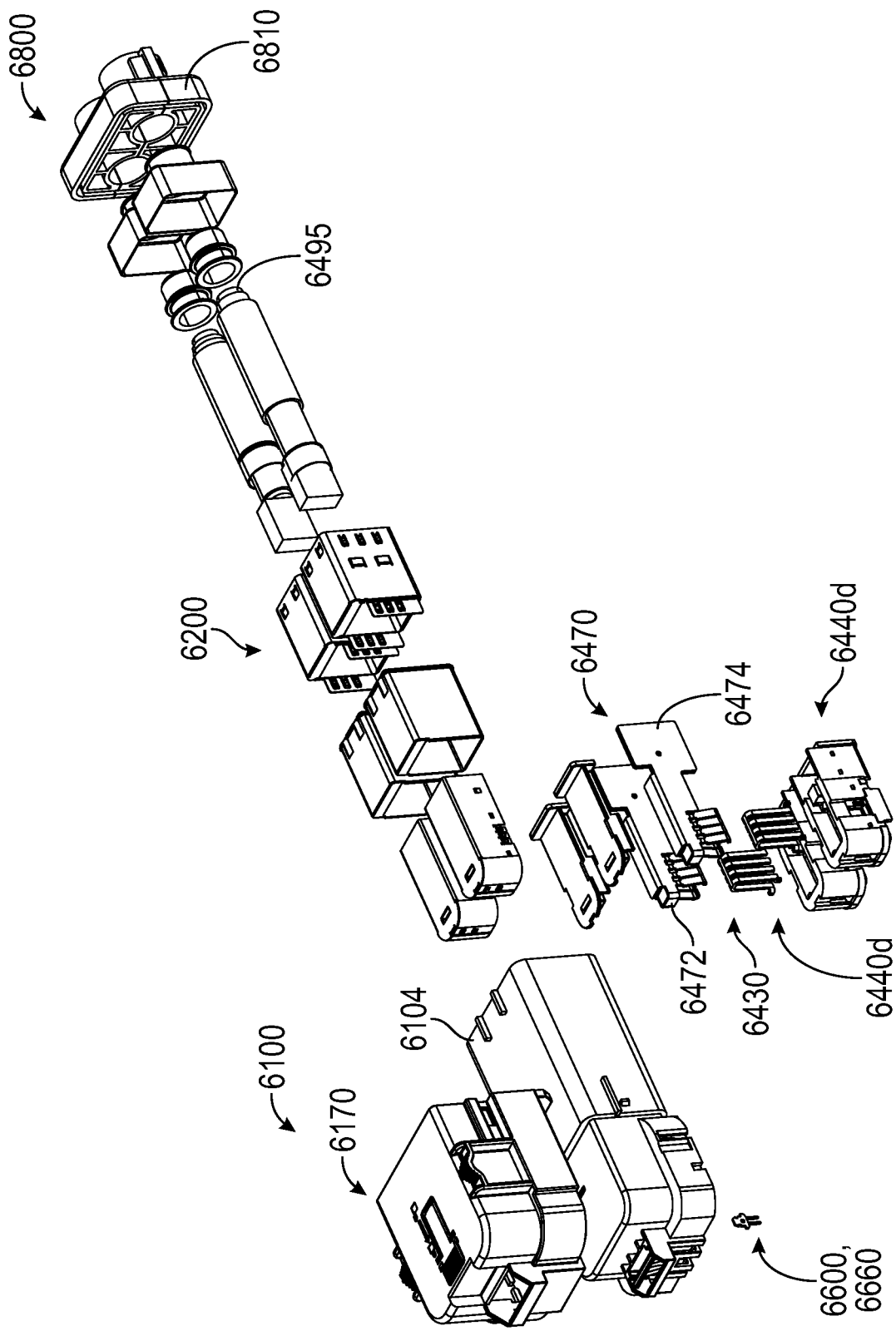
FIG. 91 is an exploded view of the male connector assembly of FIG. 88, wherein the male connector assembly has an male housing, an male interlock assembly and a plurality of male terminal assemblies.
Figure 95:
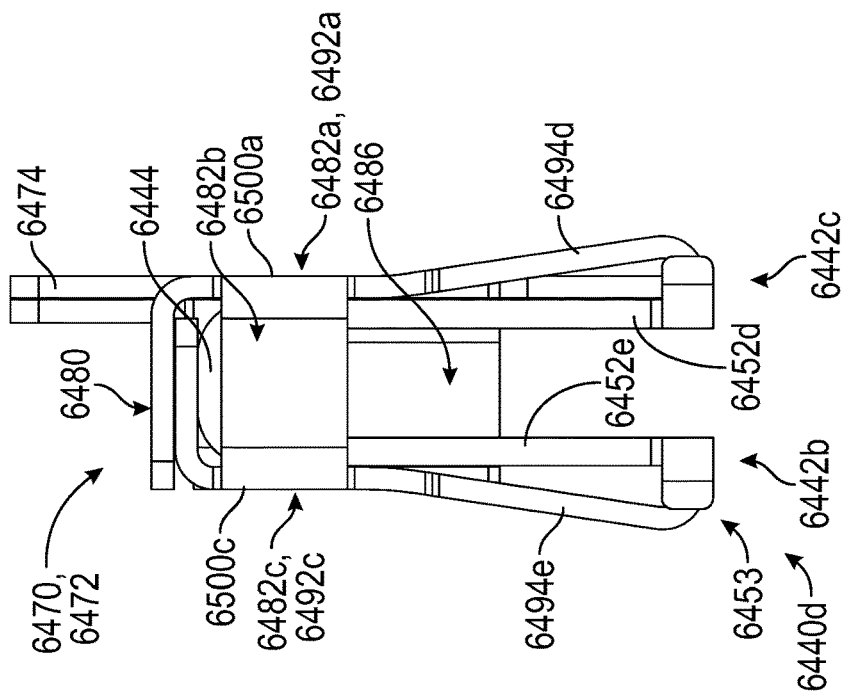
FIG. 95 is a top view of a male terminal assembly of FIG. 93.
Figure 94:
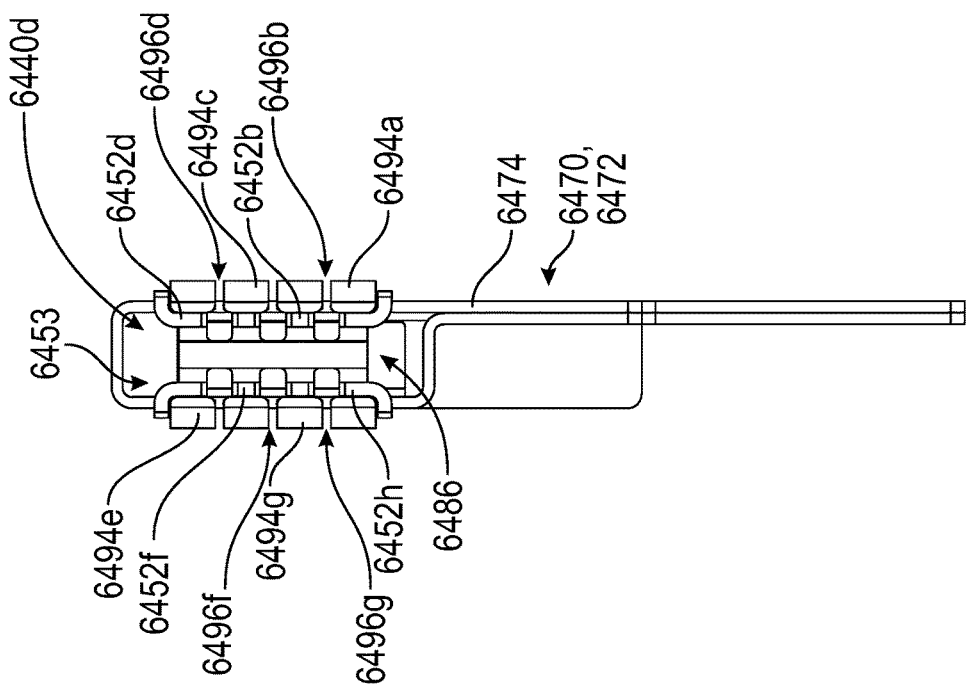
FIG. 94 is a front view of a male terminal assembly of FIG. 93.
Figure 99:
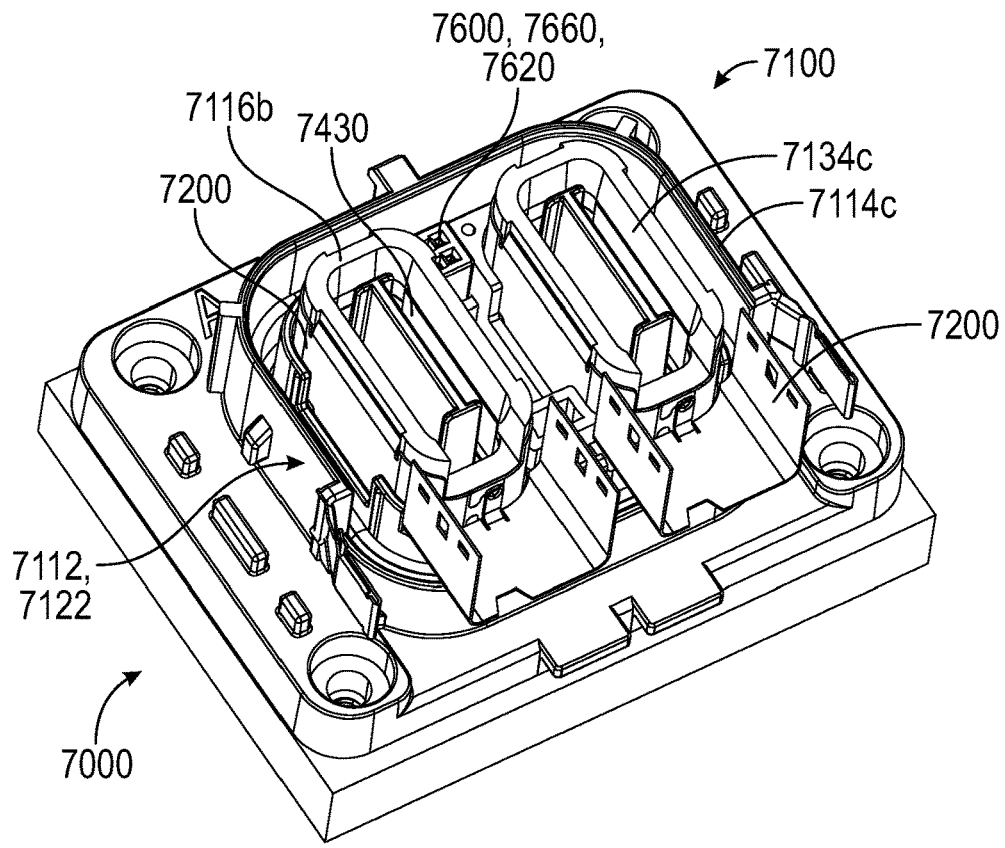
FIG. 99 is a perspective view of the female connector assembly of FIG. 88, wherein the female connector assembly is in a fully assembled state ($S_{FA}$)
Figure 100:
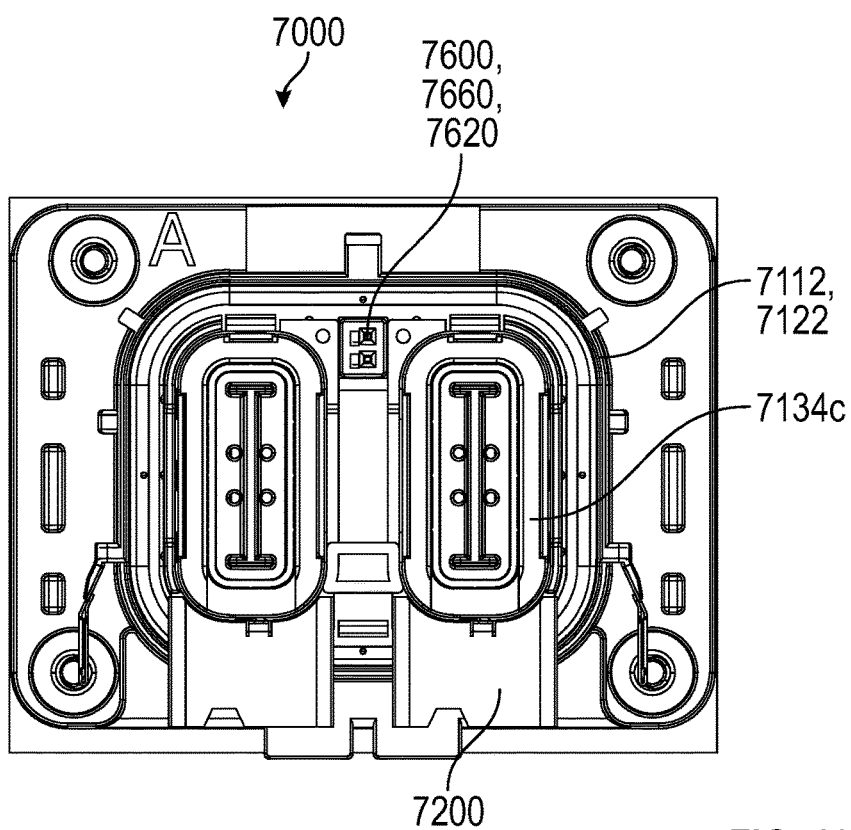
FIG. 100 is a front view of the female connector assembly of FIG. 99.
Figure 101:
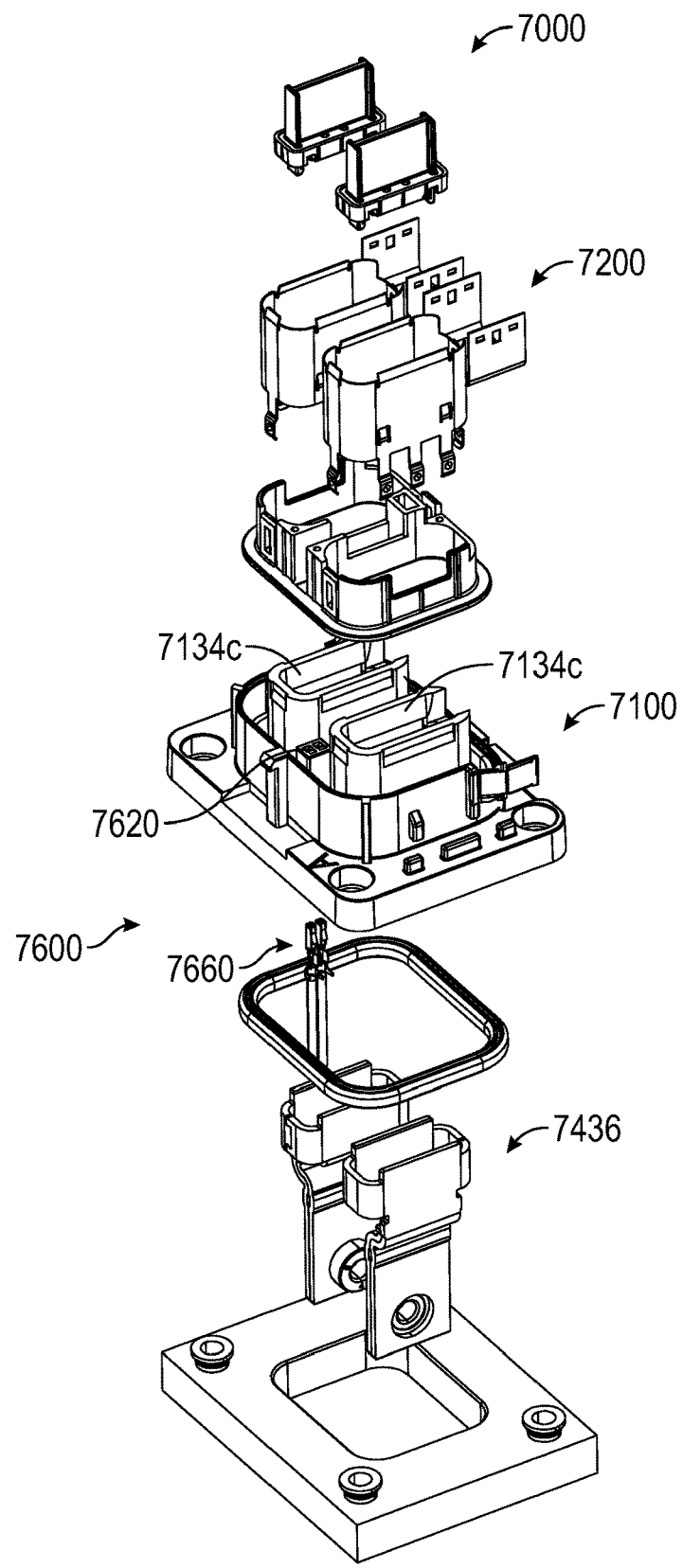
FIG. 101 is a exploded view of the female assembly of FIG. 88, wherein the female connector assembly has an female housing, an female interlock assembly and a plurality of female terminals.
Figure 102:
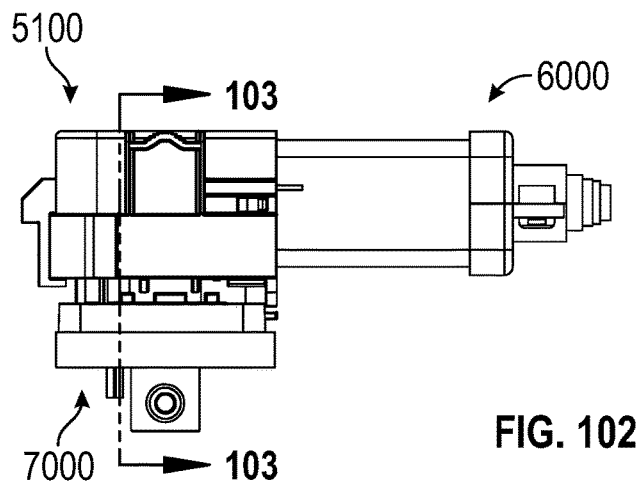
FIG. 102 is a side view of the connector system in a partially connected state ($S_{PCONN}$)
Figure 103:
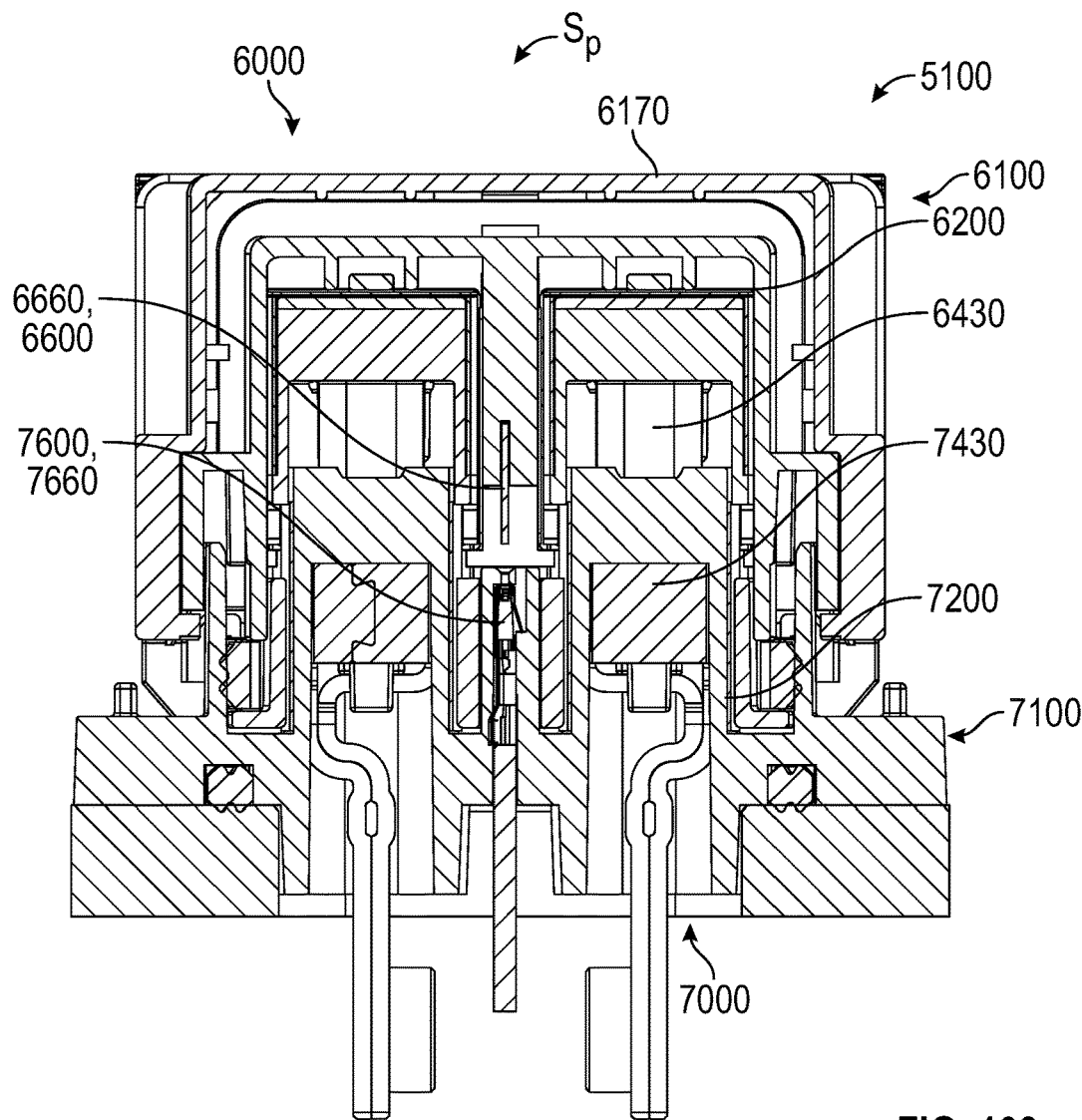
FIG. 103 is a cross-sectional view of the connector system taken along the 103-103 line of FIG. 102.
Figure 104:
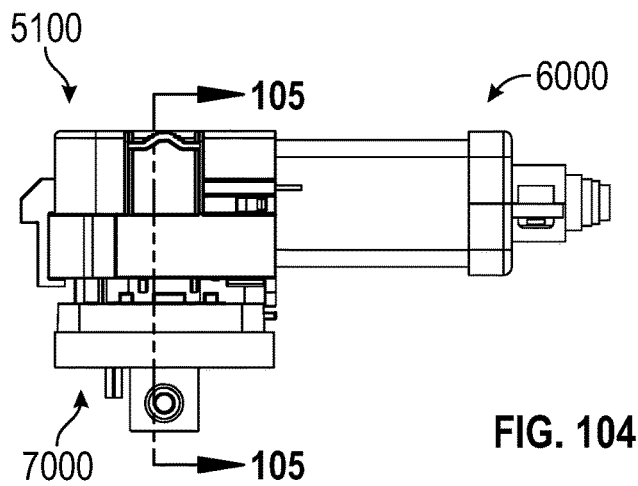
FIG. 104 is a side view of the connector system in a partially connected state ($S_{PCONN}$)
Figure 105:
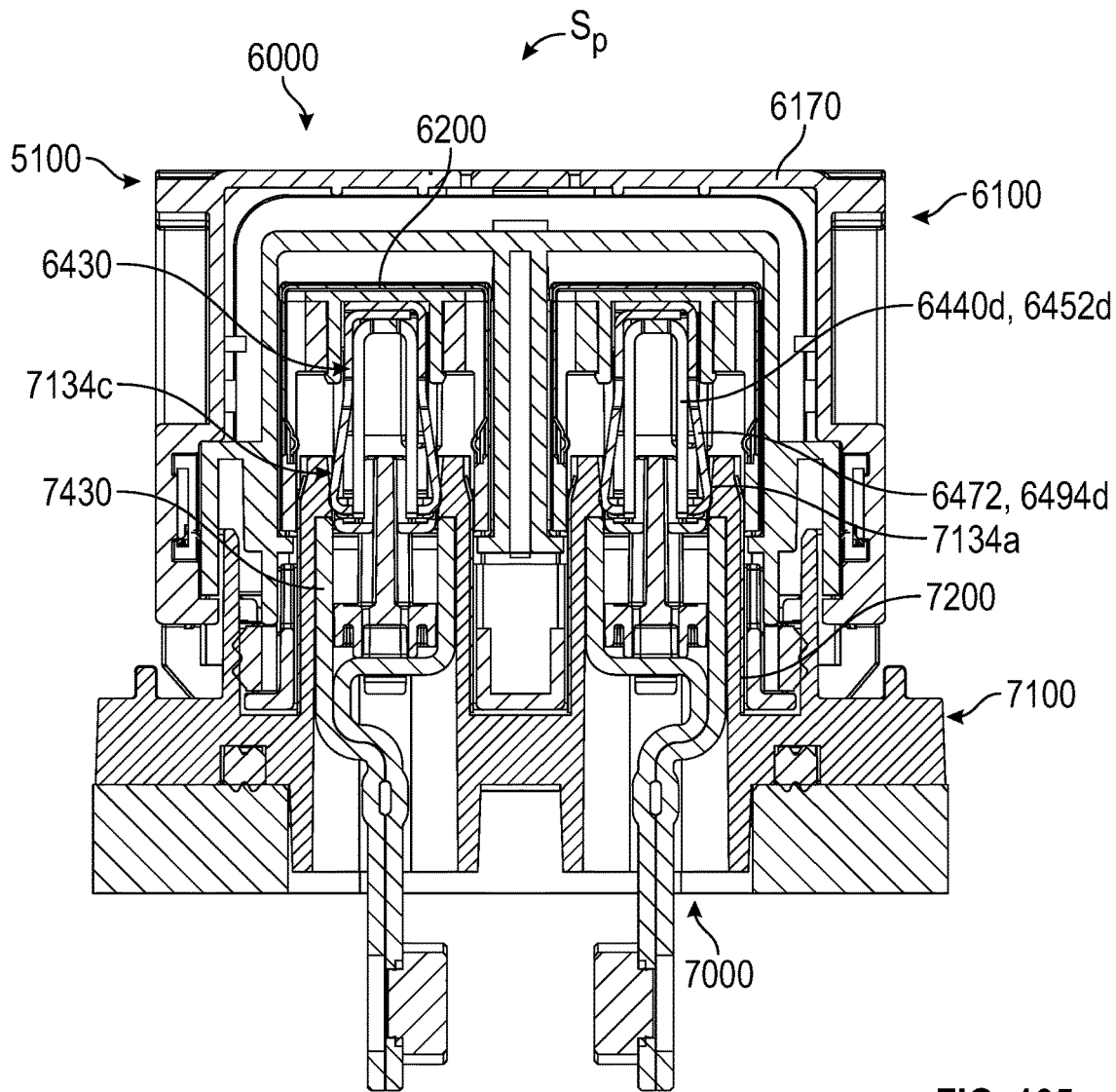
FIG. 105 is a cross-sectional view of the connector system taken along the 105-105 line of FIG. 104.
Figure 106:
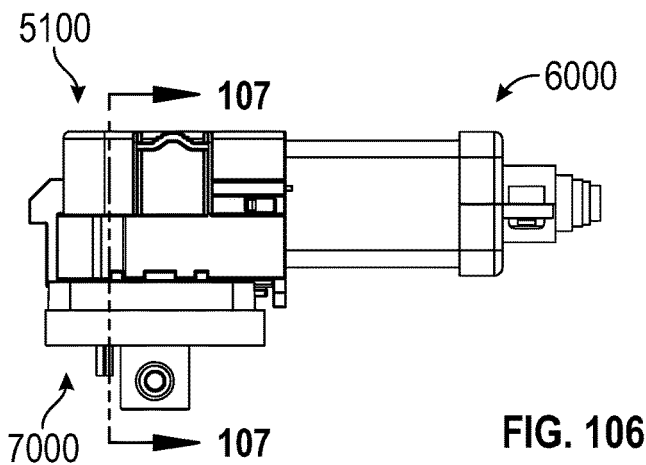
FIG. 106 is a side view of the connector system in a ready to use state ($S_R$)
Figure 107:
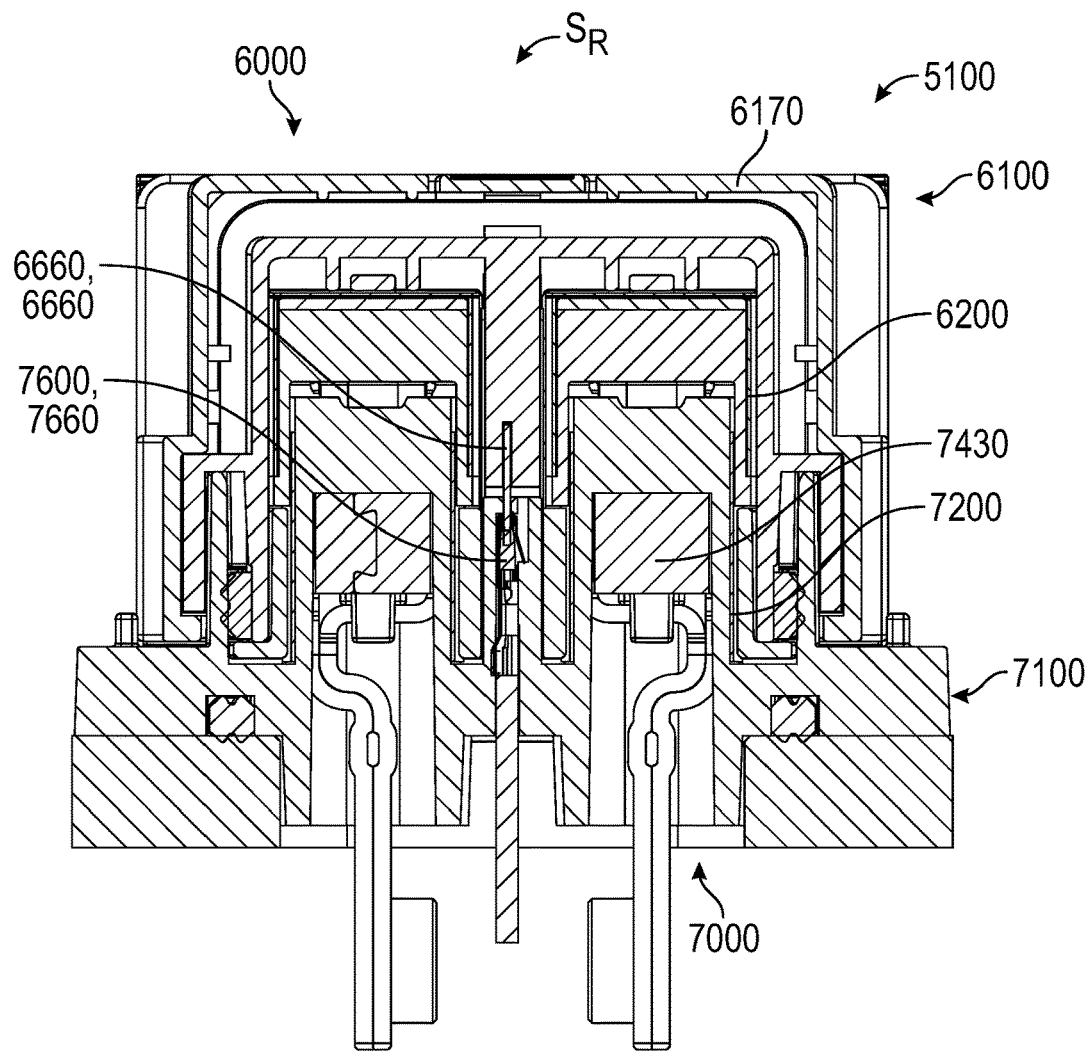
FIG. 107 is a cross-sectional view of the connector system taken along the 107-107 line of FIG. 106.
Figure 108:
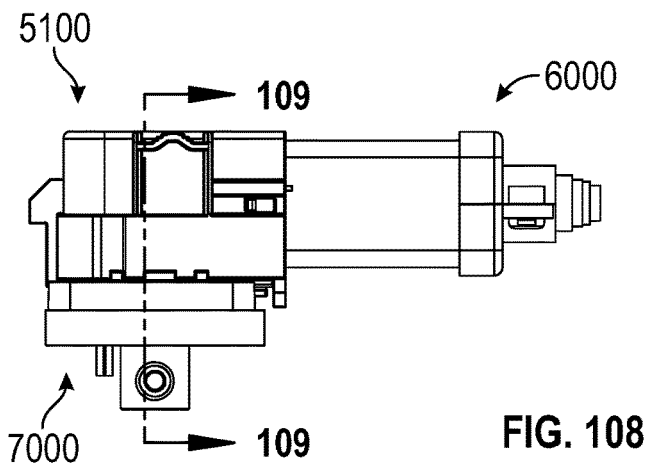
FIG. 108 is a side view of the connector system in a ready to use state ($S_R$)
Figure 109:
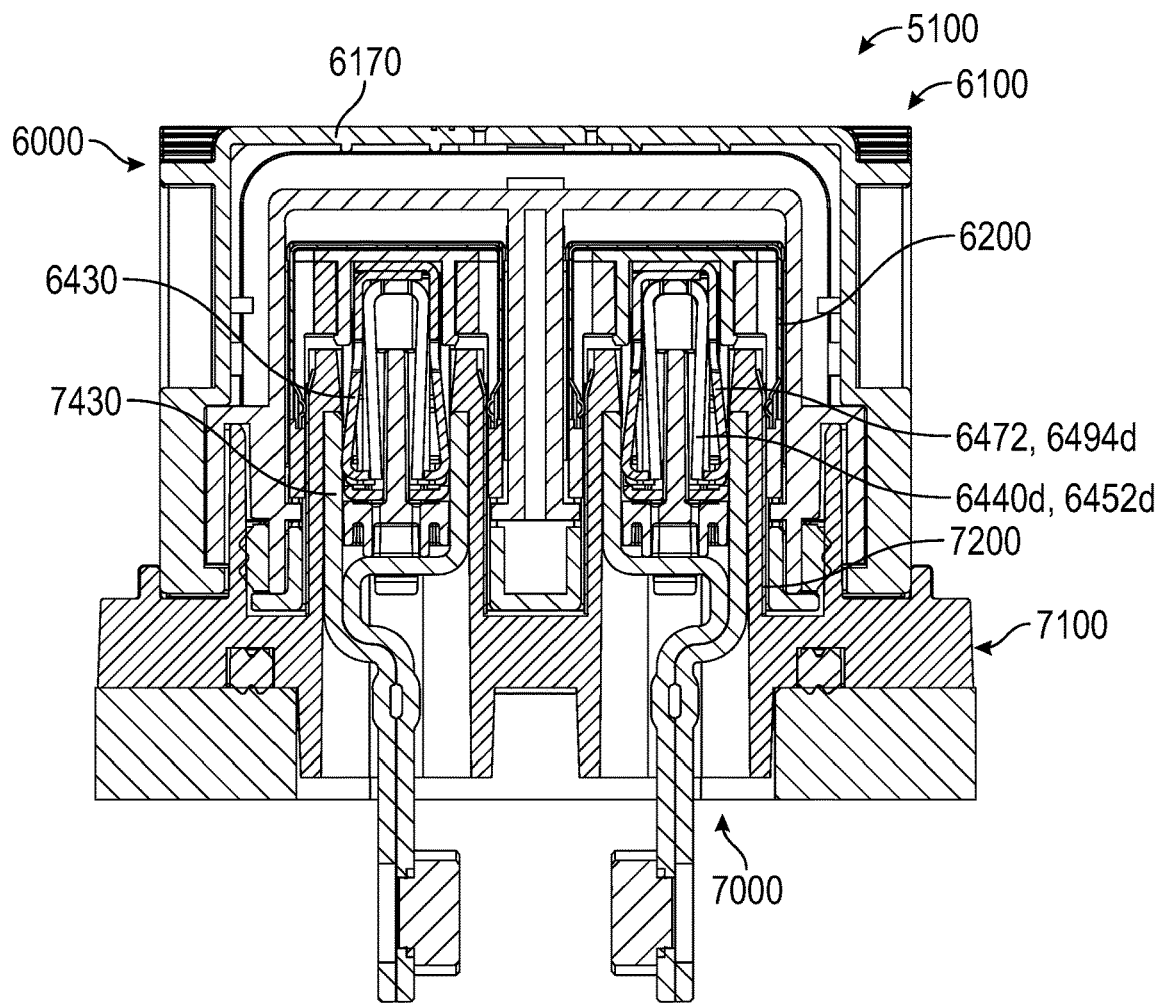
FIG. 109 is a cross-sectional view of the connector system taken along the 109-109 line of FIG. 108.

FIGS. 78-87 show various views and components of the male connector assembly 6000. The male connector assembly 6000 is primarily composed of: (i) a male housing assembly 6100, (ii) a male shielding assembly 6200, (iii) a plurality of male terminal assembly 6430—namely, a first and second terminal assemblies, (iv) a male interlock (MIL) assembly 6600, and (v) a strain relief assembly 6800;

FIGS. 89-91 show various views and components of the female connector assembly 7000. The female connector assembly 7000 is primarily composed of: (i) a female housing assembly 7100, (ii) a female shielding assembly 7200, (iii) a plurality of female terminal assemblies 7430, and (iv) a female interlock assembly (FIL) 7600; and FIGS. 91-98 show a progression of where the system 5100 moves from a partially connected state $S_{DCON}$ to a ready to use state $S_R$.

First Embodiment

As shown and discussed in greater detail in connection with FIGS. 2, 19, 25, 40, 41, and 46-74, IL system 4000 is comprised of a male interlock assembly (MIL) 1600, a female interlock assembly (FIL) 2600, and interlock circuitry 4010. Overall, the IL system 4000 is design help prevent arcing from occurring during the mating of the connector assembly 1000, 2000 capable of controlling the current supping device. To achieve this, the IL system 4000 prevents electrical current from being applied to a portion of the connector system 100, namely—the intermediate female connector assembly 2000—prior to the connector system being placed in the fully connected state ($S_{FCON}$) In particular, prior to the interaction between the MIL 1600 and the FIL 2600, a disconnect switch 4030 is placed in the off position; thus, preventing the flow of current from the power source 206 to the intermediate female connector assembly 2000. Once the MIL 1600 is connected with the FIL 2600, the disconnect switch 4030 is placed in the on position; thus, allowing the flow of current from the power source 206 to the intermediate female connector assembly 2000. However, it should be noted that, said interaction between the MIL and FIL 1600, 2600 does not occur until the male terminal assembly 1430 is fully engaged with the female terminal assembly 2430.

Typically, IL systems 4000 are utilized in connection with high voltage systems. As such, IL systems are typically referred to as high voltage interlocks, hazardous voltage interlock loop, or HVILs. This is due in part to the fact that damage is more likely to occur when a high voltage connector comes into contact with a foreign object then when a low voltage connector comes into contact with a foreign object. This likelihood of additional damage typically justifies the inclusion of conventional IL systems and the increase in size, weight and cost of the connector. In particular, the increase in size, weight, and cost is primarily due to the fact that the connector portions of the conventional IL systems cannot be positioned within conventional connectors due to the structural configuration of said conventional connector and therefore must be positioned somewhere within the connector housings. Unlike conventional ILs, the connector portions, namely—MIL, FIL 1600, 2600—of the IL system 4000 are positioned within the terminal 1430, 2100. Therefore, the size of the connector system 100 or the space required by the connector system 100 does not need to be increased. By limiting the impact of adding in an IL system 4000 into the component or environment, a designer can obtain the benefits of utilizing an IL system 4000 without the drawbacks that are traditionally associated with using IL systems. Therefore, the disclosed IL system 4000 herein can be justifiably used in additional applications that may include non-high voltage systems. As such, the disclosed interlock system 4000 may be called a low voltage interlock system (LIL), a high voltage interlock system (HVIL), and just an interlock system (IL).

1) Exterior Male Connector Assembly

The male connector assembly, second male connector assembly, or exterior male connector assembly 1000 is includes multiple components that are designed to be positioned external to the side wall 204 of the battery pack 200 and provide power outside of the battery pack 200 to an external device (e.g., radiator fan, heated seat, power distribution component, or another current drawing component). The exterior male connector assembly 1000 is primarily composed of: (i) the exterior male housing assembly 1100, (ii) the exterior male shielding assembly 1200, (iii) the exterior male terminal assembly 1430, (iv) the male interlock (MIL) assembly 1600, and (v) the strain relief assembly 1800.

The male housing assembly, second housing assembly, or exterior housing assembly 1100 encases or surrounds a substantial extent of the other components contained within the exterior male connector assembly 1000. The exterior housing assembly 1100 generally includes: (i) an exterior housing 1104 and (ii) connector position assurance ("CPA") member 1170. The exterior housing 1104 includes two arrangements of walls, wherein: (i) the first side wall arrangement 1106 has a cylindrical shape and is designed to receive an extent of the wire 1495 and (ii) the second side wall arrangement 1108 has a cubic shape and is designed to receive a substantial extent of the exterior male terminal assembly 1430. The first arrangement of side walls 1106 includes an exterior housing coupling means 1110 that is designed to interact with an exterior cap 1810 that will be discussed below and is a part of the strain relief assembly

1800. The second arrangement of walls 1108 includes a CPA receiver 1160 that extends from one of the walls 1108a and is designed to receive an extent of the CPA member 1170. The two arrangements of walls are typically formed from an insulating material that is designed to isolate the electrical current that flows through the exterior male connector assembly 1000 from other components. Additional details about the exterior housing assembly 1100 are described within PCT/US2019/36070.

The male shielding assembly, second shielding assembly, or exterior shielding assembly 1200 is configured to reside within the exterior housing 1104 and is designed to reduce the electromagnetic interference ("EMI") noise emitted by the other components of the exterior male connector assembly 1000. The exterior shielding assembly 1200 is comprised of multiple components, mainly: (i) a first extent of a shielding housing 1210, (ii) a second extent of a shielding housing 1230, and (iii) a shielding cap 1250. The first extent of the shielding housing 1210 includes an arrangement of side walls that have a rectangular configuration, wherein one of the side walls 1212a has a length that is shorter than the other side walls 1212b-d.

Figure 25:
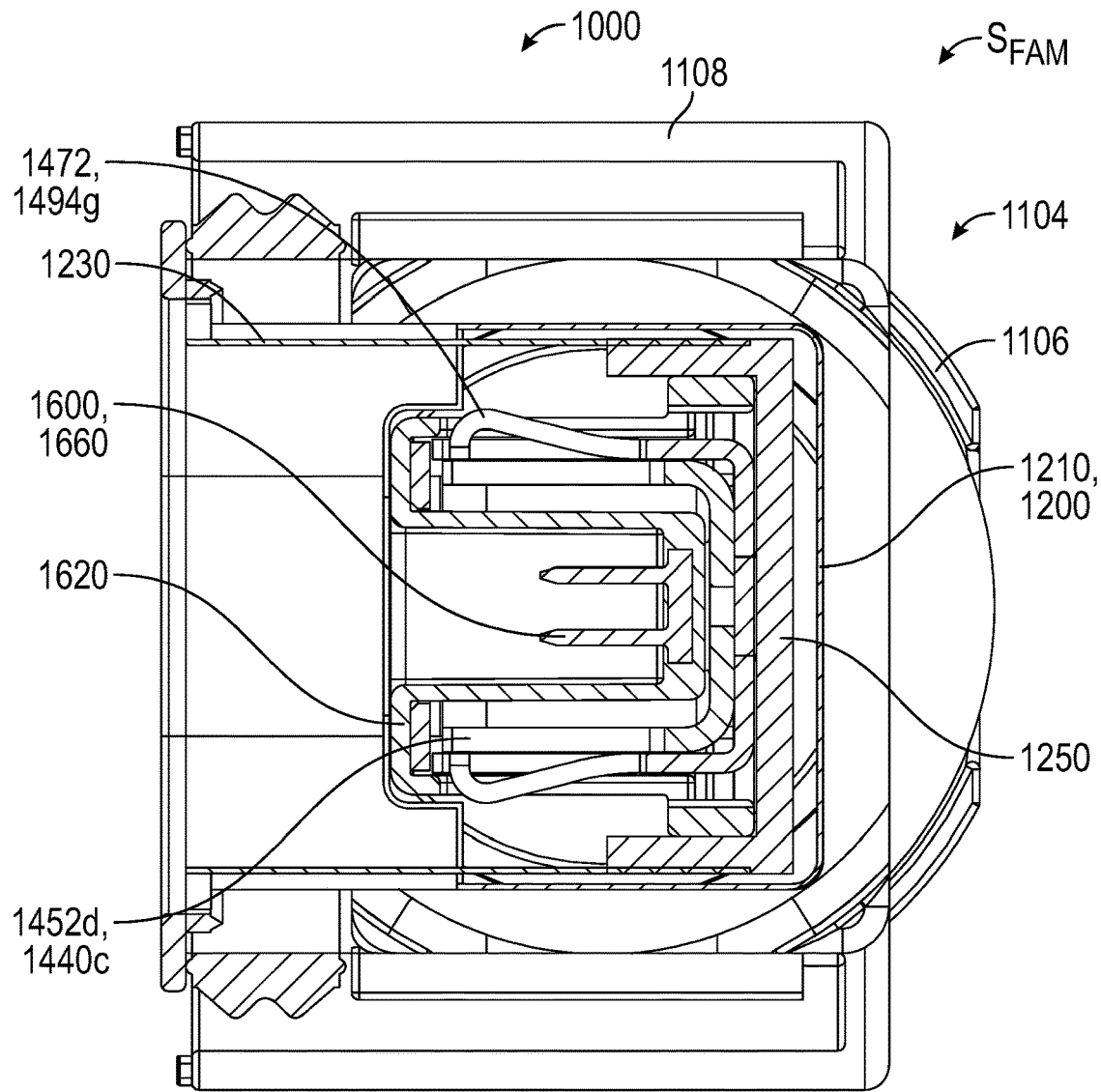
FIG. 25 is a cross-sectional view of the exterior male connector assembly taken along the 25-25 line of FIG. 24.
Figure 26:
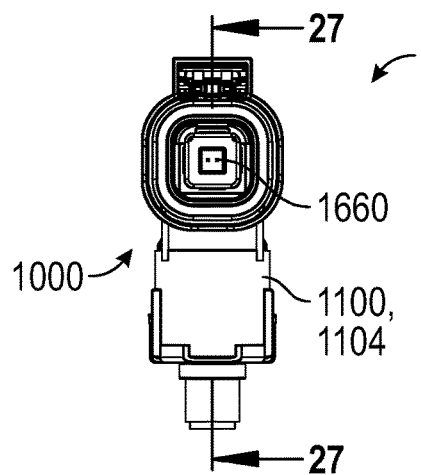
FIG. 26 is a front view of the exterior male connector assembly of FIG. 3, wherein the exterior male connector assembly is in a fully assembled state ($S_{FA}$)
Figure 27:
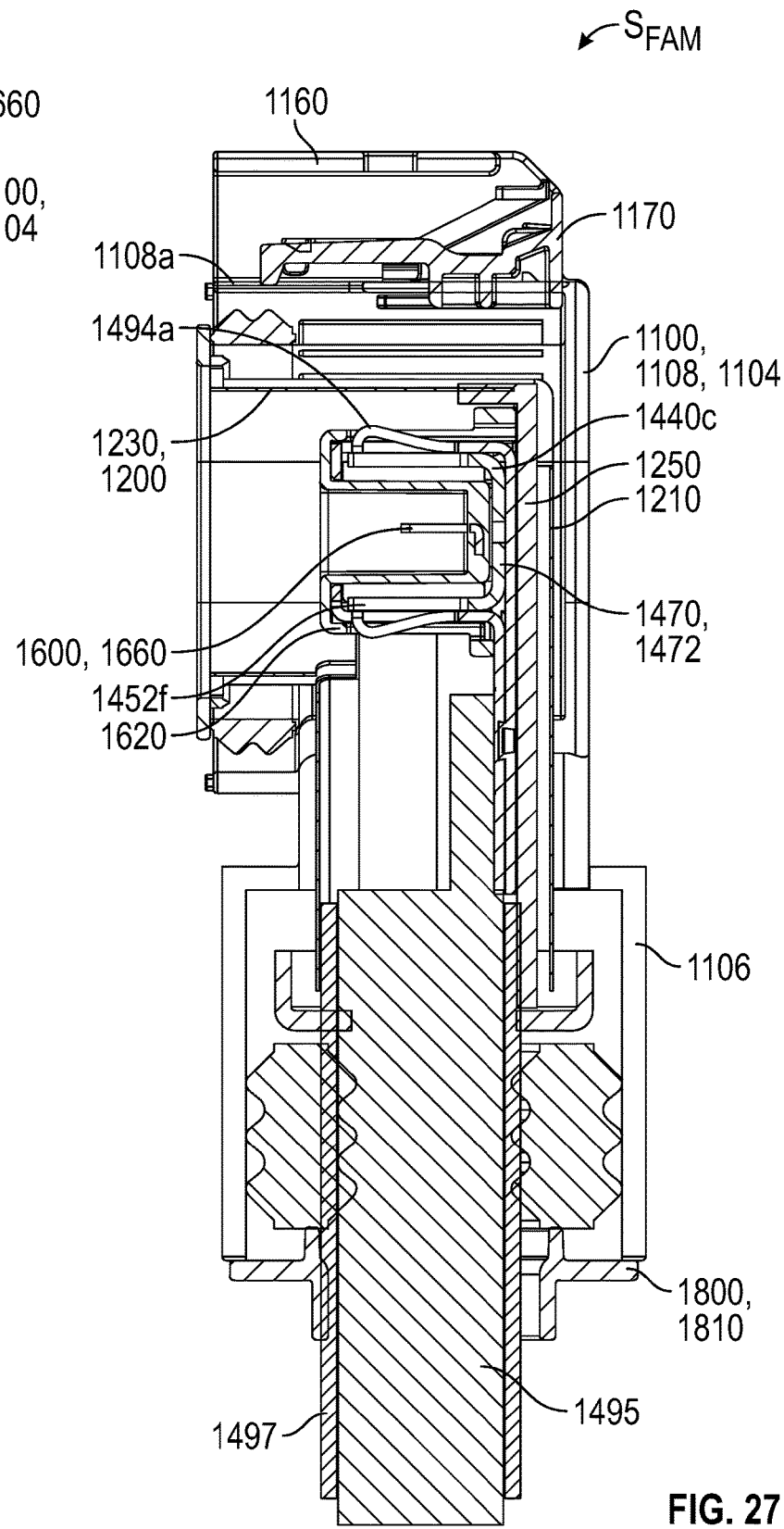
FIG. 27 is a cross-sectional view of the exterior male connector assembly taken along the 27-27 line of FIG. 15.
Figure 28:
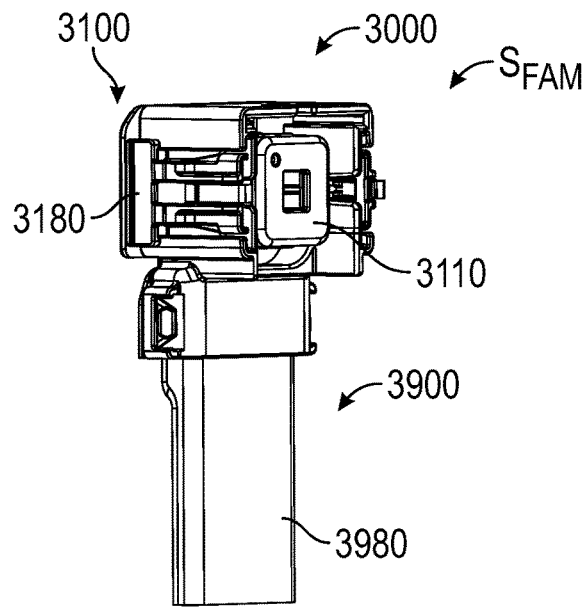
FIG. 28 is a perspective view of the interior male connector assembly of FIG. 1, wherein the interior male connector assembly is in a fully assembled state ($S_{FA}$)
Figure 29:
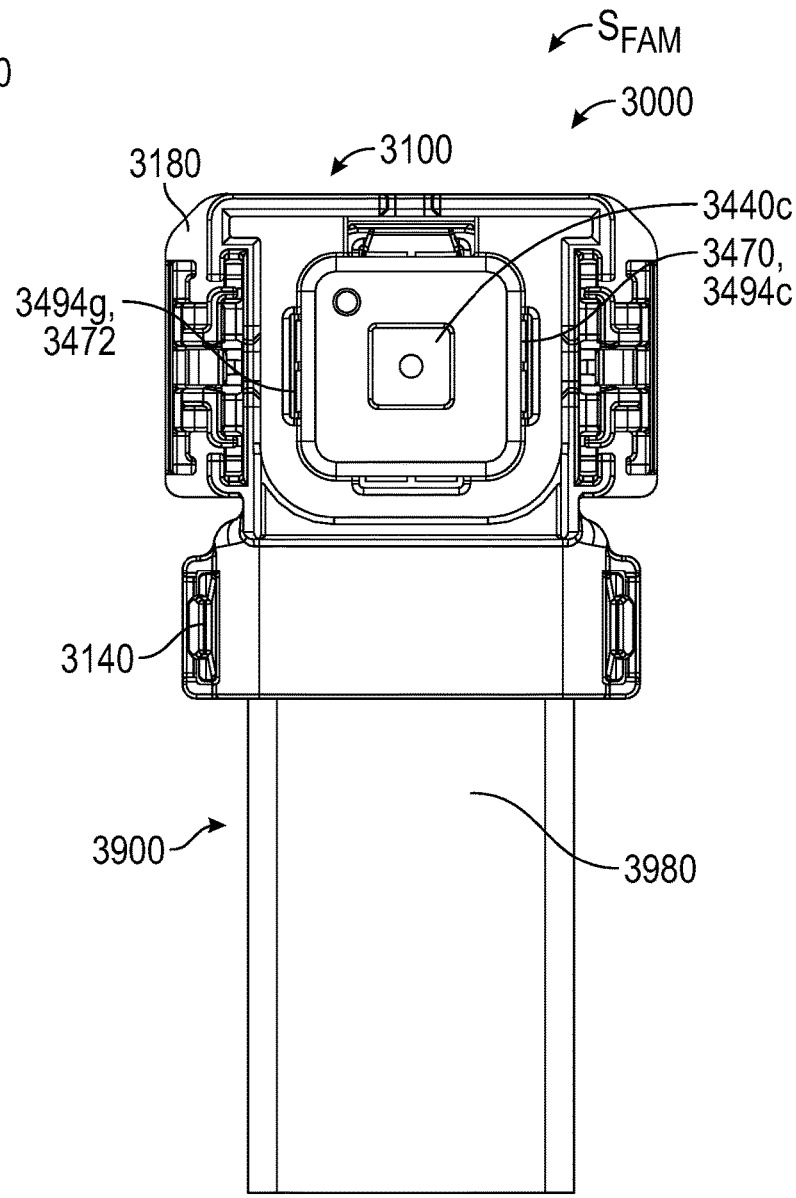
FIG. 29 is a front view of the interior male connector assembly of FIG. 28.
Figure 30:
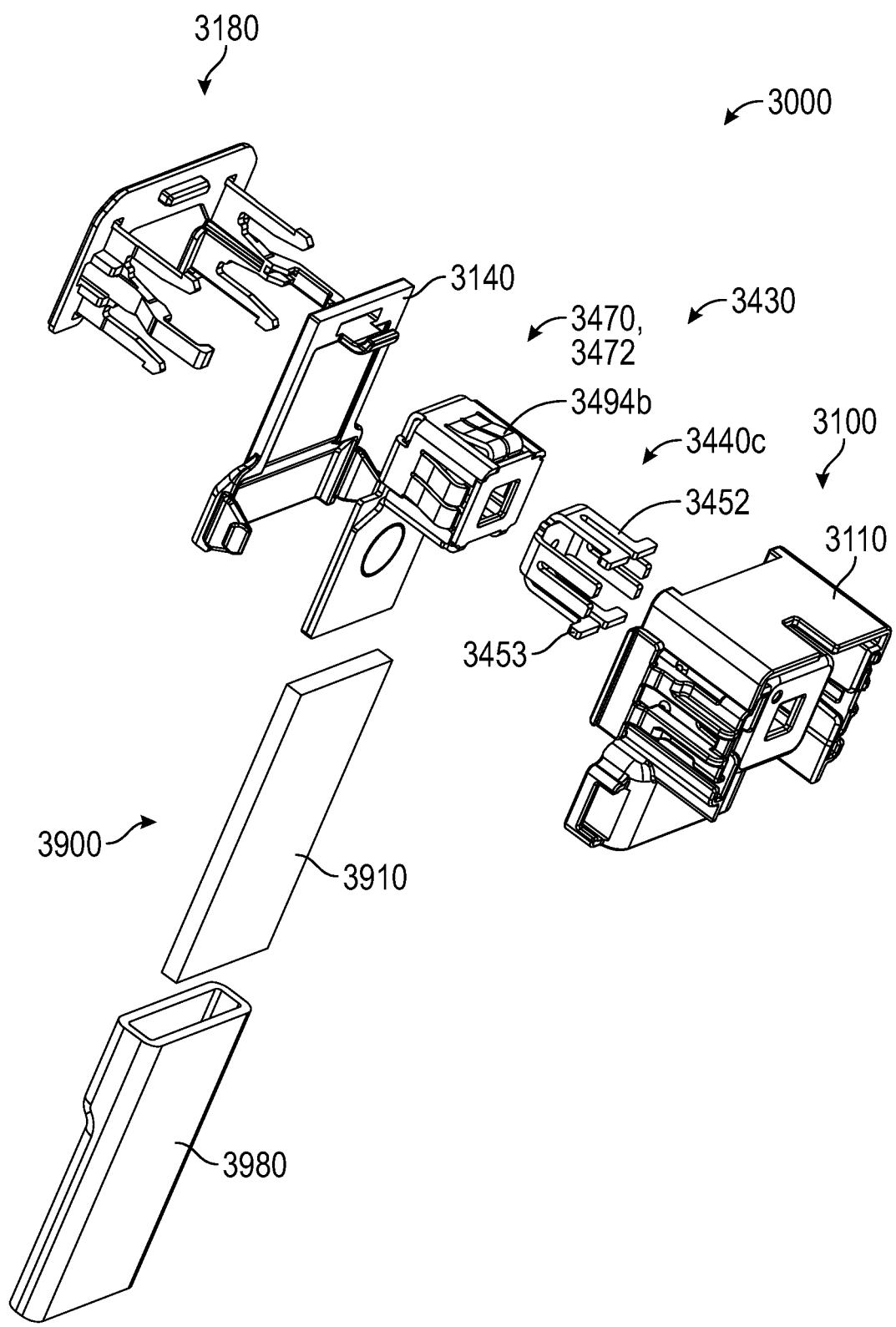
FIG. 30 is an exploded view of the interior male connector assembly of FIG. 28, wherein the interior male connector assembly has an interior housing and an interior terminal assembly.
Figure 31:
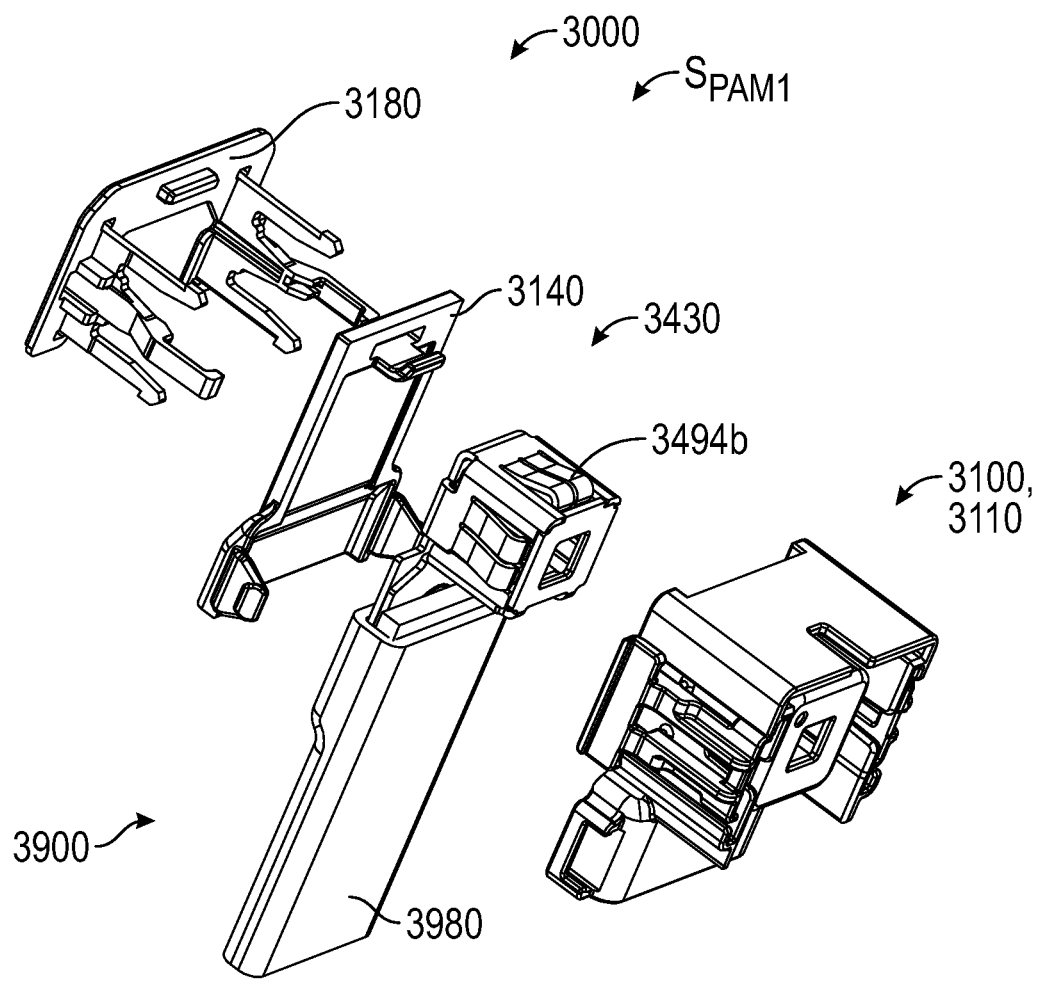
FIG. 31 is a perspective view of the interior male connector assembly of FIG. 28, wherein the interior male connector assembly is in a first partially assembled state ($S_{PA1}$)

As shown in FIGS. 25 and 27, the shielding cap 1250 is designed to receive portions of the first and second extents of the shielding housing 1210, 1230 to create a shielding receiver 1216. This three part assembly 1210, 1230, 1250 allows the exterior shielding assembly 1200 and the exterior male terminals assembly 1430 to be inserted within the exterior housing 1104. As such the first and second extents of a shielding housing 1210, 1230 are designed to be positioned between the exterior male terminal assembly 1430 and inside the exterior housing 1104. The first extent of the shielding housing 1210 primarily surrounds the wire 1495, while the second extent of the shielding housing 1230 primarily surrounds the exterior male terminal assembly 1430. The exterior shielding assembly 1200 is formed from a conductive material, such as metal. Other conductive materials that may be utilized are disclosed within PCT/US2020/13757.

FIGS. 2, 5-10, 15-22, 25, and 27 provide various views of the male terminal assembly, second male terminal assembly, or the exterior male terminal assembly 1430 for this first embodiment, while other embodiments of the exterior male terminal assembly are disclosed in PCT/US19/36010 and 63/058,061, both of which are incorporated herein by reference. Referring specifically to the first embodiment, the male terminal assembly 1430 includes a spring member 1440c and a male terminal 1470. The male terminal 1470 includes a male terminal body or second male terminal body 1472 and a male terminal connection member or plate 1474. Said male terminal body 1472 includes: (i) a first or front male terminal wall 1480, (ii) an arrangement of male terminal side walls 1482a-1482d, and (iii) a second or rear male terminal wall 1484. The combination of these walls 1480, 1482a-1482d forms a spring receiver 1486 that is designed to receive the internal spring member, male spring member, or second spring member 1440c.

Figure 6:
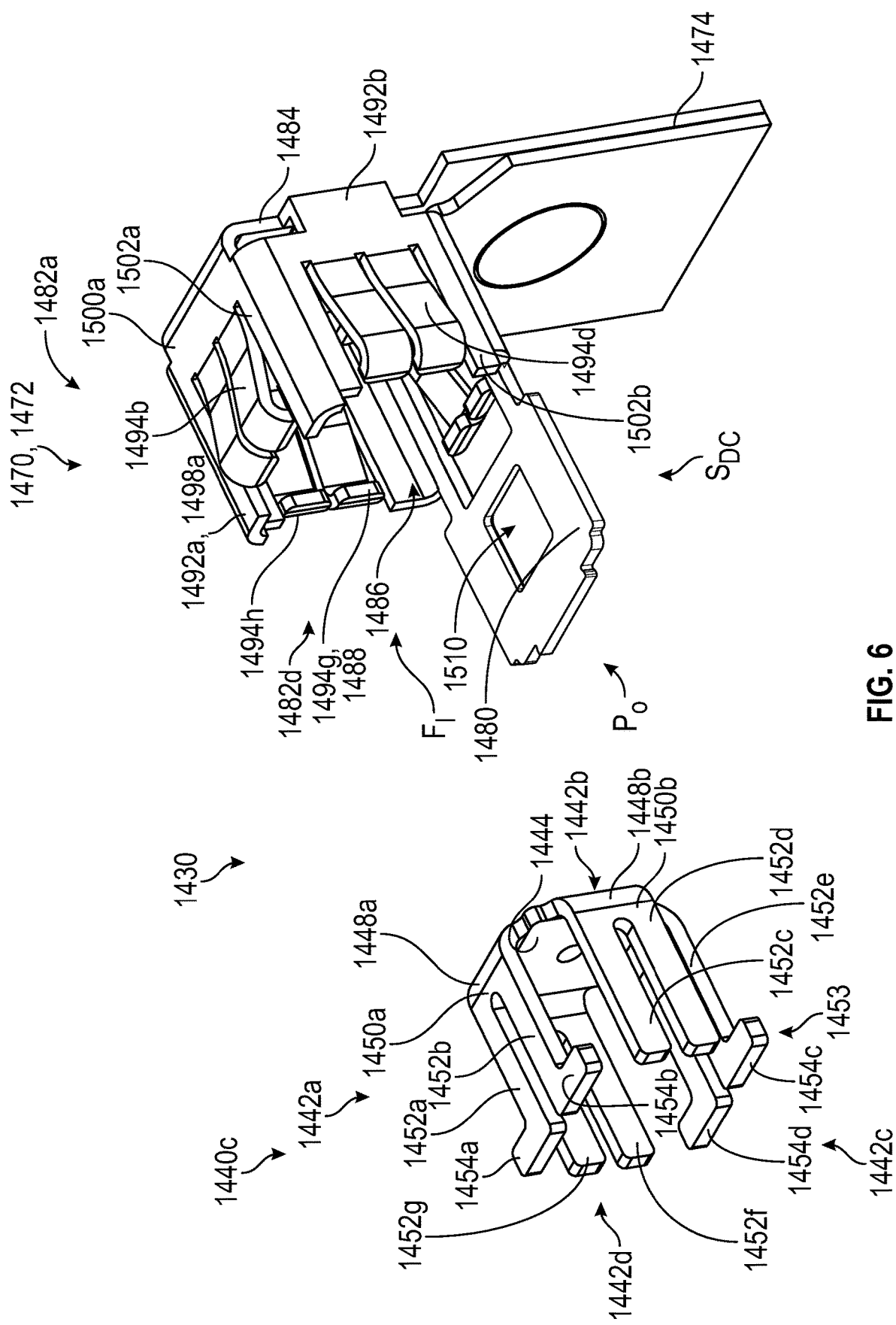
FIG. 6 is a perspective view of the exterior terminal assembly in a decoupled state ($S_{DC}$)

Referring to FIG. 6, the internal spring member 1440c includes an arrangement of spring member side walls 1442a-1442d and a rear spring wall 1444. The arrangement of spring member side walls 1442a-1442d each is comprised of: (i) a first or arched spring section 1448a-1448d, (ii) a second spring section, a base spring section, or a middle spring section 1450a-1450d, (iii) a third section or spring arm 1452a-1452h, and (iv) a forth section or centering means 1453. The arched spring sections 1448a-1448d extend between the rear spring wall 1444 and the base spring sections 1450a-1450d and position the base spring sections 1450a-1450d substantially perpendicular to the rear spring wall 1444. In other words, the outer surface of the base spring sections 1450a-1450d is substantially perpendicular to the outer surface of the rear spring wall 1444.

The base spring sections 1450a-1450d are positioned between the arched sections 1448a-1448d and the spring arms 1452a-1452h. As shown in FIG. 6, the base spring sections 1450a-1450d are not connected to one another and thus gaps are formed between the base spring sections 1450a-1450d of the spring member 1440c. The gaps aid in omnidirectional expansion of the spring arms 1452a-1452h, which facilitates the mechanical coupling between the male terminal 1470 and the female terminal assembly 2430. The spring arms 1452a-1452h extend from the base spring sections 1450a-1450d of the spring member 1440c, away from the rear spring wall 1444, and terminate at a free end 1446. The spring arms 1452a-1452h are generally planar and are positioned as such the outer surface of the spring arms 1452a-1452h are coplanar with the outer surface of the base spring sections 1450a-1450d. Unlike the spring arm 31 that is disclosed within FIGS. 4-8 of PCT/US2018/019787, the free end 1446 of the spring arms 1452a-1452h do not have a curvilinear component. Instead, the spring arms 1452a-1452h have a substantially planar outer surface. This configuration is beneficial because it ensures that the forces associated with the spring 1440c are applied substantially perpendicular to the free end 1488 of the male terminal body 1472. In contrast, the curvilinear components of the spring arm 31 are disclosed within FIGS. 4-8 of PCT/US2018/019787 do not apply a force in this manner.

Like the base spring sections 1450a-1450d, the spring arms 1452a-1452h are not connected to one another. In other words, there are spring arm openings that extend between the spring arms 1452a-1452h. This configuration allows for the omnidirectional movement of the spring arms 1452a-1452h, which facilitates the mechanical coupling between the male terminal 1470 and the female terminal assembly 2430. In other embodiments, the spring arms 1452a-1452h may be coupled to other structures to restrict their omnidirectional expansion. The number and width of individual spring arms 1452a-1452h and openings may vary. In addition, the width of the individual spring arms 1452a-1452h is typically equal to one another; however, in other embodiments one of the spring arms 1452a-1452h may be wider than other spring arms.

Figure 13:
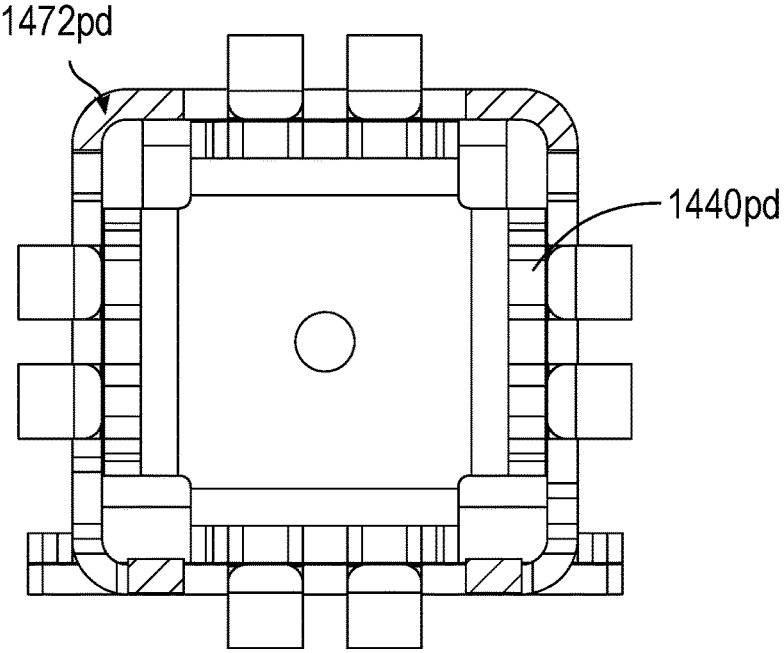
FIG. 13 is a frontal view of a cross-section of the terminal assembly taken along the 13-13 line of FIG. 12, wherein the spring member is properly seated within the terminal bodies' receiver.
Figure 14:
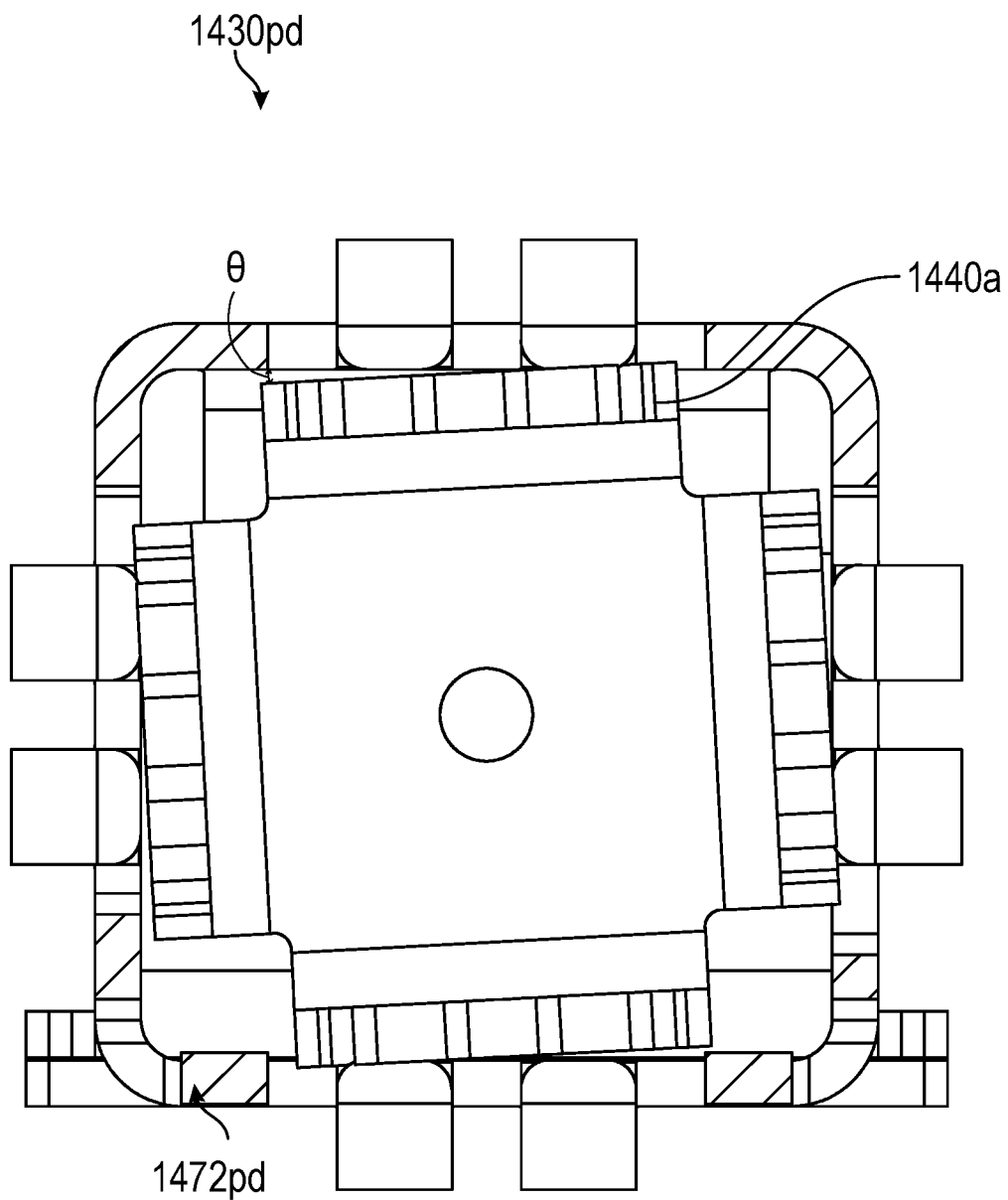
FIG. 14 is a frontal view of a cross-section of the terminal assembly taken along the 13-13 line of FIG. 12, wherein the spring member is not properly seated within the terminal bodies' receiver.

Referring to FIGS. 11-14, a previous design of the spring member 1440pd is disclosed in great detail in connection with FIGS. 5-6 of PCT/US2019/36127. FIG. 13 show how the spring member 1440pd may be perfectly aligned within the male terminal body 1472pd of the male terminal assembly 1430pd. However, due to manufacturing tolerances and imperfect assembly methods, the spring member 1440pd may become misaligned or cocked within the male terminal body 1472pd during assembly of the male terminal assembly 1430pd. An example of this misalignment is shown in FIG. 14, wherein angle theta θ shows this misalignment as it extends between the inner surface of the spring receive and the outer surface of the spring member 1440pd. In certain embodiments, angle theta θ may be between 1 degree and 5 degrees. In order to help avoid this misalignment, the spring member 1440c disclosed herein includes centering means 1453, which is shown as anti-rotation projections 1454a-1454d. The anti-rotation projections 1454a-1454d help center the spring member 1440c by limiting the amount the spring member 1440c can rotate within the male terminal body 1472 due to the interaction between the outer surface of the projections 1454*a*-1454*d* and an inner surface of the side wall portions 1492*a*-1492*d* of the male terminal body 1472.

Properly centering the spring member 1440*c* within the male terminal body 1472, provides many advantages over terminals that are not properly centered or aligned within the male terminal assembly 1430, wherein these advantages includes: (i) ensuring that the spring member 1440*c* applies a proper force on the male terminal body 1472 to provide a proper connection between the male terminal assembly 1430 and the female terminal assembly 2430, (ii) helps ensure that the MIL assembly 1600 is properly positioned to make contact with the FIL assembly 2600, when the terminal assemblies 1430, 2430 are connected to one another, and (iii) helps improve the durability and useable life of the terminal assemblies 1430, 2430, and (iv) other beneficial features that are disclosed herein or can be inferred by one of ordinary skill in the art from this disclosure. Without proper alignment of the spring member 1440*c*, the spring member 1440*c* can twist an extent of the MIL assembly 1600. Said twist of the MIL assembly 1600 may be sufficient to prevent the proper coupling of MIL assembly 1600 with the FIL assembly 2600, whereby the connector system 100 becomes inoperable.

It should be understood that is other embodiments the centering or alignment means 1453 may take other forms, such as: (i) projections that extend outward from the first and second spring arms 1452*a*, 1452*b* that are positioned within a single side wall, (ii) projections that extend outward from the first and fifth spring arms 1452*a*, 1452*e*, wherein the projections are situated diagonally opposite from one another, (iii) projections that extend outward from all spring arms 1452*a*-1452*h*, wherein the projections associated with 1452*c*, 1452*d*, 1452*g*, 1452*h* are offset positional relationship in comparison to the projections associated with 1452*a*, 1452*b*, 1452*e*, 1452*f*, (iv) projections that extend inward from the inside walls of the male terminal body 1472, (v) projections that extend inward towards the center of the connector from the contact arms 1494*a*-1494*h*, (vi) cooperative dimensioned spring retainer, (vii) projections, tabs, grooves, recesses, or extents of other structures that are designed to help ensure that the spring member 1440*c* is centered within the male terminal body 1472 and cannot rotate within the spring receiver 1486. For example, a projection may extent from the front or rear walls of the male terminal body 1472 and they may be received by an opening formed within the spring member 1440*c*.

It should further be understood that instead of utilizing a mechanical based centering or alignment means 1453, the centering means 1453 may be force based, wherein such forces that may be utilized are magnetic forces or chemical forces. In this example, the rear wall of the spring member 1440*c* may be welded to the rear wall of the male terminal body 1472. In contrast to a mechanical or force based centering means 1453, the centering means 1453 may be a method or process of forming the male terminal assembly 1430. For example, the centering means 1453 may not be a structure, but instead may simultaneous printing of the spring member 1440*c* within the male terminal body 1472 in a way that does not require assembly. In other words, the centering means 1453 may take many forms (e.g., mechanical based, force based, or process based) to achieve the purpose of centering the spring member 1440*c* within the male terminal body 1472.

The internal spring member 1440*c* is typically formed from a single piece of material (e.g., metal); thus, the spring member 1440*c* is a one-piece spring member 1440*c* or has integrally formed features. In particular, the following features are integrally formed: (i) the arched spring section 1448*a*-1448*d*, (ii) the base spring section 1450*a*-1450*d*, (iii) the spring arm 1452*a*-1452*h*, and (iv) the centering means 1453. To integrally form these features, the spring member 1440*c* is typically formed using a die forming process. The die forming process mechanically forces the spring member 1440*c* into shape. As discussed in greater detail below and in PCT/US2019/036010, when the spring member 1440*c* is formed from a flat sheet of metal, installed within the male terminal 1472 and connected to the female receptacle 2472, and is subjected to elevated temperatures, the spring member 1440*c* applies an outwardly directed spring thermal force $S_{TF}$ on the contact arms 1494*a*-1494*h* due in part to the fact that the spring member 1440*c* attempts to return to a flat sheet. However, it should be understood that other types of forming the spring member 1440*c* may be utilized, such as casting or using an additive manufacturing process (e.g., 3D printing). In other embodiments, the features of the spring member 1440*c* may not be formed from a one-piece or be integrally formed, but instead formed from separate pieces that are welded together.

In an alternative embodiment that is not shown, the spring member 1440*c* may include recesses and associated strengthening ribs. As discussed in PCT/US2019/036010, these changes to the configuration of the spring member 1440*c* alter the forces that are associated with the spring 1440*c*. In particular, the spring biasing force $S_{BF}$ is the amount of force that is applied by the spring member 1440*c* to resist the inward deflection of the free end 1446 of the spring member 1440*c* when the male terminal assembly 1430 is inserted within the female terminal assembly 2430. Specifically, this inward deflection occurs during the insertion of the male terminal assembly 1430 due to the fact that an extent of an outer surface of the male terminal body 1472 is slightly larger than the interior of the female receptacle 2472. Thus, when the male terminal assembly 1430 is inserted into the female terminal assembly 2430, the extent of the outer surface is forced towards the center 1490 of the male terminal 1470. This inward force on the outer surface displaces the free end 1446 of the spring member 1440*c* inward (i.e., towards the center 1490). The spring member 1440*c* resists this inward displacement by providing a spring biasing force SF.

FIGS. 2, 5-10, 15, 20-22, 25, 27 show a male terminal, second male terminal, exterior male terminal 1470 that includes the male terminal body 1472 and a male terminal connection plate 1474. Specifically, the male terminal connection plate 1474 is coupled to the male terminal body 1472 and is configured to receive an extent of a structure (e.g., lead or wire) that connects the male terminal assembly 1430 to a device (e.g., an alternator) outside of the connector system 100. The wire 1495 is typically welded to the connection plate 1474; however, other methods (e.g., forming the wire 1495 as a part of the connection plate 1474) of connecting the wire 1495 to the connection plate 1474 are contemplated by this disclosure.

As shown in FIGS. 2, 5-10, 15, 20-22, 25, 27 the arrangement of male terminal side walls 1482*a*-1482*d* are coupled to one another and generally form a rectangular prism. The arrangement of male terminal side walls 1482*a*-1482*d* includes: (i) a side wall portion 1492*a*-1492*d*, which generally has a "U-shaped" configuration, (ii) contact arms 1494*a*-1494*h*, and (iii) a plurality of contact arm openings 1496*a*-1496*l*. As best shown in FIGS. 8-10, the side wall portions 1492*a*-1492*d* are substantially planar and have a U-shaped configuration. The U-shaped configuration is formed from three substantially linear segments, wherein a second or intermediate segment 1500a-1500d is coupled on one end to a first or end segment 1498a-1498d and on the other end to a third or opposing end segment 1502a-1502d. The contact arms 1494a-1494h extend: (i) from an extent of the intermediate segment 1500a-1500d of the side wall portion 1492a-1492d, (ii) away from the rear male terminal wall 1484, (iii) across an extent of the contact arm openings 1496a-1496l, and (iv) terminate just short of the front male terminal wall 1480. This configuration is beneficial over the configuration of the terminals shown in FIGS. 9-15, 18, 21-31, 32, 41-42, 45-46, 48 and 50 in PCT/US2018/019787 because it allows for: (i) can be shorter in overall length, which means less metal material is needed for formation and the male terminal 1470 can be installed in narrower, restrictive spaces, (ii) has a higher current carrying capacity, (iii) is easier to assemble, (iv) improved structural rigidity because the contact arms 1494a-1494h are positioned inside of the first male terminal side wall portion 1492a-1492d, (iv) benefits that are disclosed in connection with PCT/US2019/036010, and (v) other beneficial features that are disclosed herein or can be inferred by one of ordinary skill in the art from this disclosure.

Figure 7:
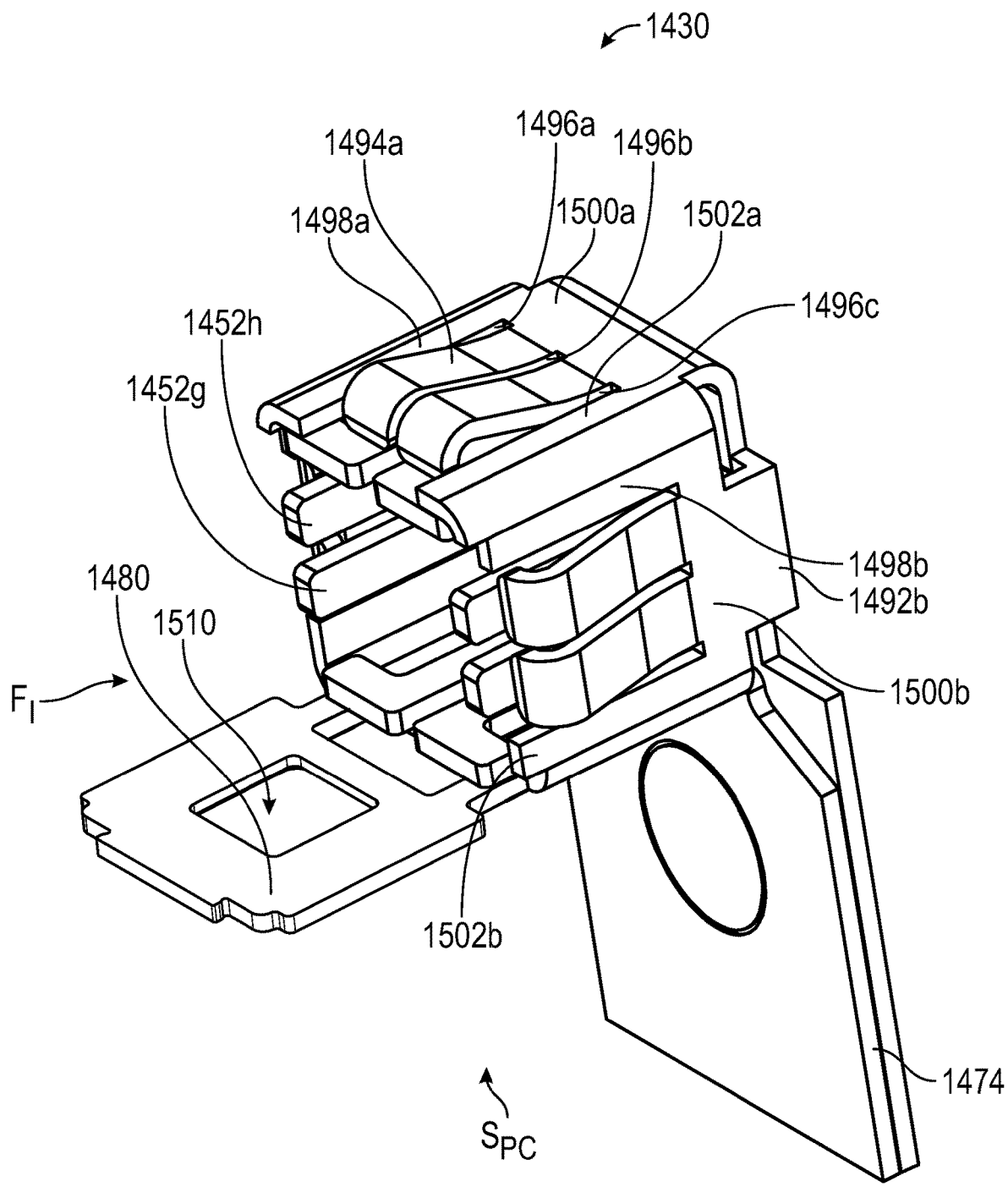
FIG. 7 is a perspective view of the exterior terminal assembly in a partially coupled state ($S_{PC}$)
Figure 11:
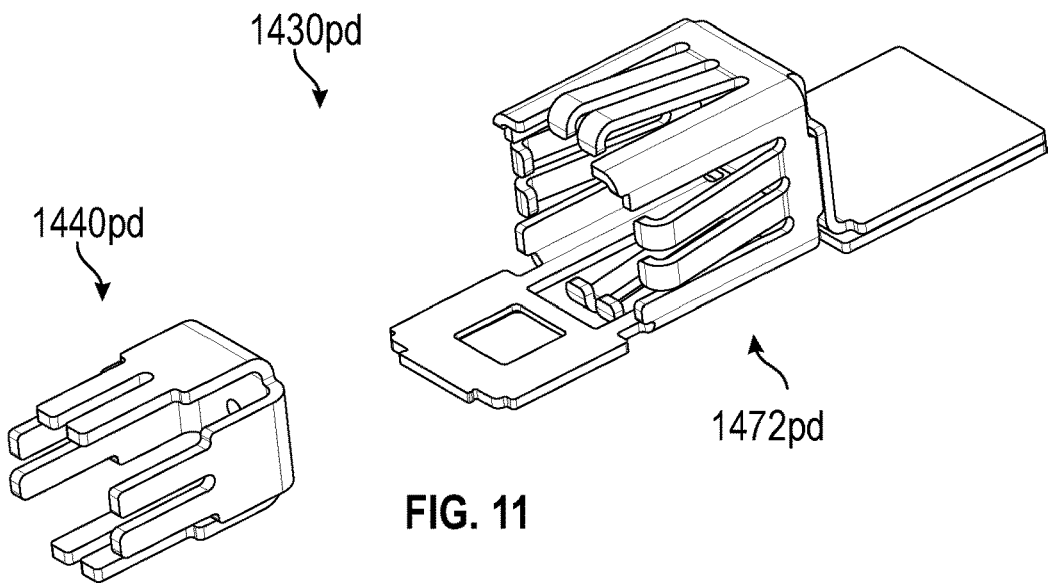
FIG. 11 is a perspective view of a terminal assembly disclosed within PCT/US2019/36010 in a decoupled state ($S_{DC}$)
Figure 12:
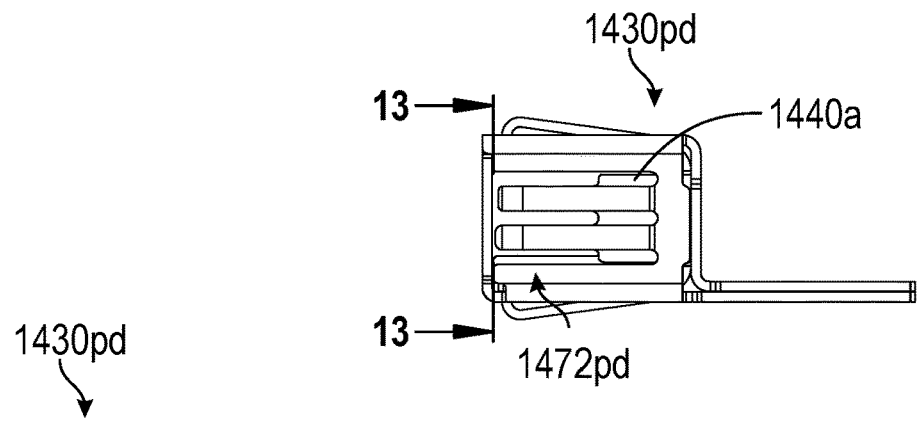
FIG. 12 is a side view of the terminal assembly shown in FIG. 11, wherein the terminal assembly is in a fully coupled state ($S_{FC}$)

The contact arm openings 1496a-1496l are integrally formed with the intermediate portion 1500a-1500d of the male terminal side walls 1482a-1482d. The contact arm openings 1496a-1496l extend along the lateral length of the contact arms 1494a-1494h in order to create a configuration that permits the contact arms 1494a-1494h not to be laterally connected to: (i) another contact arm 1494a-1494h or (ii) a structure other than the extent of the male terminal side wall portion 1492a-1492d to which the contact arms 1494a-1494h are coupled thereto. Additionally, the contact arm openings 1496a-1496l are aligned with the spring arm openings. This configuration of openings forms the same number of spring arms 1452a-1452h as the number of contact arms 1494a-1494h. In other words, FIGS. 6-7 show eight spring arms 1452a-1452h and eight contact arms 1494a-1494h. It should be understood that in other embodiments, the number of spring arms 1452a-1452h may not match the number of contact arms 1494a-1494h. For example, there may be fewer one spring arms 1452a-1452h.

Figure 73:
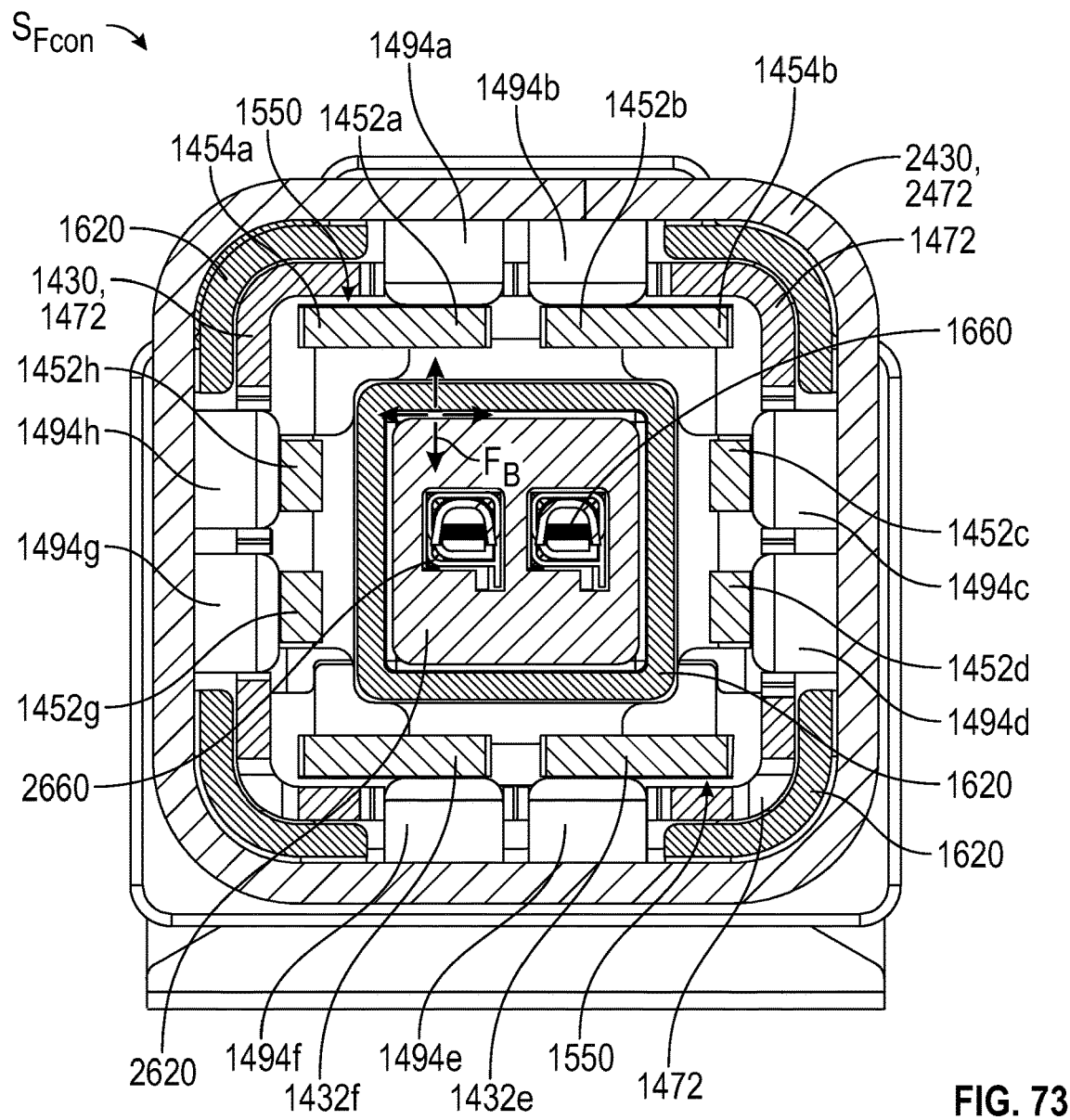
FIG. 73 is a cross-section view of the intermediate female connector assembly and the exterior male connector assembly taken along the 73-73 line of FIG. 72.

The contact arms 1494a-1494h extend away from the rear male terminal wall 1484 at an outward angle. In particular, the outward angle may be between 0.1 degree and 16 degrees between the outer surface of the extent of the male terminal side wall 1492a-1492d and the outer surface of the first extent of the contact arms 1494a-1494h, preferably between 5 degrees and 12 degrees and most preferably between 7 degrees and 8 degrees. This outward angle is shown in multiple figures, but may be best visualized in connection with FIGS. 7 and 10. This configuration allows the contact arms 1494a-1494h to be deflected or displaced inward and towards the center 1490 of the male terminal 1470 by the female receptacle 2472, when the male terminal assembly 1430 is inserted into the female terminal assembly 2430. This inward deflection is best shown in FIG. 73, which is evidenced by the gap 1550. This inward deflection helps ensure that a proper mechanical and electrical connection is created by ensuring that the contact arms 1494a-1494h are placed in contact with the female receptacle 2472.

As shown in FIG. 7, the terminal ends of the contact arms 1494a-1494h are positioned: (i) within an aperture formed by the U-shaped side wall portions 1492a-1492d, (ii) substantially parallel to the male terminal side wall 1492a-1492d, and (iii) in contact the planar outer surface of the spring arms 1452a-1452h, when the spring member 1440c is inserted into the spring receiver 1486. This configuration is beneficial over the configuration shown in FIGS. 3-8 in PCT/US2018/019787 because the assembler of the male terminal assembly 1430 does not have to apply a significant force in order to deform a majority of the contact arms 1494a-1494h outward to accept the spring member 1440c. This required deformation can best be shown in FIG. 6 of PCT/US2018/019787 due to the slope of the contact arm 11 and the fact the outer surface of the spring arm 31 and the inner surface of the contact arm 11 are adjacent to one another without a gap formed therebetween. In contrast to FIGS. 3-8 in PCT/US2018/019787, FIG. 7 of the present application show a very small gap that is formed between the outer surfaces of the spring member 1440c and the inner surface of the contact arms 1494a-1494h. Accordingly, very little force is required to insert the spring member 1440c into the spring receiver 1486 due to the fact the assembler does not have to force the contact arms 1494a-1494h to significantly deform during the insertion of the spring 1440c.

The male terminal 1470 is typically formed from a single piece of material (e.g., metal); thus, the male terminal 1470 is a one-piece male terminal 1470 and has integrally formed features. To integrally form these features, the male terminal 1470 is typically formed using a die-cutting process. However, it should be understood that other types of forming the male terminal 1470 may be utilized, such as casting or using an additive manufacturing process (e.g., 3D printing). In other embodiments, the features of the male terminal 1470 may not be formed from a one-piece or be integrally formed, but instead formed from separate pieces that are welded together. In forming the male terminal 1470, it should be understood that any number (e.g., between 1 and 100) of contact arms 1494a-1494h may be formed within the male terminal 1470.

Positioning the internal spring member 1440c within the male terminal assembly 1430 occurs across multiple steps or stages. FIG. 6 provides the first embodiment of the male terminal assembly 1430 in a decoupled state $S_{DC}$, FIG. 7 provides the first embodiment of the male terminal assembly 1430 in a partially coupled state $S_{PC}$, and FIG. 8 provides the first embodiment of the male terminal assembly 1430 in a fully coupled state $S_{FC}$. The first stage of assembling the male terminal assembly 1430 is shown in FIG. 6, where the front male terminal wall 1480 is in an open or flat position Po and the spring member 1440c is separated from the male terminal 1470. In this open position Po, the front male terminal wall 1480 is substantially co-planar with one of the male terminal side wall 1482c. This configuration of the male terminal 1470 exposes the spring receiver 1486 and places the male terminal 1470 in a state that is ready for receiving the spring member 1440c. The second stage of assembling the male terminal assembly 1430 is shown in FIG. 7, where the front male terminal wall 1480 remains in the open or horizontal position Po and the spring member 1440c is positioned within or inserted into the spring receiver 1486. To reach the inserted state, an insertion force, Fi, has been applied to the spring member 1440c to insert the spring member 1440c into the spring receiver 1486. The insertion force, Fi, is applied on the spring member 1440c until the second or rear male terminal wall 1484 is positioned adjacent to the rear spring wall 1444, a free end 1488 of the male terminal 1470 is substantially aligned with a free end 1446 of the spring member 1440c, and a portion of the male terminal side walls 1482a-1482d are positioned adjacent a portion of the spring member side walls 1442a-1442d.

The third stage of assembling the male terminal assembly 1430 is shown in FIG. 8, where: (i) the front male terminal wall 1480 is closed or vertical $P_{CL}$ and (ii) the spring member 1440c is positioned within the spring receiver 1486. To close the front male terminal wall 1480, an upward directed force, Fu, is applied to the male terminal wall 1480 to bend it about its seam to place it adjacent to the side walls 1482a-1482d. After the front male terminal wall 1480 is in the proper position, the top edge is coupled (e.g., welded) to the side wall 1480 of the male terminal body 1472. Here, the closed or vertical $P_{CL}$ of the front male terminal wall 1480 ensures that the spring member 800 is retained within the male terminal 1470. It should be understood that in other embodiments, the front male terminal wall 1480 may be omitted, may not have a touch proof probe opening therethrough, may not extend the entire way from side wall 1482a-1482d (e.g., partially extending from any side wall 1482a-1482d), or may be a separate piece that is coupled to both side walls 1482a-1482d.

The MIL assembly 1600 of the IL system 4000 is comprised of multiple components and when used in a high voltage connector, it may be referred to as a high voltage male interlock or for short—male HVIL. Referring to FIGS. 16-19, the MIL 1600 is primarily comprised of: (i) a male IL holder 1620 and (ii) a IL jumper 1660. The Male IL holder 1620 is designed such that: (i) an extent is positioned outside of the side wall portion 1492a-1492d of the male terminal body 1472, (ii) an extent is positioned outside of the front male terminal wall 1480, and (iii) an extent is positioned within the spring member 1440c. To accomplish this positional relationship between the male IL holder 1620, male terminal body 1472 and spring member 1440c, the male IL holder 1620 has: (i) an arrangement of exterior side walls 1604, (ii) a front wall 1608, (iii) an arrangement of interior side walls 1612, and (iv) a rear wall 1616. The arrangement of exterior side walls 1604 is comprised of a plurality of exterior side walls 1605a-1605d, wherein each exterior side walls 1605a-1605d includes an aperture 1606a-1606d formed there through. These apertures 1606a-1606d are designed to receive the contact arms 1494a-1494h. As shown in the Figures (e.g., FIG. 20) each aperture 1606a-1606d receives both contact arms 1494a-1994h that formed within a single side wall 1482a-1482d of the male terminal body 1472. It should be understood that more or less apertures 1606a-1606d may be utilized. For example, each contact arm 1494a-1494h may have its own aperture or two apertures may be used wherein two sets of contact arms 1494a-1494h are positioned within each of these apertures.

The front wall 1608 extends from the arrangement of exterior side walls 1604 and is designed to be positioned outside of the front male terminal wall 1480. This helps prevent accidental contact between the front male terminal wall 1480 and a foreign object. Extending from the front wall 1608 is an arrangement of interior side walls 1612. Specifically, the arrangement of interior side walls 1612 is comprised of a plurality of side walls 1614a-1614d that are configured to be positioned within the spring member 1440c. The configuration of the interior side walls 1614a-1614d and the exterior side walls 1605a-1605d for an outer IL receiver 1622 that is designed to receive an extent of: (i) the male terminal body 1472 and (ii) spring member 1440c. The configuration of the interior side walls 1614a-1614d is such that they do not interfere with or interact with the spring member 1440c. In other words, the side walls 1614a-1614d are spaced such that they do not touch the spring member 1440c even when the spring member 1440c is compressed by the female terminal assembly 2430 in the fully connected position $S_{FCON}$.

The interior side walls 1614a-1614d are coupled to a rear wall 1616 to form an inner IL receptacle 1624. The rear wall 1616 includes an IL jumper coupling means 1628 that is designed to couple the IL jumper 1660 to the rear wall 1616. Here, the IL jumper coupling means 1628 is formed from an extent of the rear wall 1616 and using an overmolding process. In other embodiments, the IL jumper coupling means 1628 may be a different structure or have a different configuration. For example, the male IL holder 1620 and IL jumper 1660 may be simultaneously printing using a 3D printer, coupled together using a mechanical locking structure or by using a chemical bonding method. Overall, the IL jumper coupling means 1628 and the rear wall 1616 are configured to properly position the IL jumper 1660 in the correct location for mating with the FIL 2600.

Due to the tight tolerances, the spring member 1440c should be correctly aligned within the male terminal body 1472 to ensure that the IL jumper 1660 is in a proper location within the exterior connector 1000. Alternatively, if the spring member 1440c is misaligned within the male terminal body 1472 (e.g., see FIG. 14), the IL jumper 1660 most likely will not be in the proper location within the exterior connector 1000 and cannot be properly seated within the FIL 2600. This is problematic because current will not flow through the connector unless the IL jumper 1660 is properly seated within the FIL 2600. As discussed above, this misalignment of the spring member 1440c within the terminal assembly 1600 is avoided by the inclusion of the centering means 1453. This in turn, ensure that the IL jumper is properly locational within the exterior connector 1000 and permits the IL jumper 1660 to be properly seated within the FIL 2600. It should be understood that alternative methods of ensuring that the IL jumper 1660 is properly located within the exterior connector 1000 are contemplated by this disclosure. For example, the male IL holder 1620 could be formed from a material that is designed to force a misaligned spring member into proper alignment within the male terminal body 1472. Alternatively, these parts may be 3D printed in a manner that ensures that they are properly aligned and positioned. Overall, the positional configuration of placing the IL jumper 1660 within an extent of the terminal assembly 1430 provides significant advantages over conventional connectors that include an interlock. As discussed above, these advantages include: (i) not requiring an increase in the size of the connector and (ii) does not substantially increase the weight of the connector.

A strain relief assembly 1800 includes multiple components, such as a strain relief cap 1810, which are design to relieve the strain that is placed on the connection between the male terminal assembly 1430 and the wire 1495. Additional details about this strain relief assembly are disclosed in connection PCT/US2019/36070, which is fully incorporated herein by reference.

Figure 15:
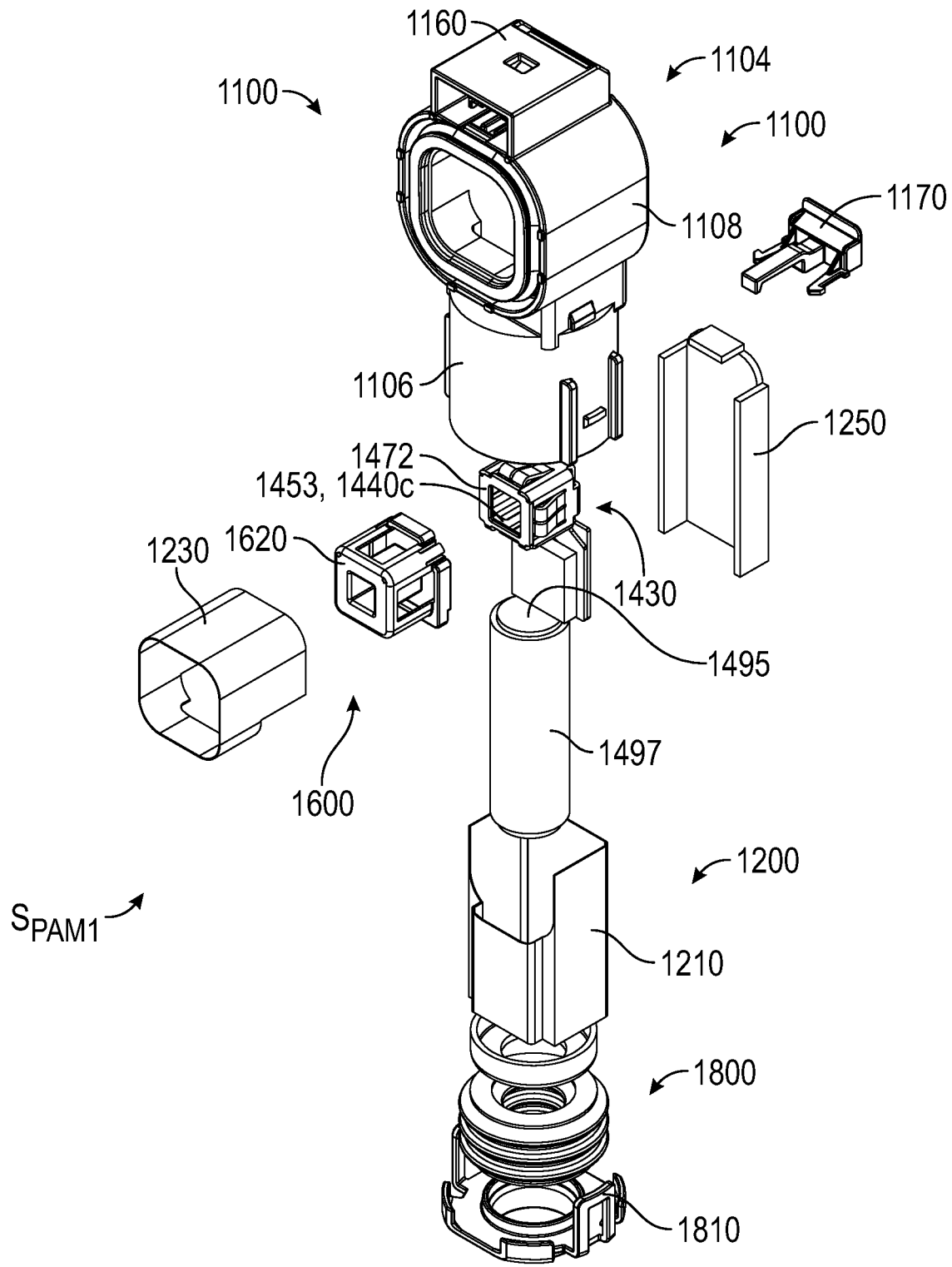
FIG. 15 is a perspective view of the exterior male connector assembly of FIG. 3, wherein the exterior male connector assembly is in a first partially assembled state ($S_{PA1}$)
Figure 20:
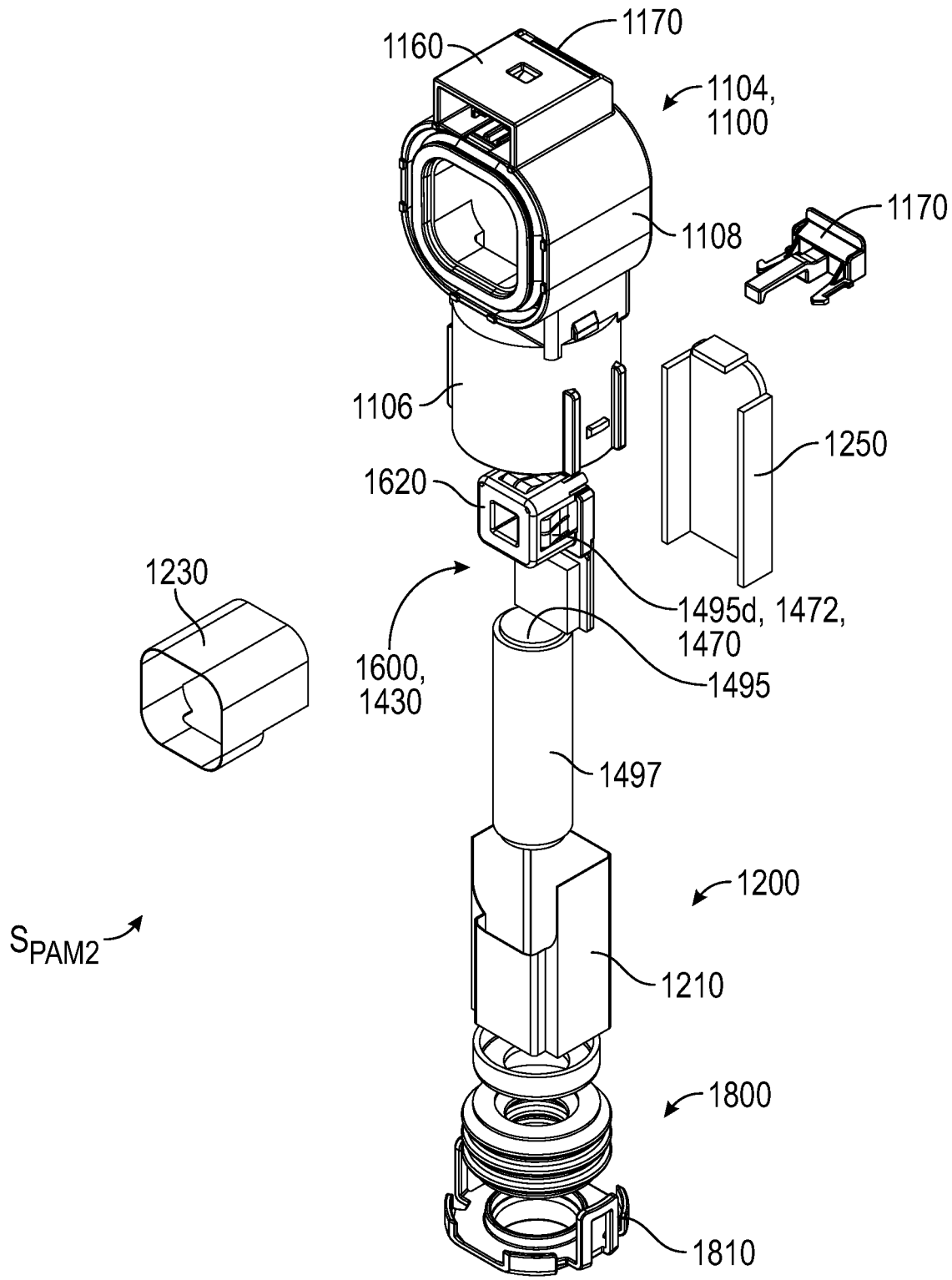
FIG. 20 is a perspective view of the male connector assembly of FIG. 3, wherein the exterior male connector assembly is in a second partially assembled state ($S_{PA2}$)
Figure 21:
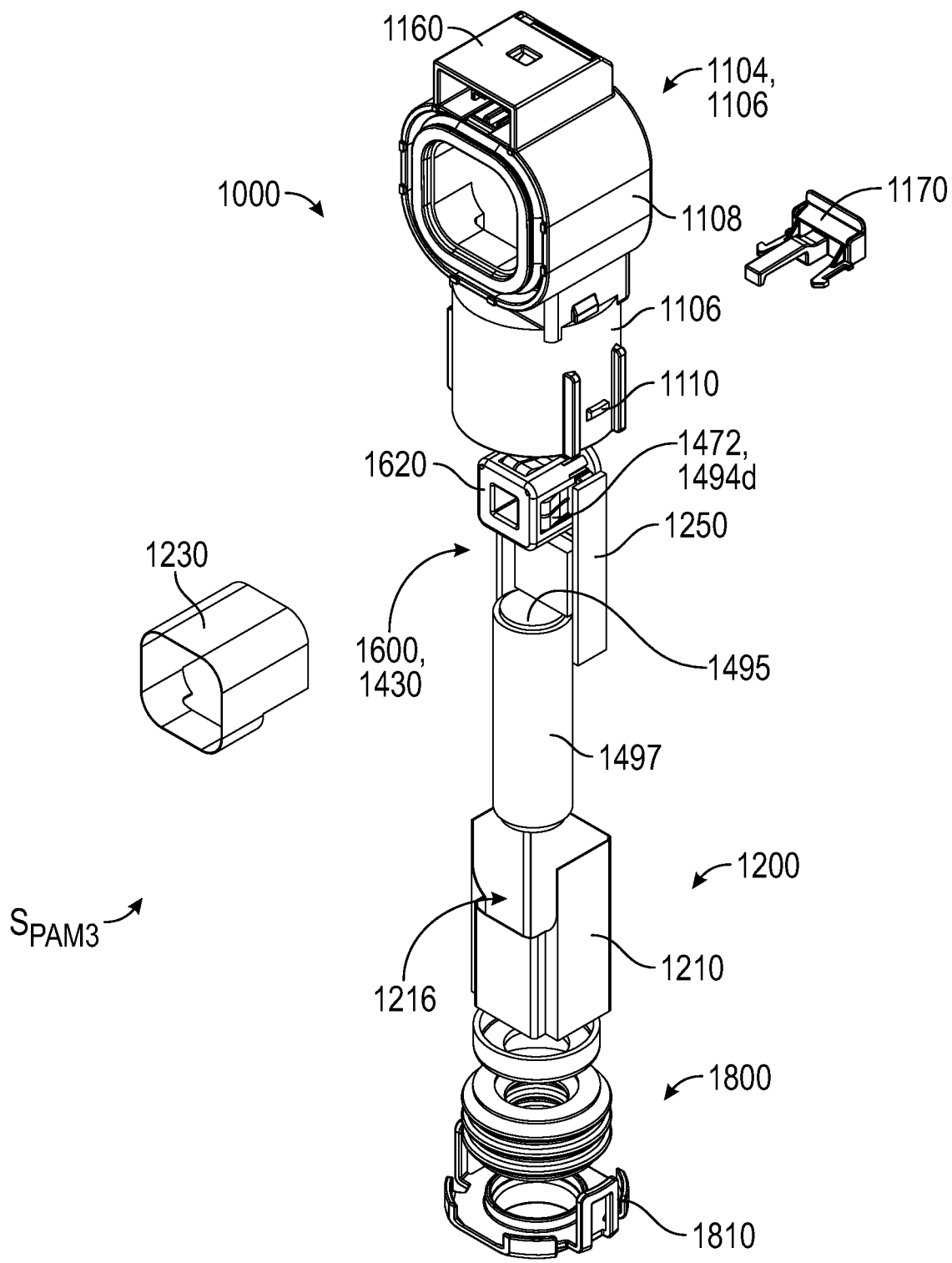
FIG. 21 is a perspective view of the exterior male connector assembly of FIG. 3, wherein the exterior male connector assembly is in a third partially assembled state ($S_{PA3}$)
Figure 22:
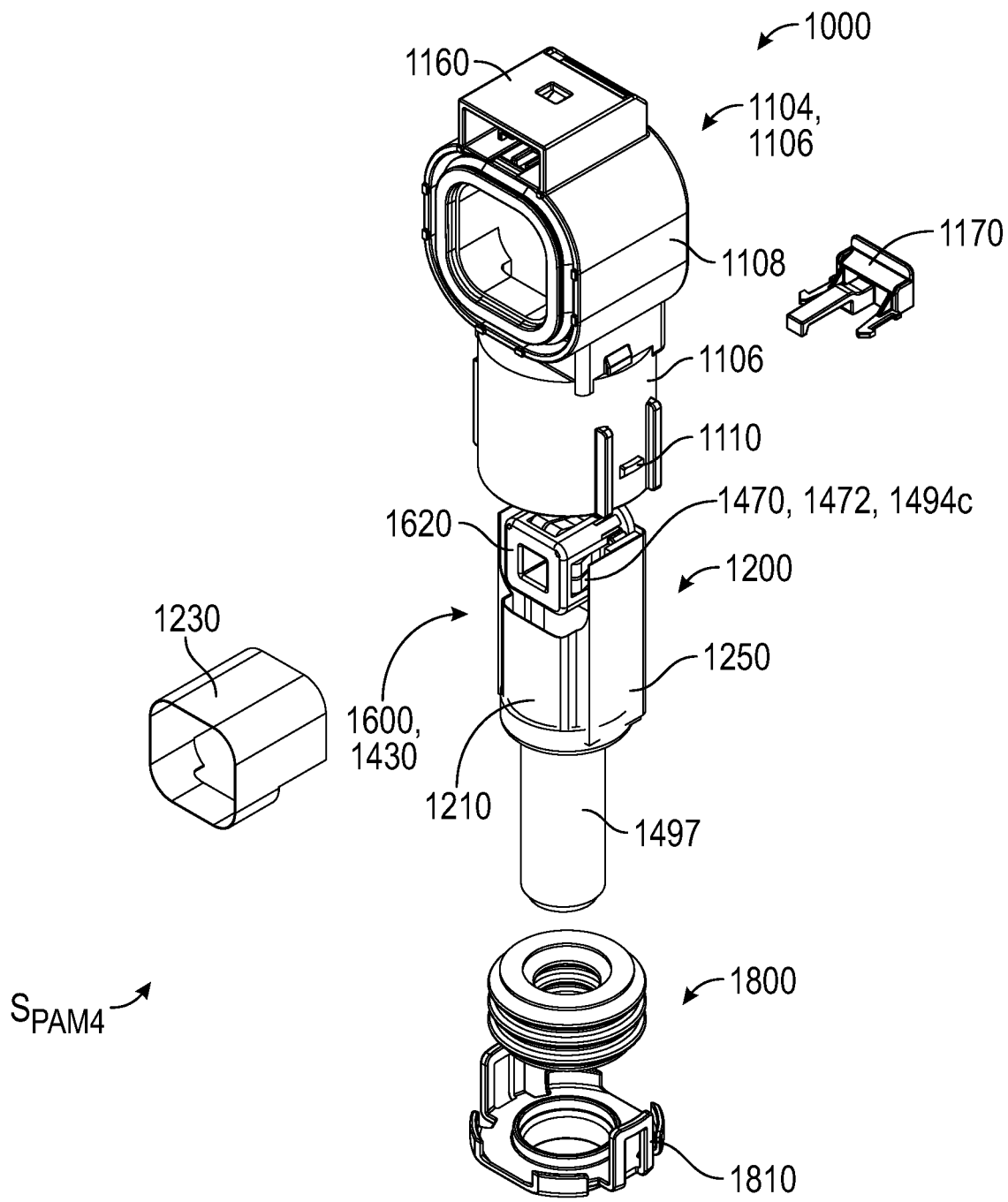
FIG. 22 is a perspective view of the exterior male connector assembly of FIG. 3, wherein the exterior male connector assembly is in a fourth partially assembled state ($S_{PA4}$)
Figure 23:
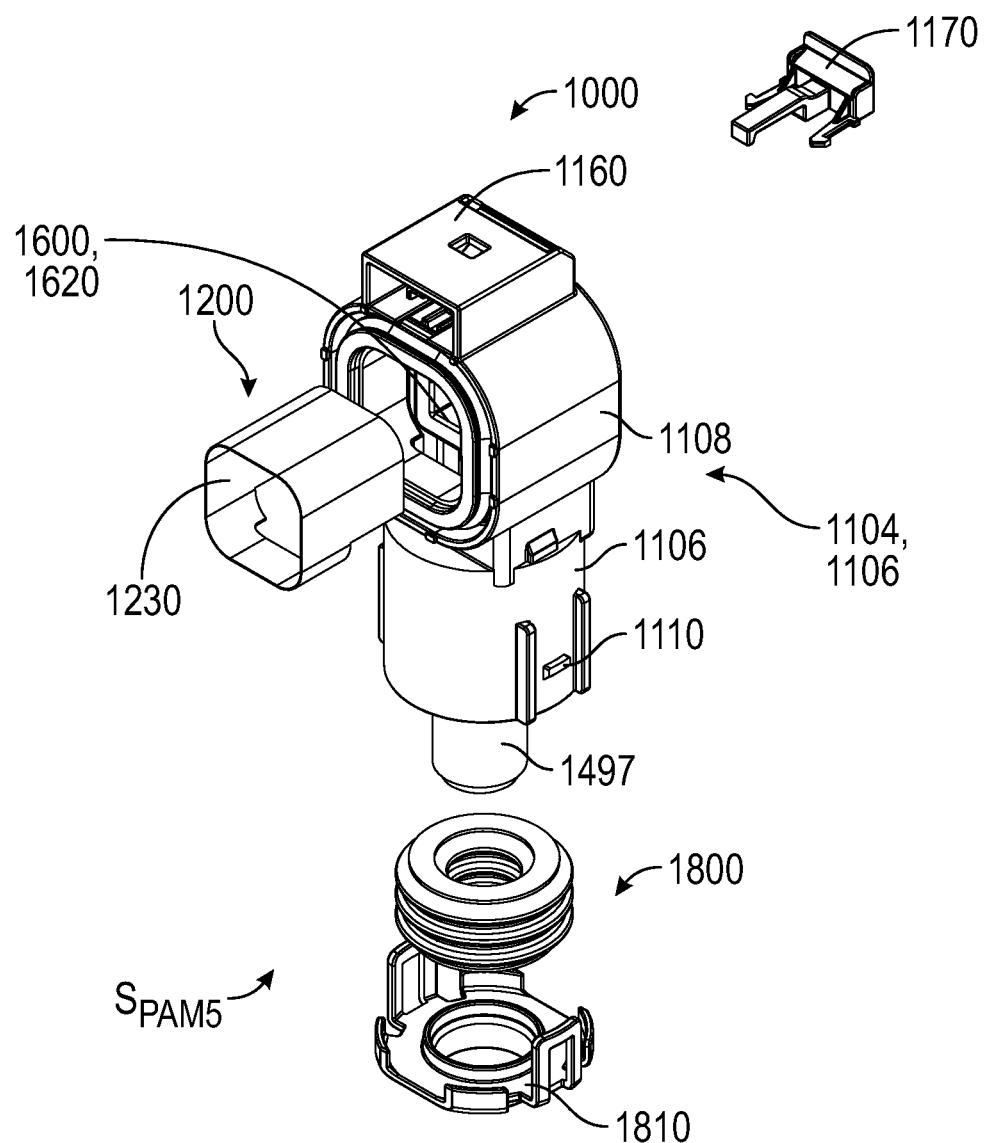
FIG. 23 is a perspective view of the exterior male connector assembly of FIG. 3, wherein the exterior male connector assembly is in a fifth partially assembled state ($S_{PA5}$)
Figure 24:
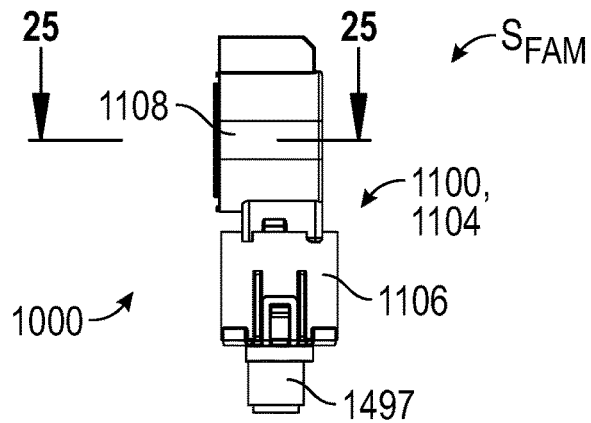
FIG. 24 is a side view of the exterior male connector assembly of FIG. 3, wherein the exterior male connector assembly is in a fully assembled state ($S_{FA}$)

Assembling the male connector assembly, second male connector assembly, or exterior male connector assembly 1000 occurs across multiple steps or stages. The first step in assembling the exterior male connector assembly 1000 is assembling the exterior male terminal assembly 1430, which is shown in FIGS. 6-8 and described above. After the exterior male terminal assembly 1430 is in a fully coupled state $S_{FC}$, then the exterior male terminal assembly 1430 can be coupled to the wire 1495 and the exterior male connector assembly is in a first partially assembled state $S_{PA1}$, as shown in FIG. 15. Next, MIL 1600 can be assembled and coupled to the exterior male terminal assembly 1430 to create a second partially assembled state $S_{PA2}$, as shown in FIG. 20. The shielding cap 1250 is placed against the rear wall 1484 of the male terminal assembly 1430 to create a third partially assembled state $S_{P43}$, which is shown in FIG. 21. Next, as shown in FIG. 22, the first extent of the shielding assembly 1210 is positioned outside of the shielding cap 1250 to create the fourth partially assembled state $S_{P44}$. In this fourth partially assembled state $S_{P44}$ the wire 1495 is positioned within a receptacle formed by the walls of the first extent of the shielding assembly 1210 and the shielding cap 1250 is positioned between the rear wall 1484 of the male terminal assembly 1430 and the first extent of the shielding assembly 1210. Next, as shown in FIG. 23, the male terminal assembly 1430 and associated components (e.g., first extent of the shieling assembly 1210, the shielding cap 1250, and part of the wire 1495) are inserted into the housing 1100 to form the fifth partially assembled state $S_{P45}$ In the final steps to create a fully assembled connector $S_{F4}$, the second extent of the shieling assembly 1230 is inserted into the exterior male connector assembly 1000, the strain relief assembly 1800 is coupled to the exterior male connector assembly 1000, and the CPA member 1170 is partially inserted into the CPA receiver 1160.

In the fully assembled $S_{F4}$ (see FIGS. 25 and 27), the nesting of the following elements is described below:

the IL jumper 1660 is positioned within: (i) male IL holder 1620, (ii) spring member 1440c, (iii) male terminal body 1472, (iv) the second extent of the shielding housing 1230, and (v) exterior housing 1104. In other words, the IL jumper 1660 is positioned within: (i) an extent of MIL 1600, (ii) exterior male terminal assembly 1430, (iii) the exterior shielding assembly 1200, and (iv) the exterior housing assembly 1100;

an extent of the male IL holder 1620 is positioned within: (i) spring member 1440c, (ii) male terminal body 1472, (iii) the second extent of the shielding housing 1230, and (iv) exterior housing 1104. In other words, the MIL 1600 is positioned within: (i) exterior male terminal assembly 1430, (ii) the exterior shielding assembly 1200, and (iii) the exterior housing assembly 1100;

the spring member 1440c is positioned within: (i) male terminal body 1472, (ii) the second extent of the shielding housing 1230, and (iii) exterior housing assembly 1100;

the male terminal body 1472 is positioned within: (i) the second extent of the shielding housing 1230 and (ii) exterior housing assembly 1100;

the male terminal body 1472 is positioned within: (i) the second extent of the shielding housing 1230 and (ii) exterior housing assembly 1100; and the second extent of the shielding housing 1230 is positioned within exterior housing assembly 1100.

It should be understood that one or more of these structures may be omitted or its location may be changed such that that structure is omitted from the above nested list. For example, the second extent of the shielding housing 1230 may be omitted from this assembly and thus will not be included within the above list.

2) Interior Male Connector Assembly

The male connector assembly, first male connector assembly, or interior connector assembly 3000 is includes multiple components that are designed to be positioned internal to the side wall 204 of the battery pack 200. The interior connector assembly 3000 is primarily composed of: (i) the first housing assembly or interior housing assembly 3100, (ii) the first male terminal assembly or interior male terminal assembly 3430, and (iii) the busbar assembly 3900. It should be understood that reference numbers that are shown in the figures may be omitted from the specification for sake of brevity as like structures have like numbers. For example, the disclosure in connection with spring member 1440c is not repeated herein, but it applies to spring member 3440c as if it were repeated herein. In other words, omitting reference numbers from the specification or specific disclosure of the functionality of that structure should not limit the disclosure of this application. Instead, one shall refer to the disclosure of similar structures that may be discussed within another section of this application or other applications that are incorporated herein by reference.

As shown in FIGS. 28-37, the male housing assembly, first housing assembly, or interior male housing assembly 3100 includes: (i) frontal housing member 3110, (ii) a rear housing member 3140, and (iii) an interior locking member 3180. The frontal housing member 3110 is designed to: (i) receive a major extent of the interior male terminal assembly 3430 and (ii) interact with a portion of the intermediate female connector assembly 2000 in order to couple the interior male connector assembly 3000 to the intermediate female connector assembly 2000. The rear housing member 3140 is configured to interact with the frontal housing member 3110 in order to retain the interior male terminal assembly 3430 within the internal housing assembly 3100. Finally, similar to the CPA member 1170 that is described above in connection with the exterior male connector assembly 1000 the interior locking member 3180 is designed to ensure that the interior male connector assembly 3000 is properly connected to the intermediate female connector assembly 2000.

The male terminal assembly, first terminal assembly, or interior terminal assembly 3430 has the same configuration as the exterior male terminal assembly 1430; thus, the above disclosure will not be repeated here. Nevertheless, it should be understood that across these components like numbers represent like structures. For example, the disclosure relating to the spring member 1440c applies in equal force to spring member 3440c. Also, it should be understood that the interior male terminal assembly 3430 may be different than the exterior male terminal assembly 1430. For example, the male terminal assemblies may be any terminal assembly 1343, 3430 disclosed within PCT applications: (i) PCT/US2020/14484, (ii) PCT/US2020/13757, or (iii) PCT/US2019/36010. Additionally, there may be more than one interior male terminal assembly 3430 that is coupled to a single exterior male terminal assembly 1430. An example of this is shown in provisional patent application 62/988,972, which is herein incorporated by reference. Alternatively, a single interior male terminal assembly 3430 may be coupled to multiple exterior male terminal assemblies 1430.

While the interior male terminal assembly 3430 may be coupled to a wire, in certain embodiments, like the one shown in the Figures herein, the interior male terminal assembly 3430 may be coupled to a busbar 3900. The busbar includes: (i) a busbar conductor 3910 and (i) an insulator 3980. The busbar 3900 may have any of the features, may be constructed in a similar manner, and/or may have functionality that is the same as or is similar to the busbars disclosed within PCT patent application PCT/US2020/14484, provisional patent applications Nos. 62/897,962 and 63/051,639, which are all incorporated herein by reference.

Figure 32:
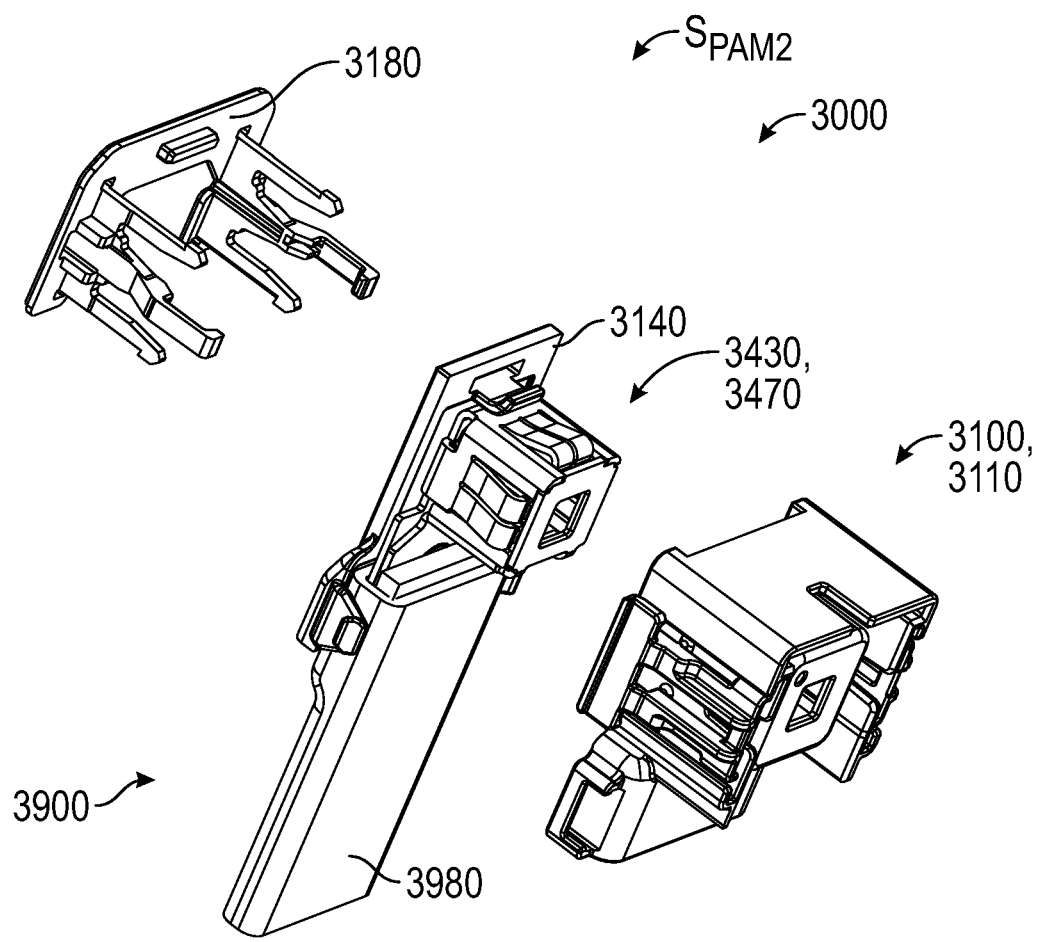
FIG. 32 is a perspective view of the interior male connector assembly of FIG. 28, wherein the interior male connector assembly is in a second partially assembled state ($S_{PA2}$)
Figure 33:
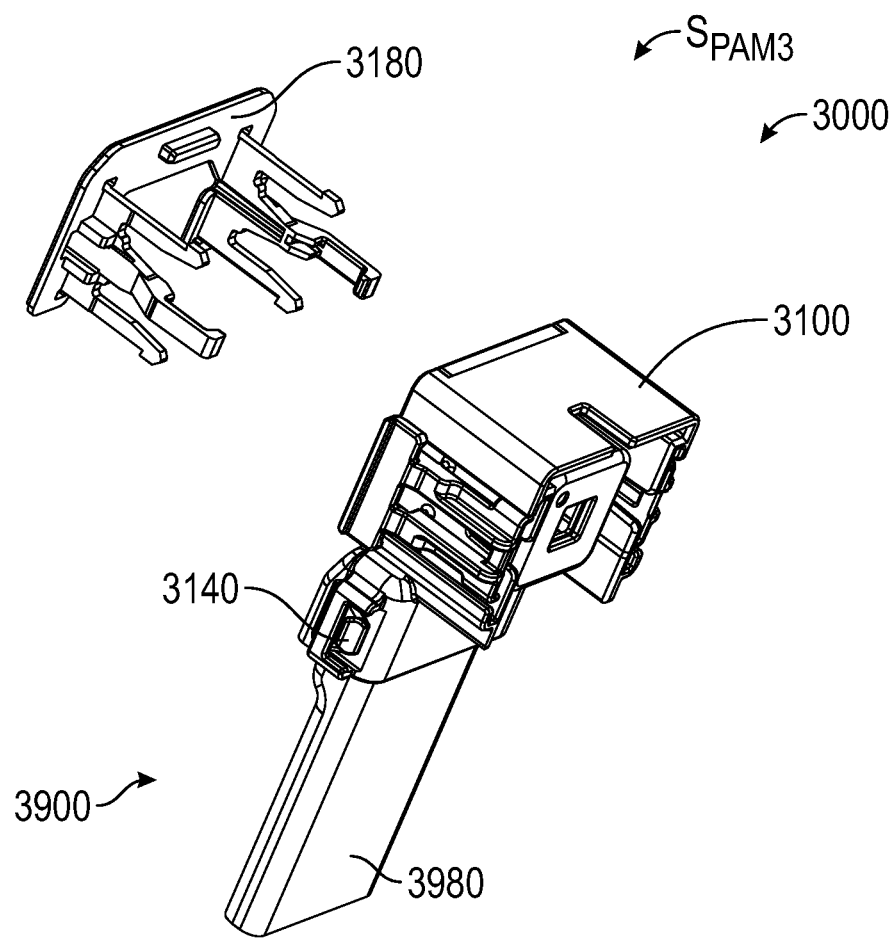
FIG. 33 is a perspective view of the interior male connector assembly of FIG. 28, wherein the interior male connector assembly is in a third partially assembled state ($S_{PA3}$)
Figure 34:
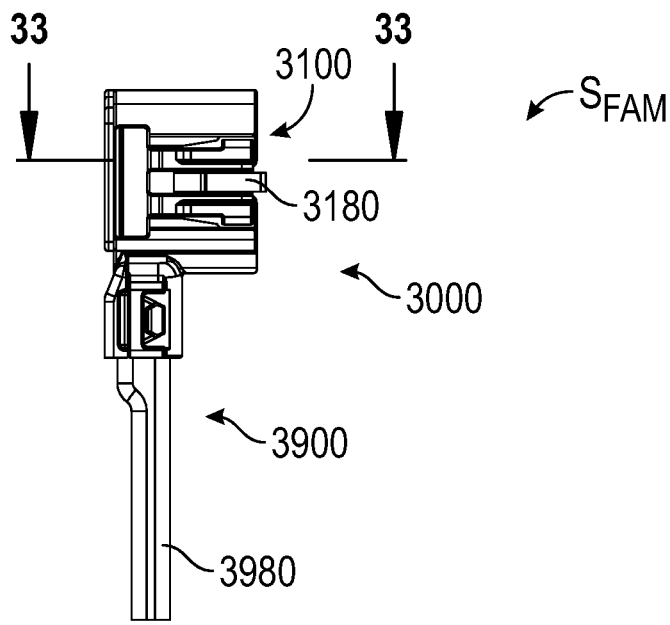
FIG. 34 is a side view of the interior male connector assembly of FIG. 28, wherein the interior male connector assembly is in a fully assembled state ($S_{FA}$)
Figure 35:
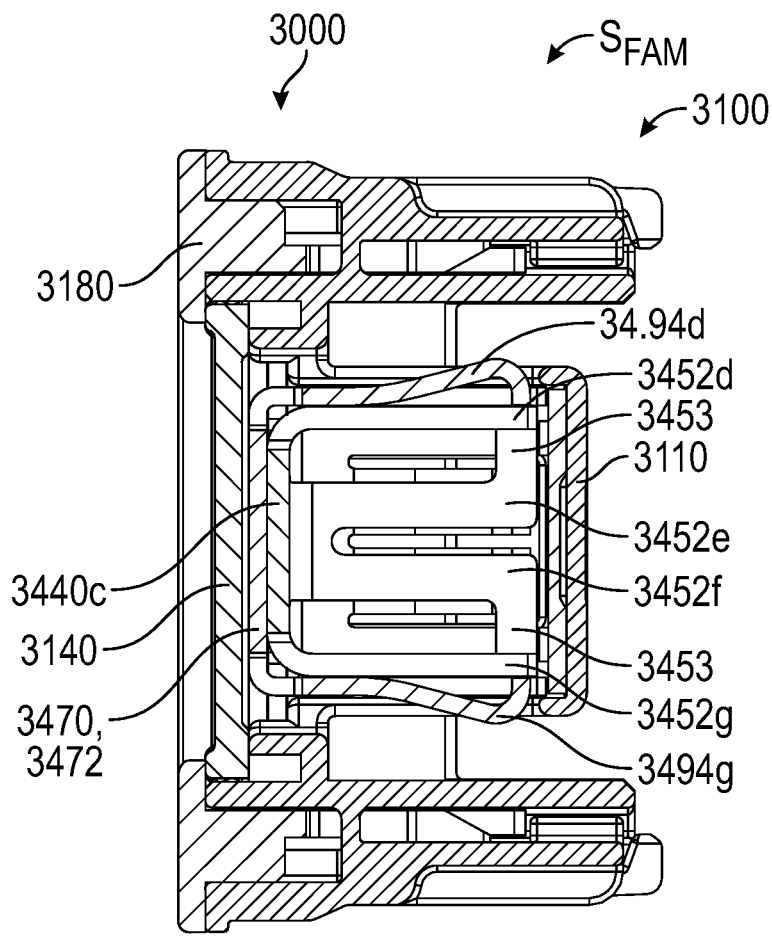
FIG. 35 is a cross-sectional view of the interior male connector assembly taken along the 35-35 line of FIG. 34.
Figure 36:
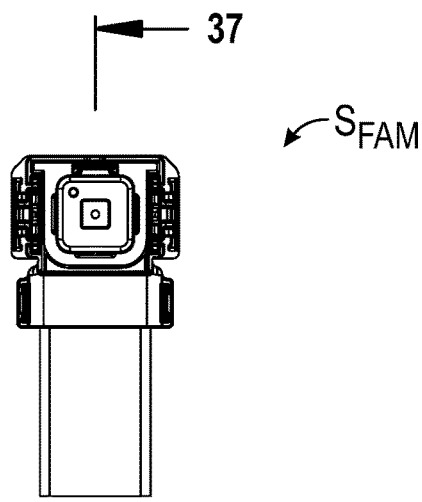
FIG. 36 is a front view of the interior male connector assembly of FIG. 28, wherein the interior male connector assembly is in a fully assembled state ($S_{FA}$)
Figure 37:
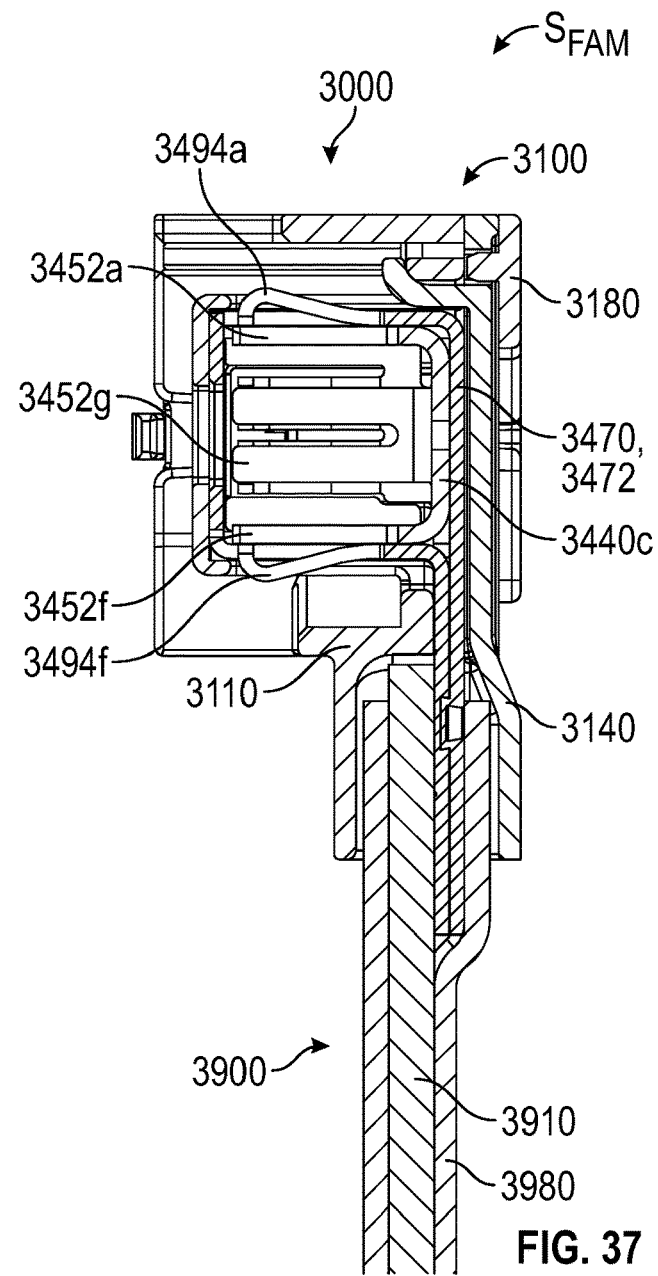
FIG. 37 is a cross-sectional view of the interior male connector assembly taken along the 37-37 line of FIG. 36.
Figure 41:
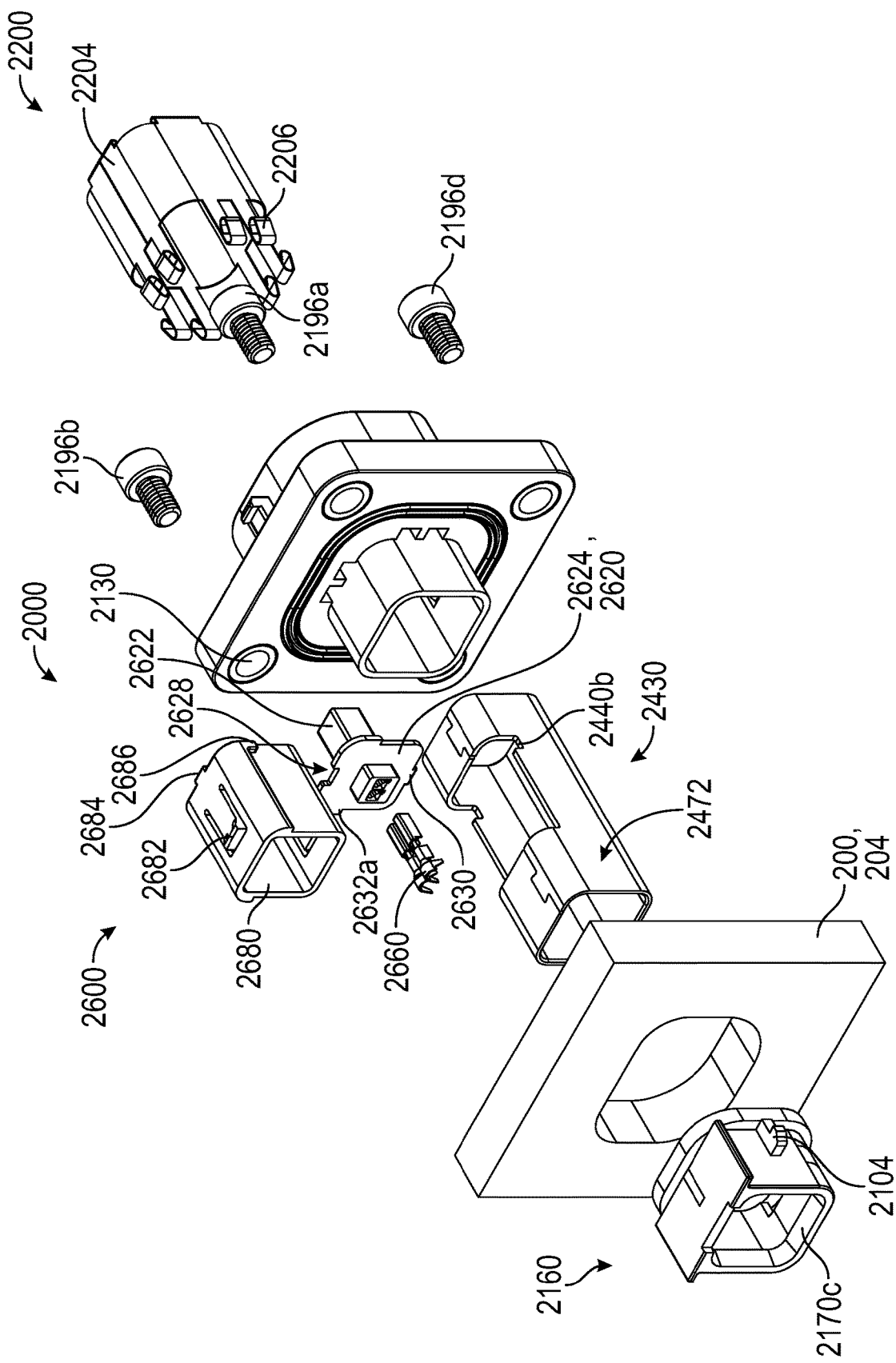
FIG. 41 is an exploded view of the intermediate female connector assembly of FIG. 38, wherein the intermediate female connector assembly has an intermediate housing, a female interlock assembly and an intermediate terminal assembly.

Assembling the male connector assembly, interior connector assembly, interior male connector assembly 3000 occurs across multiple steps or stages. The first step in assembling the interior male connector assembly 3000 is assembling the interior male terminal assembly 3430. After the interior male terminal assembly 3430 is in an fully coupled $S_{FC}$, then the busbar assembly 3900 can be attached to the interior male terminal assembly 3430; thus, creating a first partially assembled state SPAT (shown in FIG. 31). As shown in FIG. 32, the rear housing member 3140 can be positioned adjacent the rear wall of the male terminal assembly 3430 creating a connector that is in a second partially assembled state $S_{PA2}$. Next, as shown in FIG. 33, the interior male terminal assembly 3430 is positioned within the frontal housing member 3110 and the frontal housing member 3110 is coupled to the rear housing member to form a connector that is in a third partially assembled state $S_{PA3}$.

In the fully assembled $S_{FA}$ (see FIGS. 35 and 37), the nesting of the following elements is described below:

the spring member 3440c is positioned within: (i) male terminal body 3472 and (ii) interior housing 3100; and the male terminal body 1472 is positioned within interior housing 3100.

3) Intermediate Female Connector Assembly

The female connector assembly, intermediate connector assembly, or intermediate female connector assembly 2000 is includes multiple components that are designed to be positioned within the side wall 204 of the battery pack 200. The female or intermediate connector assembly 2000 is primarily composed of: (i) the female or intermediate housing assembly 2100, (ii) the female or intermediate shielding assembly 2200, (iii) the female terminal assembly 2430, and (iv) the female interlock assembly (FIL) 2600.

The female housing assembly, intermediate housing assembly, or intermediate female housing assembly 2100 extends through the bulk head or side wall 204 of the battery pack 200. As such, the intermediate housing assembly 2100 is designed to protect and isolate the female terminal assembly 2430 from the bulk head or side wall 204 of the battery pack 200. To accomplish this, the intermediate housing assembly 2100 receives the female terminal assembly 2430 and includes: (i) an exterior extent 2110 and (ii) an interior extent 2160. The exterior extent 2110 is primary positioned within the wall 204 of the battery pack and on the exterior of the battery pack 200, while the interior extent 2160 is primarily positioned within the battery pack 200. The exterior extent 2110 of the intermediate housing assembly 2100 is configured and designed to retain the female terminal assembly 2430 and interact with the exterior male connector assembly 1000. As best shown in FIG. 47, exterior extent 2110 includes an assembly of side walls 2112 that is comprised of an outer plurality of side walls 2114a-2114d and an inner plurality of side walls 2116a-2116d. Specifically, the inner plurality of side walls 2116a-2116d: (i) form a female terminal assembly receiver 2118 that is designed to receive and retain an extent of the female terminal assembly 2430 and (ii) are configured to aid in the mating of the female terminal assembly 2430 with the exterior terminal assembly 1430.

The female terminal assembly 2430 is retained within the inner plurality of side walls 2116a-2116d due to: (i) a female IL retainer 2680 and (ii) configuration of the exterior housing extent 2110 and the interior housing extent 2160. First, the female IL retainer 2680 includes a locking member 2682 that is received by an IL locking receiver 2117a, 2117c that are formed within two of the walls of the inner plurality of side walls 2116a-2116d. Second, the exterior extent 2110 and the interior extent 2160 both include ramped or sloped walls 2134a-2134d, 2170a-2170d that extends reward from the front edge of the housing 2100 and are designed to compress the contact arms 1494, 3494 of the terminal assemblies 1430, 3430. The configuration and design of these ramped or sloped walls 2134a-2134d, 2170a-2170d are described in detail with PCT/US2019/36070, which is incorporated herein. These ramped or sloped walls 2134a-2134d, 2170a-2170d have rear edges that abut the edges of the female terminal assembly 2430. Thus, when the interior extent 2160 is coupled with the exterior extent 2110, the female terminal assembly 2430 is retained between rear edges of these ramped or sloped walls 2134a-2134d, 2170a-2170d. It should be understood that other configurations for retaining the female terminal assembly 2430 within the intermediate housing assembly 2100 may be used and is contemplated by this disclosure.

The configuration of the outer plurality of side walls 2114a-2114d and inner plurality of side walls 2116a-2116d allows for an intermediate shielding assembly 2200 to be positioned within the intermediate housing assembly 2100. Specifically, the intermediate shielding assembly 2200 is positioned between the inner plurality of side walls 2116a-2116d and the outer plurality of side walls 2114a-2114d. In order to retain the intermediate shielding assembly 2200 within the intermediate housing assembly 2100, the inner plurality of side walls 2116a-2116d include an intermediate shielding receiver 2140. This intermediate shielding assembly 2200 will be discussed in greater detail below.

The outer plurality of side walls 2114a-2114d form the exterior housing receiver 2122 and include (i) a sealing member recess 2126, (ii) a plurality of bulk head coupling receivers 2130, and (iii) an exterior connector coupler 2135. The sealing member recess 2126 receives an extent of a seal 2108. The seal 2108 is designed to form a seal between the bulk head or side wall 204 of the battery pack 200 and the exterior housing receiver 2122. This helps ensure the durability of the battery pack 200. The plurality of bulk head coupling receivers 2130 are receivers that are designed to receive an extent of the elongated couplers 2196a-2196d. As shown in the embodiment disclosed herein, the elongated couplers 2196a-2196d are screws that have external threads that are cooperatively dimensioned with the internal threads of the receives that are formed within the bulk head or side wall 204 of the battery pack 200. Other types of elongated couplers 2196a-2196d may be utilized, such as ¼turn screws, bayonet connectors, pin and socket, or any other type of similar removable elongated coupler. Finally, the CPA coupler 2138 is a projection that is: (i) designed to be received by an extent of the exterior housing 1104 and specifically the CPA receiver 1160, and (ii) interact with the CPA member 1170. Once the intermediate housing assembly 2100 is coupled to the exterior housing assembly 1100, the CPA member 1170 can be engaged by the user, whereby the CPA member 1170 interacts with the CPA coupler 2138, in order to move the connector assembly 100 from the fully connected state to the ready to use state (discussed in greater detail below).

The interior extent 2160 of the intermediate housing assembly 2100 is configured and designed to retain the female terminal assembly 2430 and interact with the interior male connector assembly 3000. As best shown in FIG. 47, interior extent 2160 includes a plurality of side walls 2164a-2164d that are designed to receive and retain an extent of the female terminal assembly 2430 and (ii) are configured to aid in the mating of the female terminal assembly 2430 with the interior terminal assembly 3430. As discussed above, both of these functions are accomplished by the ramped or sloped walls 2170a-2170d that extends reward from the front edge of the housing 2100 and are designed to compress the contact arms 3494 of the terminal assemblies 3430.

The exterior extent 2110 of the intermediate housing assembly 2100 is coupled to the interior extent 2160 of the intermediate housing assembly 2100 by a housing coupling means 2102. In particular, the interior extent 2160 includes a coupling projection 2104 that is received by a coupling receptacle 2106 that is formed within the exterior extent 2110. Once the interior extent 2160 is coupled to the exterior extent 2110, the female terminal assembly 2430 is retained within intermediate housing assembly 2100 due to the configuration of the ramped or sloped walls 2134a-2134d, 2170a-2170d.

The female shielding assembly, intermediate shielding assembly, or intermediate female shielding assembly 2200 is designed to shield or reduce the EMI noise that is associated within the connector system 100. The intermediate shielding assembly 2200 includes an intermediate shielding housing 2204 and a plurality of intermediate shielding FIG. 2206. The intermediate shielding housing 2204 is configured to be positioned between the outer plurality of side walls 2114a-2114d and the inner plurality of side walls 2116a-2116d. As such, the intermediate shielding housing 2204 surrounds a majority of the female terminal assembly 2430 and makes contact with the second extent of the shielding housing 1230 when the connector system 100 is in the fully connected or ready to use state. This configuration forms an electrical shield that extends from the bulk head 204 through the intermediate shielding housing 2204 to the exterior shielding housing 1200. This allows for EMI noise generated by the connector system 100 to be transferred into the side wall 204 of the battery pack 200.

The structure that connects the intermediate shielding housing 2204 to the bulk head or side wall 204 of the battery pack 200 are the plurality of intermediate shielding fingers 2206. Specifically, these fingers 2206 are integrally formed with the intermediate shielding housing 2204 and are designed to fit within shielding recesses 2180a-2180h formed within the exterior extent 2110 of the intermediate housing assembly 2100. The ends of the fingers 2206 are rolled to enable the FIG. 2206 remain in contact with the inner surface of the side wall 204. In other words, the FIG. 2206 flex and move with the connector system 100 to ensure that the shield 1200, 2200 remains connected to the battery pack 200 when the battery pack 200 moves.

The female terminal assembly 2430 includes a plurality of side walls 2434a-2434d that form a female receptacle 2472 that is designed to electrically and mechanically connect the external terminal assembly 1430 to the interior terminal assembly 3430. The cross-sectional shape of the female receptacle 2472 is substantially square shaped; however, it should be understood that the cross-sectional shape of the female receptacle 2472 may be altered to match the external shape of the terminal assemblies that it is mating with (e.g., circular, hex shape, etc.).

Each wall within the plurality of side walls 2434a-2434d has a feature formed therein to accept and retain the female IL assembly 2600. Specifically, a middle extent of the top wall 2434a has been removed, both side walls 2434b, 2424c each include cutouts 2440a, 2440b formed therein to receive a locking projection 2686 of the IL retainer 2680, and the opening formed therein to accept the locking member 2682 of the female IL retainer 2680. The combination of this removed extent, cutouts, and opening allow for the female terminal assembly 2430 to receive and retain the female IL assembly 2600.

Additional details about the female terminal assembly 2430 are generally discussed PCT Application Nos. PCT/US2020/13757, PCT/US2019/36127, PCT/US2019/36070, PCT/US2019/36010 and as such these details will not be repeated here. However, generally the female terminal assembly 2430 may be made for a conductive material (e.g., copper) and may be stamped, pressed, drawn, model, cast, printed, or a similar method of manufacturing may be utilized. Other geometries and configurations to position the IL receiver 2660 in the proper location are contemplated by this disclosure.

Like the MIL assembly 1600, the FIL assembly 2600 is comprised of multiple components and when used in a high voltage connector, it may be referred to as a high voltage female interlock or for short—female HVIL. The female IL assembly 2600 is primarily comprised of: (i) a female IL holder 2620, (ii) a female IL receiver 2660, and (iii) a female IL retainer 2680. The female IL holder 2620 is designed to place the female IL receiver 2660 in the proper position in order to receive the male IL jumper 1660. In order to accomplish this positional relationship, the female IL holder 2620 includes: (i) an arrangement of side walls 2622 that receive and retain the female IL receiver 2660 and (ii) a rear wall 2624. The rear wall 2644 has an irregular periphery that is designed to interact with the IL retainer 2680 and the plurality of side walls 2434a-2434d that form the female receptacle 2472. In particular, the rear wall 2624 includes a retainer cutout 2628 that is designed to receive a front projection 2684. Next, opposite of the retainer cutout 2628, the rear wall 2624 includes a bottom projection 2630 that is received by an opening formed within the bottom walls 2434c of the female receptacle 2472. Finally, the rear wall 2624 includes side projections 2632a, 2632b that are received by the cutouts 2440a, 2440b. This combination of retainer cutout 2628, bottom projection 2630, and side projections 2632a, 2632b helps ensure that the female IL holder 2620 remains in the proper location.

The female interlock (FIL) assembly 2600 positioned within the female terminal assembly 2430 that resides within the receptacle of the female housing to define a fully assembled female state $S_{FAF}$, whereby the FIL assembly is configured to be coupled to an interlock circuit 4010 that prevents electrical current from flowing through the female terminal assembly 2430 prior to connection of the female terminal assembly 2430 to a male terminal assembly 1430. The female IL retainer 2680 aids in retaining the female IL holder 2620 in the proper position. In particular, the female IL retainer 2680 includes: (i) the locking member 2682, (ii) the front projection 2684, and (iii) the side projections 2632a, 2632b. Generally, the female IL retainer 2680 fits within the plurality of side walls 2434a-2434d that form the female receptacle 2472 and fills the opening formed therein. As described above, the locking member 2682 fits female IL locking receivers 2117a, 2117c, the front projection 2684 fits within the retainer cutout 2628, and the side projections 2632a, 2632b that are received by the cutouts 2440a, 2440b. By placing structures that interact with the female IL retainer 2680 on all sides of the female receptacle 2472, the female IL retainer 2680 will not be altered by forces experienced by the female IL retainer 2680. However, in other configurations, the female IL retainer 2680 may only be supported on three sides or two sides.

Figure 42:
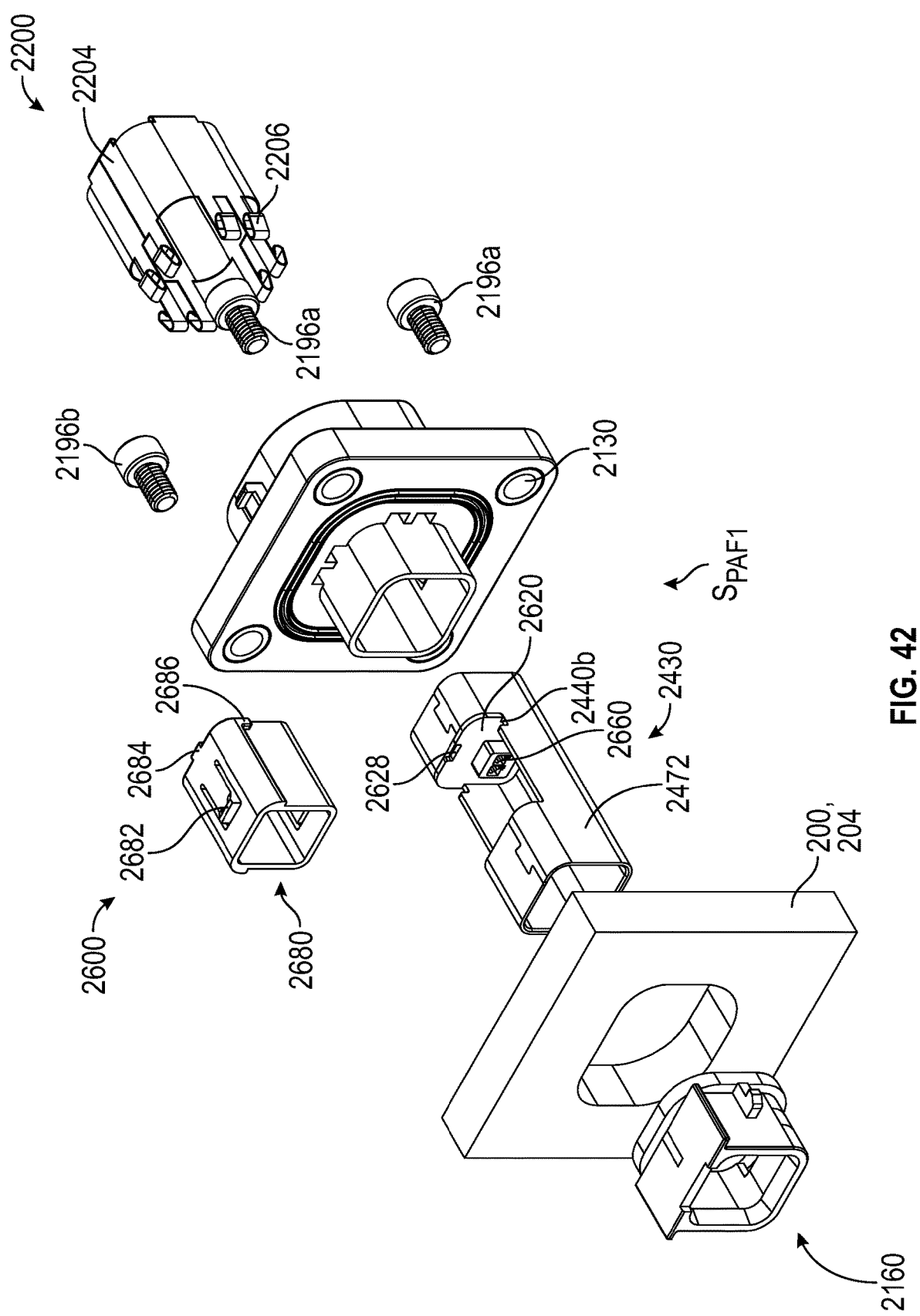
FIG. 42 is a perspective view of the intermediate female connector assembly of FIG. 38, wherein the intermediate female connector assembly is in a first partially assembled state ($S_{PA1}$)
Figure 43:
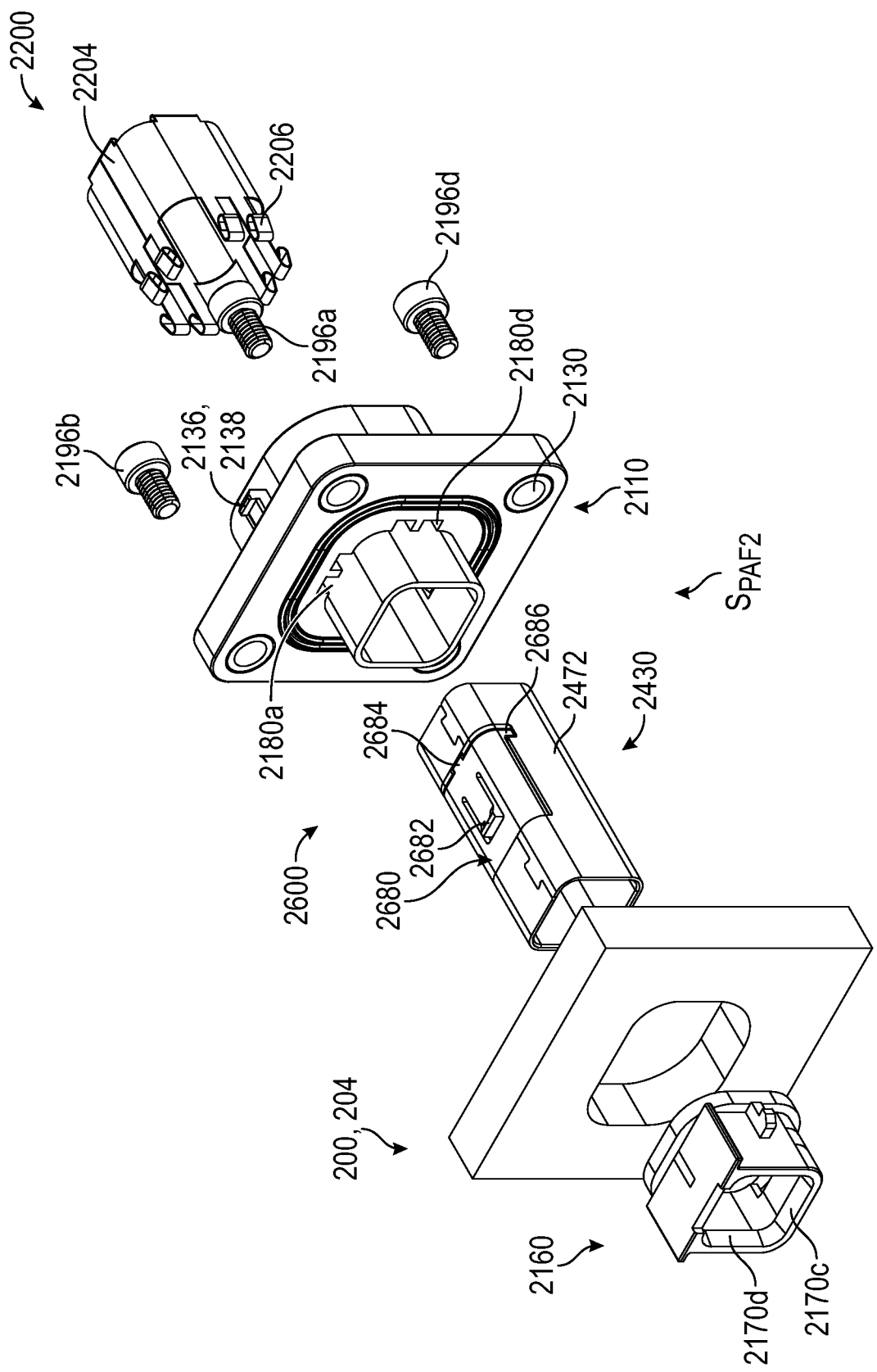
FIG. 43 is a perspective view of the intermediate female connector assembly of FIG. 38, wherein the intermediate female connector assembly is in a second partially assembled state ($S_{PA2}$)
Figure 44:
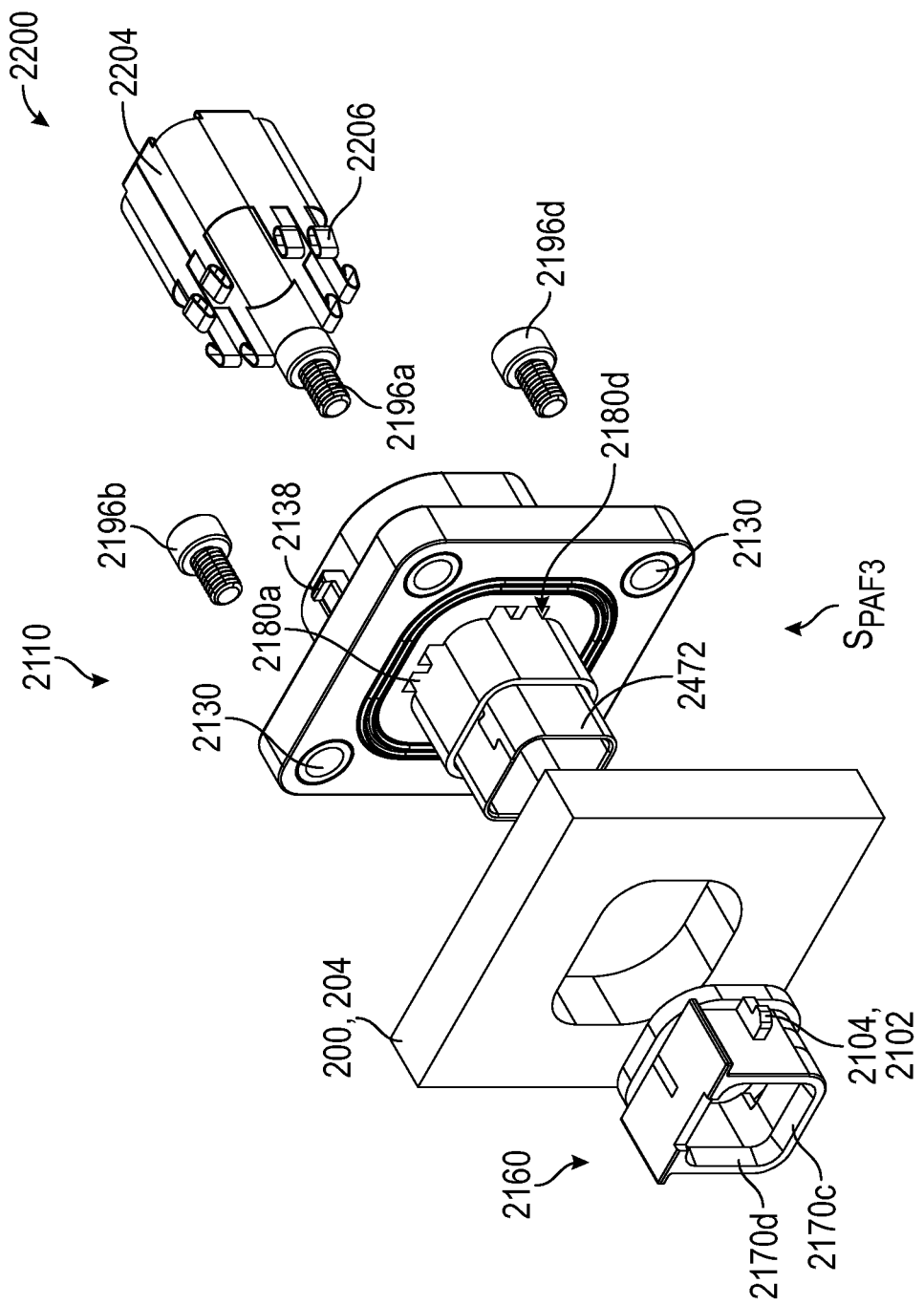
FIG. 44 is a perspective view of the intermediate female connector assembly of FIG. 38, wherein the intermediate female connector assembly is in a third partially assembled state ($S_{PA3}$)
Figure 45:
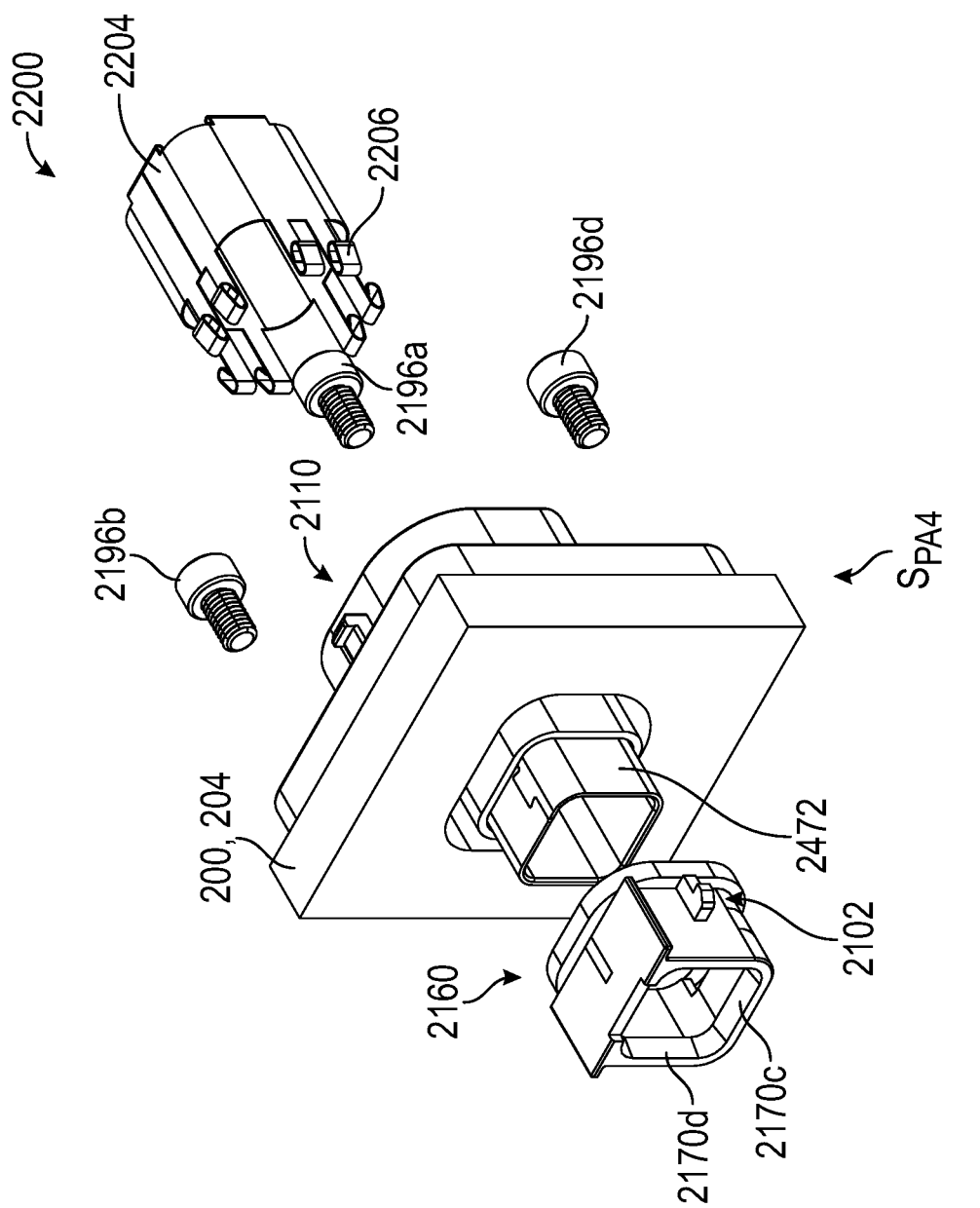
FIG. 45 is a perspective view of the intermediate female connector assembly of FIG. 38, wherein the intermediate female connector assembly is in a fourth partially assembled state ($S_{PA4}$)
Figure 63:
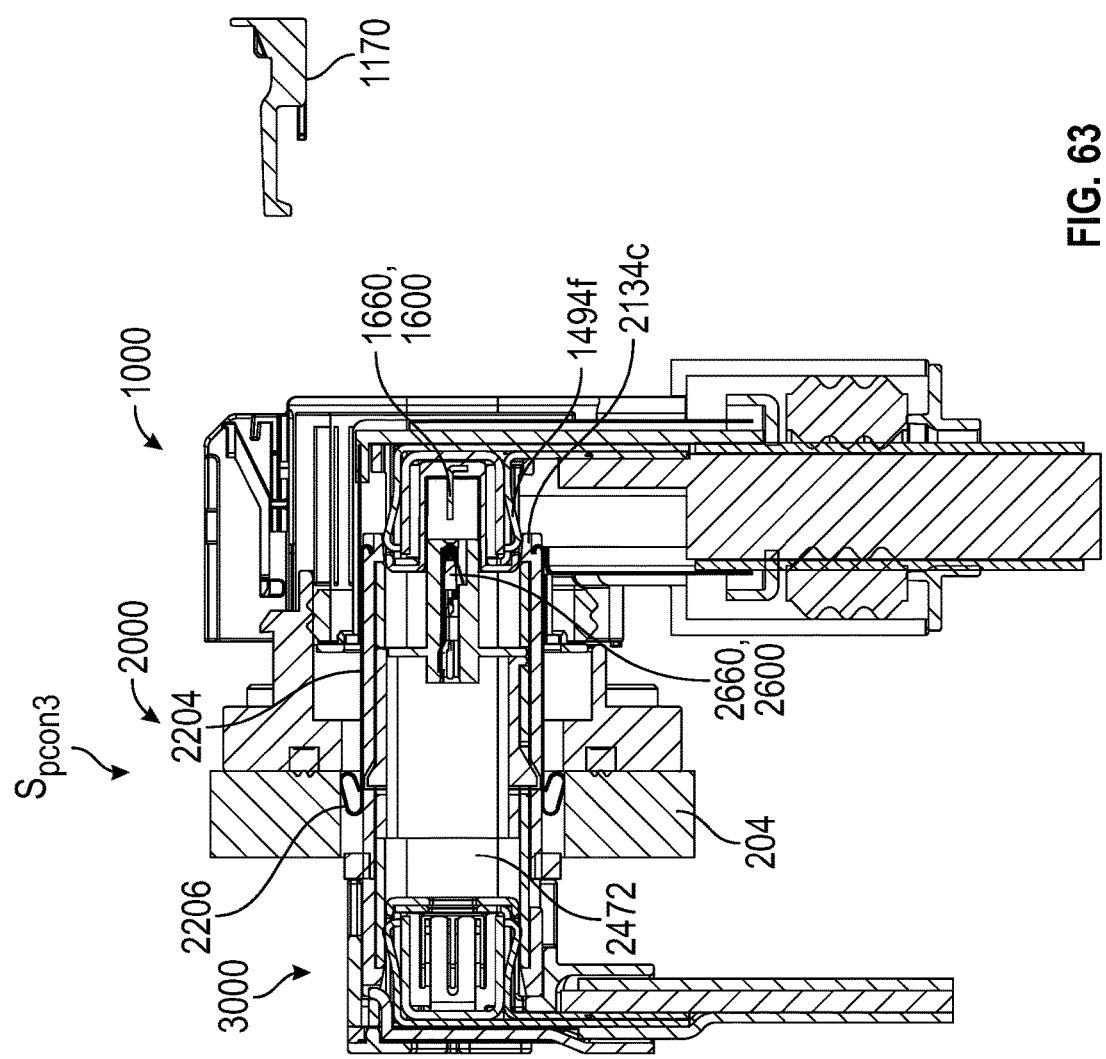
FIG. 63 is a cross-sectional view of the connector system taken along the 63-63 line of FIG. 62.
Figure 62:
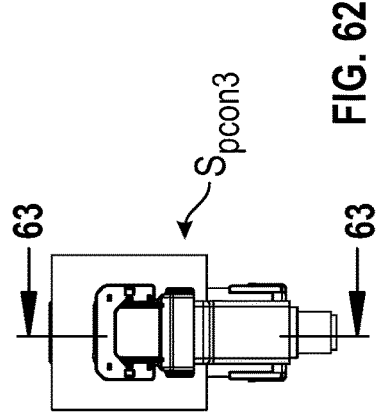
FIG. 62 is a rear view of the connector system in a third partially connected state ($S_{PCON3}$)
Figure 68:
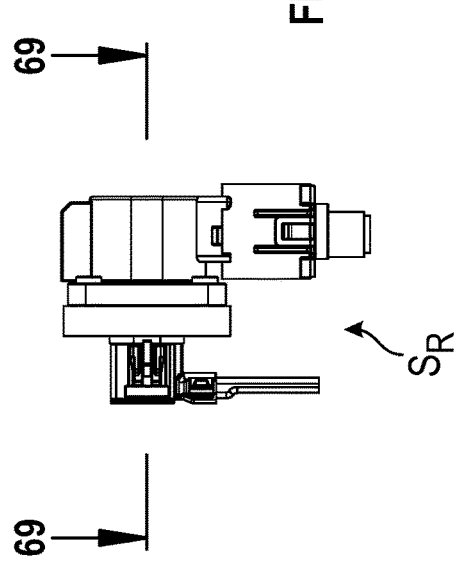
FIG. 68 is a side view of the connector system in a ready to use state ($S_R$)
Figure 69:
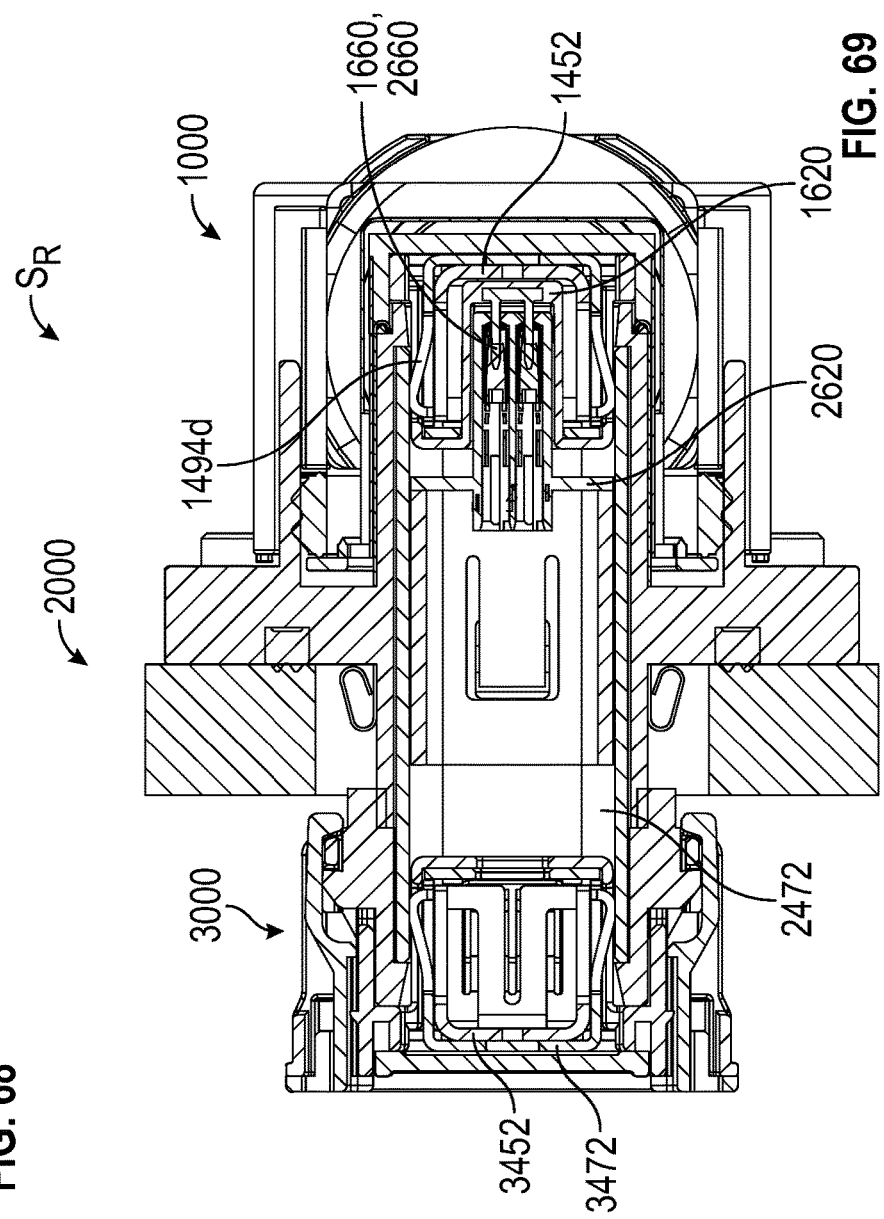
FIG. 69 is a cross-sectional view of the connector system taken along the 58-58 line of FIG. 68.
Figure 70:
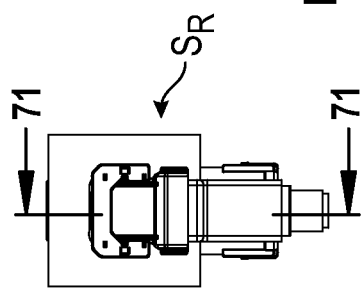
FIG. 70 is a rear view of the connector system in a ready to use state ($S_R$)
Figure 71:
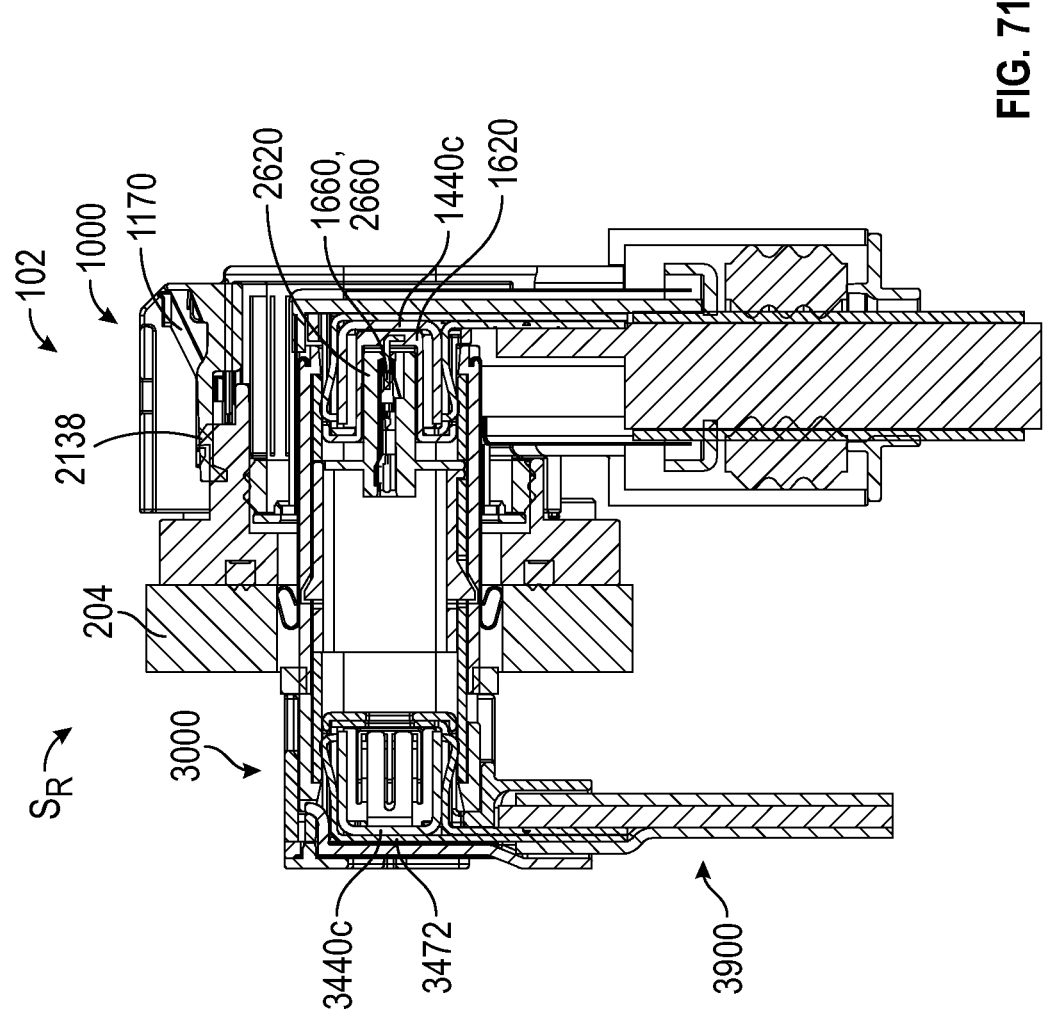
FIG. 71 is a cross-sectional view of the connector system taken along the 60-60 line of FIG. 70.
Figure 72:
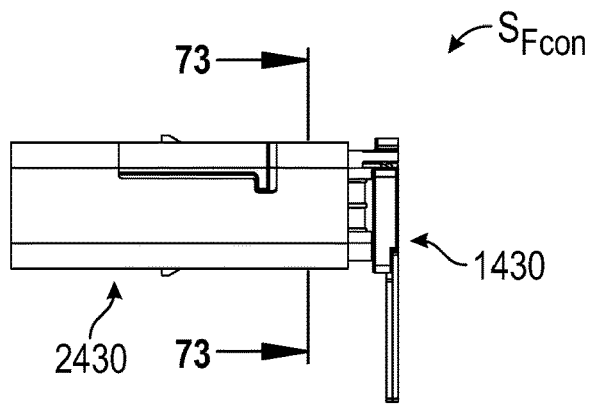
FIG. 72 is a side view of an extent of the intermediate female connector assembly and an extent of the exterior male connector assembly of the connector system of FIG. 1, wherein the assembly is in a fully connected state ($S_{FCON}$)

Assembling the intermediate female connector assembly 2000 occurs across multiple steps or stages. The first step in assembling intermediate female connector assembly 2000 is shown in FIG. 42, where the female IL receiver 2660 is inserted within the female IL holder 2620 and then the female IL holder is inserted within the female receptacle 2472 in order to form a first partially assembled state SPAT. Next, the second partially assembled state $S_{PA2}$, is formed by inserting the female IL retainer 2680 into the female receptacle 2472 (shown in FIG. 43). The female IL assembly 2600 and the female terminal assembly 2430 are inserted within the exterior extent 2110 of the intermediate housing assembly 2100 (shown in FIG. 44) to form the third partially assembled state $S_{PA3}$. Next, the combination of the intermediate housing assembly 2100, female IL assembly 2600 and the female terminal assembly 2430 are placed within the bulk head or side wall 204 of the battery pack 200 (shown in FIG. 45) to form the fourth partially assembled state $S_{PA4}$. Finally, to form the fully assembled state $S_{FA}$ (shown in FIG. 47) the elongated couplers 2196a-2196d are utilized to secure the housing assembly 2100 to the side wall 204, the interior extent 2160 of the intermediate housing assembly 2100 is coupled to the exterior extent 2110 of the intermediate housing assembly 2100, and the intermediate shielding assembly 2200 is inserted within an extent of the exterior extent 2110 of the intermediate housing assembly 2100 until the fingers 2206 make contact with the inner surface of the side wall 204.

In the fully assembled $S_{FA}$ (shown in FIG. 47), the nesting of the following elements is described below:

The female IL receiver 2660 is positioned within: (i) female IL holder 2620, (ii) female receptacle 2472, (iii) exterior extent of the intermediate housing 2110, (iv) intermediate shielding housing 2204. In other words, the female IL receiver 2660 is positioned within: (i) female terminal assembly 2430, (ii) intermediate housing 2100, and (iii) intermediate shielding assembly 2200;

The female IL holder 2620 is positioned within: (i) female receptacle 2472, (ii) exterior extent of the intermediate housing 2110, (iii) intermediate shielding housing 2204. In other words, the female IL holder 2620 is positioned within: (i) female terminal assembly 2430, (ii) intermediate housing 2100, and (iii) intermediate shielding assembly 2200;

The female receptacle 2472 is positioned within: (i) exterior extent of the intermediate housing 2110 and (ii) intermediate shielding housing 2204; and The exterior extent of the intermediate housing 2110 is positioned within the intermediate shielding housing 2204.

It should be understood that one or more of these structures may be omitted or its location may be changed such that that structure is omitted from the above nested list. For example, the intermediate shielding housing 2204 may be omitted from this assembly and thus will not be included within the above list.

As described above, the IL system 4000 also includes interlock circuitry 4010 that prevents electrical current from flowing to the intermediate connector 2000 prior to the engaged between the male terminal body 1472 with the female receptacle 2472. Examples of the circuitry that may be used are shown in FIG. 74 and the following U.S. Pat. Nos. 7,084,361, 7,508,097, 7,586,722, 8,466,586, 9,327, 601, 9,533,639 or 9,851,387, each of which is fully incorporated herein by reference. For example, the interlock circuitry 4010 may include: (i) components of a battery management system 4020, which include a sense module 4022 and a disconnect controller 4024, and (ii) a disconnect switch 4030. The sense module 4022 is coupled to the female IL receiver 2660 and detects when the circuit is closed by the insertion of the male IL jumper 1660. When the circuit is closed, the sense module 4022 sends a signal to the disconnect controller 4024 to close the disconnect switch 4030. When the disconnect switch 4030 is closed, electrical current can flow from the power supply 206 through the switch 4030 to the connector system 100.

Alternatively, when the male IL jumper 1660 is not inserted into the female IL receiver 2660, the sense module 4022 sends a signal to the disconnect controller 4024 to open the disconnect switch 4030. When the disconnect switch 4030 is open, electrical current cannot flow from the power supply 206 through the switch 4030 to the connector system 100. For sake of clarity, a chart showing the operation of these components is shown in FIG. 74B. This is design help prevent foreign objects from coming into contact with a connector assembly 1000, 2000, 3000 that is capable of discharging current to the foreign object.

FIGS. 48-71 show the system 100 can move from a decoupled state $S_{DCON}$ in FIGS. 48-51 to a ready to use state $S_R$ in FIGS. 68-71. The first steps in coupling the intermediate female connector assembly 2000 to the battery pack 200 wall 204 are assumed, as these are described above in connection with assembling the intermediate female connector assembly 2000. However, if these steps are not done before reaching this stage, then they should be completed prior to the steps described in connection with coupling the connectors 1000, 2000, 3000 to one another.

The first partially connected state $S_{PCON1}$ is shown in FIGS. 52-55. As shown in these figures, the contact arms 3494a-3494h of the interior male connector assembly 3000 are about to come into contact with the ramped or sloped surface 2170a-2170d of the intermediate female connector assembly 2000. This ramped or sloped surface 2170a-2170d gently and smoothly compresses the contact arms 3494a-3494h until they can easily slide into and make contact with the inner surface of the female receptacle 2472. This process is described in greater detail within PCT/US2019/36070 and is incorporated herein. Once the interior male connector assembly 3000 is fully connected to the intermediate female connector assembly 2000, the system 100 has moved from the first partially connected state $S_{PCON1}$ to the second partially connected state $S_{PCON2}$.

The second partially connected state $S_{PCON2}$ is shown in FIGS. 56-59. As shown in these figures, the contact arms 3494a-3494h are in contact with the inner surface of the female receptacle 2472 and form a 360 degree compliant connection. Compressing the contact arms 3494a-3494h to fit within the female receptacle 2472, causes the spring arms 3452a-3452h of the spring member 3440c to be compressed. This compression will create a biasing force that will help ensure that the contact arms 3494a-3494h in contact with the female receptacle 2472. This biasing force is described within PCT/US2019/36070 and PCT/US2019/36010, both of which are incorporated herein. Once the system 100 is in the second partially connected state $S_{PCN2}$, the interior male connector assembly 3000 is fully coupled to the intermediate female connector assembly 2000.

The third partially connected state $S_{PCON3}$ is shown in FIGS. 60-63. As shown in these figures, the contact arms 1494a-1494h of the exterior male connector assembly 1000 are about to come into contact with the ramped or sloped surface 2134a-2134d of the intermediate female connector assembly 2000. This ramped or sloped surface 2134a-2134d gently and smoothly compresses the contact arms 1494a-1494h until they can easily slide into and make contact with the inner surface of the female receptacle 2472. This process is described in greater detail within PCT/US2019/36070 and is incorporated herein. As shown in these images, the MIL 1600 is not electrically connected to FIL 2600 or in other words the male IL jumper 1660 has not been received by the female IL receiver 1660. This ensures that the female terminal assembly 2430 is not "hot" or no current is flowing from the interior male connector assembly 3000 to the intermediate female connector assembly 2000. Once the interior male connector assembly 1000 is fully connected to the intermediate female connector assembly 2000, the system 100 has moved from the first partially connected state $S_{PCONN3}$ to the second partially connected state $S_{FCON}$.

The fully connected state $S_{FCON}$ is shown in FIGS. 64-67. As shown in these figures, the contact arms 1494a-1494h are in contact with the inner surface of the female receptacle 2472 and form a 360 degree compliant connection. This 360 degree compliant connection is formed by cooperatively arranging and dimensioning the contact arms 1494a-1494h in a manner that positioned one contact arm 1494a-1494h against each side wall of the female terminal assembly 2430, and wherein the side walls of the female terminal assembly 2430 for a rectangular prism. Compressing the contact arms 1494a-1494h to fit within the female receptacle 2472, causes the spring arms 1452a-1452h of the spring member 1440c to be compressed. This compression will create a biasing force that will help ensure that the contact arms 1494a-1494h in contact with the female receptacle 2472. This biasing force is described within PCT/US2019/36070 and PCT/US2019/36010, which are incorporated herein. In addition to the contact arms 1494a-1494h being in contact with the inner surface of the female receptacle 2472, the male IL jumper 1660 is received by the female IL receiver 2660. By the female IL receiver 2660 receiving the male IL jumper 1660, the IL system 4000 is connected and the female terminal assembly 2430 will become "hot" or have current that is flowing from the interior male connector assembly 3000 to the intermediate female connector assembly 2000. In other words, in fully connected state $S_{FCON}$, the MIL 1600 is electrically connected to FIL 2600 and current is permitted to flow from the interior male connector assembly 3000 to the exterior male connector assembly 1000 through the intermediate female connector assembly 2000.

The ready to use state $S_R$ is shown in FIGS. 68-71. As shown in these figures, a force is applied to the CPA member 1170 that causes it to be positioned over the CPA coupler 2138. Once this occurs, the exterior male connector assembly 1000 is locked to the intermediate female connector assembly 2000. Finally, the installer can scan an extent of the CPA member 1170 that is visible through the opening within the housing, as described within U.S. Provisional Application No. 62/897,658.

In the fully connected state $S_{FCON}$ or the ready to use state $S_R$ (see FIGS. 65-73), the nesting of the MIL 1600 and its components are described below:

An extent of the IL jumper 1660 is positioned within: (i) female IL receiver 2660, (ii) female IL holder 2620, (iii) male IL holder 1620, (iv) spring member 1440c, (v) male terminal body 1472, (vi) female receptacle 2472, (vii) exterior extent of the intermediate housing 2110, (viii) intermediate shielding housing 2204, (ix) second extent of the exterior shielding housing 1230, and (x) exterior housing 1104. In other words, an extent of the IL jumper 1660 is positioned within: (i) FIL 2600, (ii) exterior male terminal assembly 1430, (iii) female terminal assembly 2430, (iv) intermediate housing 2100, (v) intermediate shielding assembly 2200, (vi) exterior shielding assembly 1200, and (vii) the exterior housing assembly 1100. Also, an extent of the IL jumper 1660 is positioned within the intermediate female connector assembly 2000; and An extent of the male IL holder 1620 is positioned outside of the (i) female IL receiver 2660 and (ii) female IL holder 2620. An extent of the male IL holder 1620 is positioned within: (i) spring member 1440c, (ii) male terminal body 1472, (iii) female receptacle 2472, (iv) exterior extent of the intermediate housing 2110, (v) intermediate shielding housing 2204, (vi) second extent of the exterior shielding housing 1230, and (vii) exterior housing 1104. In other words, extent of the male IL holder 1620 is positioned outside of the FIL 2600. An extent of the male IL holder 1620 is positioned within: (i) exterior male terminal assembly 1430, (ii) female terminal assembly 2430, (iii) intermediate housing 2100, (iv) intermediate shielding assembly 2200, (v) exterior shielding assembly 1200, and (vi) the exterior housing assembly 1100. Also, extent of the male IL holder 1620 is positioned within the intermediate female connector assembly 2000.

In the fully connected state $S_{FCON}$ or the ready to use state $S_R$ (see FIGS. 65-73), the nesting of the FIL 2600 and its components are described below:

An extent of the female IL receiver 2660 is positioned outside of the IL jumper 1660. An extent of the female IL receiver 2660 is positioned within: (i) female IL holder 2620, (ii) male IL holder 1620, (iii) spring member 1440c, (iv) male terminal body 1472, (v) female receptacle 2472, (vi) exterior extent of the intermediate housing 2110, (vii) intermediate shielding housing 2204, (viii) second extent of the exterior shielding housing 1230, and (ix) exterior housing 1104. In other words, an extent of the female IL receiver 2660 is positioned within: (i) MIL 1600, (ii) exterior male terminal assembly 1430, (iii) female terminal assembly 2430, (iv) intermediate housing 2100, (v) intermediate shielding assembly 2200, (vi) exterior shielding assembly 1200, and (vii) the exterior housing assembly 1100. Also, an extent of the female IL receiver 2660 is positioned within the exterior male connector assembly 1000; and An extent of the female IL holder 2620 is positioned outside of the IL jumper 1660 and female IL receiver 2660. An extent of the female IL holder 2620 is positioned within: (i) male IL holder 1620, (ii) spring member 1440c, (iii) male terminal body 1472, (iv) female receptacle 2472, (v) exterior extent of the intermediate housing 2110, (vi) intermediate shielding housing 2204, (vii) second extent of the exterior shielding housing 1230, and (viii) exterior housing 1104. In other words, an extent of the female IL holder 2620 is positioned within: (i) MIL 1600, (ii) exterior male terminal assembly 1430, (iii) female terminal assembly 2430, (iv) intermediate housing 2100, (v) intermediate shielding assembly 2200, (vi) exterior shielding assembly 1200, and (vii) the exterior housing assembly 1100. Also, an extent of the female IL receiver 2660 is positioned within the exterior male connector assembly 1000.

It should be understood that one or more of these structures may be omitted or its location may be changed such that that structure is omitted from the above nested list. For example, the intermediate shielding housing 2204 and second extent of the shielding housing 1230 may be omitted from this assembly and thus will not be included within the above list.

Second Embodiment

As shown in FIGS. 88-109, the second embodiment of the connector system 5100 includes multiple components that are designed to electrically and mechanically connect one device or component to another device or component within a power distribution environment. The second embodiment of the connector system 5100 is primarily composed of: (i) a male connector assembly 6000 and (ii) a female connector assembly 7000. The male connector assembly 6000 includes: (i) housing assembly 6100, (ii) a shielding assembly 6200, (iii) a male terminal assembly 6430, which includes a male terminal 6470 and a spring member 6440*d*, (iv) a male interlock assembly 6600, (v) a strain relief assembly 6800, and (vi) a wire 6495. The female connector assembly 7000 includes: (i) housing assembly 7100, (ii) a shielding assembly 7200, (iii) a female terminal assembly 7430, which includes a female receptacle 7472, and (iv) a female interlock assembly 7600. It should be understood that reference numbers that are shown in the figures may be omitted from the specification for sake of brevity as like structures have like numbers. For example, the disclosure in connection with spring member 1440*c* is not repeated herein, but it applies to spring member 6440*d*, as if it were repeated herein. In other words, omitting reference numbers from the specification or specific disclosure of the functionality of that structure should not limit the disclosure of this application. Instead, one shall refer to the disclosure of similar structures that may be discussed within another section of this application or other applications that are incorporated herein by reference.

The IL system 8000 of this second embodiment of the connector system 5100 functions in the same manner as the IL system 4000 disclosed above in connection with the first embodiment of the connector system 100. In particular, electrical current will not be applied to the female connector assembly 7000, when the system 5100 is in the partially connected state that is shown in FIGS. 102-105 because the MIL 6600 is not coupled to the FIL 7600. In contrast, electrical current will be applied to the female connector assembly 7000, when the system 5100 is in the fully connected state that is shown in FIGS. 106-109 because the MIL 6600 is coupled to the FIL 7600. Additional details about the circuitry, operation, functioning, and installation environment of the IL system 8000 are disclosed above in connection with IL system 4000 and apply to IL system 8000. As such, these additional details will not be repeated herein.

The primary differences between the first embodiment of the system 100 and the second embodiment of the system 5100 include: (i) inclusion of two male terminal assemblies 6430 and two female terminal assemblies 7430 within the a housing 6100, 7100, (ii) positioning of the MIL and FIL 1600, 2600 from inside the terminals 1430, 2430 to outside the terminals 6430, 7430, and (iii) a different configuration of the male terminal body 6472 and the spring member 6440*d*. First, the inclusion of two terminals 6430, 7430 within a housing 6100, 7100 allows for the designer to increase the current carry capabilities of the connector system 5100. However, in doing so, the design must account for current creep and as such must place the terminals 6430, 7430 a proper distance from one another. Second, unlike the first embodiment of the system 100, this second embodiment of the system 5100 positions the MIL and FIL 1600, 2600 to outside the terminals 6430, 7430. This alternative placement is typically a drawback because it increases the size of the connector system 100, 5100; however, when multiple terminals are utilized there is ample space to place the MIL and FIL 6600, 7600 to outside the terminals 6430, 7430 without increasing the size of the package due to the structural and positional relationship of the terminals 1430, 3430, 6430. Nevertheless, it should be understood that the MIL and FIL 6600, 7600 may be positioned inside of the terminals, as discussed above.

Third, the configuration of the male terminal body 6472 differs from prior versions, wherein said differences include: (i) the "U-shaped" side walls disclosed within at least PCT/US2019/036010 and PCT/US2020/049870 are omitted, (ii) the contact arm openings 6496*a*-6496*h* have varying widths, wherein the width of the opening is larger adjacent to where the contact arms 6494*a*-6494*h* are coupled to the side wall 6492*a*-6492*d* in comparison to the opening that is adjacent free end 1488, (iii) the width of the contact arms 6494*a*-6494*h* are not uniform across the entire arm and instead are narrower adjacent to where the contact arms 6494*a*-6494*h* are coupled to the side wall 6492*a*-6492*d* in comparison to the opening that is adjacent free end 1488, and (iv) width of the contact arms 6494*a*-6494*h* does not match the width of the spring arms 6452*a*-6452*h*. Finally, the configuration of the spring member 6440*d* differs from prior versions, wherein said differences include a centering means 6453 that is extends from a select number of spring arms 6452*a*-6452*d*. In the depicted embodiment, the centering means 6453 is a "J-shaped" projection 6456*a*-6456*d* that extends from a lower extent of the spring arms 6452*a*-6452*d* and is designed to wrap around the outer surfaces of the contact arms 6494*a*-6494*h*, when the spring member 6440*d* is positioned within the spring receiver 6486. While the above paragraphs described some of the differences between the terminal assemblies 6430 and connector system 5100 of this second embodiment in comparison to the terminal assemblies 1430, 3430 and connector system 100 of the first embodiment, it should be understood that other differences can be found and understood by one of skill in the art upon a comparison of the figures contained within this application.

The system 100, 5100 is a T4/V4/S3/D2/M2, wherein the system 100, 5100 meets and exceeds: (i) T4 is exposure of the system 100 to 150° C., (ii) V4 is severe vibration, (iii) Si is sealed high-pressure spray, (iv) D2 is 200 k mile durability, and (v) M2 is less than 45 Newtons of force is required to connect the male terminal assembly 1430, 3430, 6430 to the female terminal assembly 800. In addition to being T4/V4/S3/D2/M2 compliant, the system 100, 5100 is push, click, tug, scan (PCTS) compliant, wherein additional information about this standard is disclosed within PCT/US2020/049870.

It should be understood that the male terminal assemblies 1430, 3430, 6430 and the female terminal assemblies 2430, 7430 disclosed within this application may be replaced with the male terminal assemblies and the female terminal assemblies disclosed within PCT/US2018/019787 or PCT/US2019/036010. In addition, the de-rating of some of these connectors include ratings to carry at 55° C. rise over ambient (RoA) or 80° C. with a derating of 80%: (i) 245 amps with a 50 $mm^2$ wire, 280 amps with a 75 $mm^2$ wire, 330 amps with a 100 $mm^2$ wire, (ii) 335 amps with a 100 $mm^2$ wire, 365 amps with a 150 $mm^2$ wire, 395 amps with a 200 $mm^2$ wire, (iii) 190 amps with a 16 $mm^2$ wire, 220 amps with a 25 $mm^2$ wire, 236 amps with a 35 $mm^2$ wire, 245 amps with a 50 $mm^2$ wire, (iv) 365 amps with a 100 $mm^2$ wire, (v) FIG. 114 can carry 185 amps with a 16 $mm^2$ wire, (vi) 88 amps with a 16 $mm^2$ wire, and (vii) carry 225 amps with a 25 $mm^2$ wire. Additionally, other performance specifications of the system 100, 5100 disclosed herein will be obvious to one of skill in the art.

The spring members shown in FIGS. 5-10 contained within PCT/US2019/36010 may be altered to contain the spring member that includes a centering means 1453. Further, it should be understood that alternative configurations for connector assemblies 1000, 2000, 3000, 6000, 7000 are possible. For example, any number of male terminal assemblies 1430, 3430, 6430 may be positioned within a housing 1100, 3100 (as shown in 6100). Below are a few examples of configurations that are possible:

- The interior male connector housing 3100 may be configured to contain multiple (e.g., between 2-30, preferably between 2-8, and most preferably between 2-4) male terminal assemblies 1430, 3430, 6430. The intermediate female connector assembly 2000 may be reconfigured to accept these multiple male terminal assemblies 1430, 3430, 6430 and connect them to a single male terminal assembly that is contained within the exterior male connector assembly 1000;
- The exterior male connector housing 1100 may be configured to contain multiple (e.g., between 2-30, preferably between 2-8, and most preferably between 2-4) male terminal assemblies 1430, 3430, 6430. The intermediate female connector assembly 2000 may be reconfigured to accept these multiple male terminal assemblies 1430, 3430, 6430 and connect them to a single male terminal assembly that is contained within the interior male connector assembly 3000; and
- Both the interior and exterior male connector housing 1100, 3100 may be configured to contain multiple (e.g., between 2-30, preferably between 2-8, and most preferably between 2-4) male terminal assemblies 1430, 3430, 6430 that are shown in any of the figures contained herein. The intermediate female connector assembly 2000 may be reconfigured to accept these multiple male terminal assemblies 1430, 3430, 6430 from the interior male connector assembly 3000 and connect them to multiple male terminal assembly 1430, 3430, 6430 that are contained within the exterior male connector assembly 1000.

Additionally, alternative configurations for connector systems 100, 5100 are possible. For example, the female connector assembly 2000, 7000 may be reconfigured to accept these multiple male terminal assemblies 1430, 3430, 6430 into a single female terminal assembly 2430, 7430.

It should be understood that if multiple male terminal assembly 1430, 3430, 6430 are utilized then multiple IL systems 4000, 9000 may be utilized. For example, if electrical current is supplied by two different power sources, wherein each male terminal assembly 1430, 3430, 6430 is connected to a separate and distinct power source, then each assembly 1430, 3430, 6430 may have its own IL systems 4000, 9000. This is desirable because each IL system 4000, 9000 can control the supply of electrical current its associated assembly 1430, 3430, 6430; thus providing desired selectivity. However, it should be understood that just because two different male terminal assemblies 1430, 3430, 6430 are included within a single connector 1000, 3000, 6000, the connector 1000, 3000, 6000 does not need to include multiple IL systems 4000, 9000.

It should be understood that the intermediate female connector assembly 2000 may be replaced with an alternative housing and an alternative female terminal assembly, wherein the alternative housing and alternative female terminal assembly have structural designs that are similar to a portion of the housing and one of the terminal assemblies disclosed in connection with the second embodiment of the system 5100. It should also be understood that the male terminal assemblies may have any number of contact arms 1494, 3494, 6494 (e.g., between 2-100, preferably between 2-50, and most preferably between 2-8) and any number of spring arms 1452, 3452, 6452 (e.g., between 2-100, preferably between 2-50, and most preferably between 2-8). As discussed above, the number of contact arms 1494, 3494, 6494 may not equal the number of spring arms. For example, there may be more contact arms 1494, 3494, 6494 then spring arms 1452, 3452, 6452. Alternatively, there may be less contact arms 1494, 3494, 6494 then spring arms 1452, 3452, 6452.

MATERIALS AND DISCLOSURE THAT ARE INCORPORATED BY REFERENCE

PCT Application Nos. PCT/US2021/033446, PCT/US2020/050018, PCT/US2020/049870, PCT/US2020/014484, PCT/US2020/013757, PCT/US2019/036127, PCT/US2019/036070, PCT/US2019/036010, and PCT/US2018/019787, U.S. patent application Ser. No. 16/194,891 and U.S. Provisional Applications 62/681,973, 62/792,881, 62/795,015, 62/897,658 62/897,962, 62/988,972, 63/051,639, 63/058,061, 63/068,622, 63/109,135, 63/159,689, 63/222,859, each of which is fully incorporated herein by reference and made a part hereof.

SAE Specifications, including: J1742_201003 entitled, "Connections for High Voltage On-Board Vehicle Electrical Wiring Harnesses—Test Methods and General Performance Requirements," last revised in March 2010, each of which is fully incorporated herein by reference and made a part hereof.

ASTM Specifications, including: (i) D4935—18, entitled "Standard Test Method for Measuring the Electromagnetic Shielding Effectiveness of Planar Materials," and (ii) ASTM D257, entitled "Standard Test Methods for DC Resistance or Conductance of Insulating Materials," each of which are fully incorporated herein by reference and made a part hereof.

American National Standards Institute and/or EOS/ESD Association, Inc Specifications, including: ANSI/ESD STM11.11 Surface Resistance Measurements of Static Dissipative Planar Materials, each of which is fully incorporated herein by reference and made a part hereof.

DIN Specification, including Connectors for electronic equipment—Tests and measurements—Part 5-2: Current-carrying capacity tests; Test 5b: Current-temperature derating (IEC 60512-5-2:2002), each of which are fully incorporated herein by reference and made a part hereof.

USCAR Specifications, including: (i) SAE/USCAR-2, Revision 6, which was last revised in February 2013 and has ISBN: 978-0-7680-7998-2, (ii) SAE/USCAR-12, Revision 5, which was last revised in August 2017 and has ISBN: 978-0-7680-8446-7, (iii) SAE/USCAR-21, Revision 3, which was last revised in December 2014, (iv) SAE/USCAR-25, Revision 3, which was revised on March 2016 and has ISBN: 978-0-7680-8319-4, (v) SAE/USCAR-37, which was revised on August 2008 and has ISBN: 978-0-7680-2098-4, (vi) SAE/USCAR-38, Revision 1, which was revised on May 2016 and has ISBN: 978-0-7680-8350-7, each of which are fully incorporated herein by reference and made a part hereof.

Other standards, including Federal Test Standard 101C and 4046, each of which is fully incorporated herein by reference and made a part hereof.

INDUSTRIAL APPLICABILITY

While some implementations have been illustrated and described, numerous modifications come to mind without significantly departing from the spirit of the disclosure; and the scope of protection is only limited by the scope of the accompanying claims. For example, the overall shape of the of the components described above may be changed to: a triangular prism, a pentagonal prism, a hexagonal prism, octagonal prism, sphere, a cone, a tetrahedron, a cuboid, a dodecahedron, an icosahedron, an octahedron, a ellipsoid, or any other similar shape.

It should be understood that the following terms used herein shall generally mean the following:
  a. "High power" shall mean (i) voltage between 20 volts to 600 volts regardless of current or (ii) at any current greater than or equal to 80 amps regardless of voltage.
  b. "High current" shall mean current greater than or equal to 80 amps regardless of voltage.
  c. "High voltage" shall mean a voltage between 20 volts to 600 volts regardless of current.

Headings and subheadings, if any, are used for convenience only and are not limiting. The word exemplary is used to mean serving as an example or illustration. To the extent that the term includes, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

Numerous modifications to the present disclosure will be apparent to those skilled in the art in view of the foregoing description. Preferred embodiments of this disclosure are described herein, including the best mode known to the inventors for carrying out the disclosure. It should be understood that the illustrated embodiments are exemplary only, and should not be taken as limiting the scope of the disclosure.

The invention claimed is:

1. A connector system for use in a power distribution system of a motor vehicle, the connector system comprising:
   a male terminal assembly having:
      a conductive male terminal body including at least one integrally formed contact arm a spring receiver;
      an internal spring member including:
         (i) at least one spring arm having an elongated main body portion with a free end;
         (ii) a projection that extends laterally from the free end of the main body portion of the at least one spring arm; and
      wherein the internal spring member resides within the spring receiver to define a fully coupled state $S_{FC}$ whereby the projection resides adjacent an inner surface of the spring receiver; and
      a male interlock (MM) assembly having an extent positioned within the internal spring member to define a fully assembled male state $S_{FAM}$.

2. The connector system of claim 1, further comprising a female connector assembly including:
   (i) a female terminal assembly with a receptacle; and
   (ii) a female interlock (FIL) assembly positioned within the female terminal assembly to define a fully assembled female state $S_{FAF}$.

3. The connector system according to claim 2, further comprising a female housing, and wherein the female terminal assembly and the FIL assembly are secured within said female housing using a female FIL retainer.

4. The connector system of claim 2, wherein the receptacle of the female terminal assembly is dimensioned to receive a portion of both of the male terminal assembly and the MIL to define a fully connected state $S_{FCON}$.

5. The connector system according to claim 4, wherein the connector system is T4/V4/S3/D2/M2 compliant in the fully connected state $S_{FCON}$.

6. The connector system of claim 4, when the connector system is subjected to certain operating conditions in the fully connected state $S_{FCON}$, the internal spring member applies an outwardly directed force on a free end of the at least one contact arm to retain the male terminal assembly within the female terminal assembly.

7. The connector system of claim 1, wherein when the male terminal body is in the fully coupled state $S_{FC}$: (i) the at least one contact arm has a free-end that abuts an outer surface of the at least one spring arm, and (ii) a gap is formed between an extent of the outer surface of the at least one spring arm and an inner surface of the at least one contact arm.

8. The connector system according to claim 1, wherein the MIL assembly includes a jumper that resides within the internal spring member of the male terminal assembly in the fully assembled male state $S_{FAM}$.

9. The connector system according to claim 1, wherein the male terminal assembly is partially surrounded by a shielding assembly adapted to reduce electromagnetic interference noise emitted by said male terminal assembly during use of the connector system.

10. The connector system according to claim 1, further comprising a male housing that is configured to at least partially surround the male terminal assembly, wherein the male housing includes a CPA receiver that is designed to receive an extent of a CPA member.

11. A connector system for use in a power distribution system of a motor vehicle, the connector system comprising:
   a male connector assembly including:
      (i) a male terminal assembly;
      (ii) a male interlock (MIL) assembly positioned within the male terminal assembly to define a fully assembled male state $S_{FAM}$;
   a female connector assembly including:
      (i) a female terminal assembly with a receptacle;
      (ii) a female interlock (FIL) assembly positioned within the female terminal assembly to define a fully assembled female state $S_{FAF}$; and
      wherein the receptacle of the female terminal assembly is dimensioned to receive a portion of both of the male terminal assembly and the MTh to define a fully connected state $S_{FCON}$; and
      wherein an extent of the MIL assembly is configured to be positioned within the FIL assembly in the fully connected state $S_{FCON}$.

12. The connector system of claim 11, wherein the male terminal assembly includes an internal spring member that resides within a spring receiver of a male terminal body of the male terminal assembly.

13. The connector system of claim 12, wherein the internal spring member includes:
   (i) at least one spring arm having an elongated main body portion with a free end;
   (ii) a projection that extends laterally from the free end of the main body portion; and
   wherein the internal spring member resides within the spring receiver of the male terminal body to define a fully coupled state $S_{FC}$ whereby the projection resides adjacent an inner surface of the male terminal body to facilitate alignment of the internal spring member with the male terminal body.

14. The connector system according to claim 12, wherein the MIL assembly includes a jumper that resides within the internal spring member of the male terminal assembly in the fully assembled male state $S_{FAM}$.

15. The connector system of claim 14, wherein the MIL assembly further includes a holder that secures the jumper within the internal spring member and the male terminal assembly in the fully assembled male state $S_{FAM}$.

16. The connector system according to claim 11, wherein: (i) a first extent of the MTh assembly is positioned within male terminal body of the male terminal assembly and (ii) a second extent of the MIL is positioned outside of the male terminal body.

17. The connector system according to claim 11, wherein the FIL assembly includes a receiver with at least one electrical lead for connection to an interlock circuit contained within an electrical component in the power distribution system.

18. The connector system of claim 17, wherein the receiver of the FIL assembly resides within a holder that is located within the female terminal assembly in the fully assembled female state $S_{FAF}$.

19. The connector system according to claim 11, wherein the connector system in not in the fully connected state $S_{FCON}$, an interlock circuit coupled to the FIL assembly prevents electrical current from flowing through the female terminal assembly.

20. The connector system according to claim 11, wherein electrical current is configured to flow through the female terminal assembly to the male terminal assembly in the fully connected state $S_{FCON}$.

21. The connector system according to claim 11, wherein the connector system is PCTS compliant.

22. The connector system according to claim 11, wherein the connector system is T4/V4/S3/D2/M2 compliant.

23. A connector system for use in a power distribution system of a motor vehicle, the connector system comprising:
   a first male terminal assembly having:
      (i) a first male terminal body formed from a first material and having a contact arm and a spring receiver, and
      (ii) a first internal spring member formed from a second material and having a spring arm, and wherein the first internal spring member is dimensioned to reside within the spring receiver of the first male terminal body;
   a second male terminal assembly having:
      (i) a second male terminal body formed from the first material and having a contact arm and a spring receiver, and
      (ii) a second internal spring member formed from the second material and having a spring arm, and wherein the second internal spring member is dimensioned to reside within the spring receiver of the second male terminal body;
   a housing configured to surround an extent of both of the first male terminal assembly and the second male terminal assembly; and
   a male interlock (MIL) assembly positioned within the housing and between the first male terminal assembly and the second male terminal assembly.

24. The connector system of claim 23, further comprising a female connector assembly including:
   (i) a first female terminal assembly with a first receptacle;
   (ii) a second female terminal assembly with a second receptacle; and
   (iii) a female housing configured to surround a portion of both of the first female terminal assembly and the second female terminal assembly.

25. The connector system of claim 24, wherein the female connector assembly includes at least one sloped wall configured to compress an extent of the first male terminal assembly, when the first male terminal assembly is inserted into the first female terminal assembly.

26. The connector system of claim 24, further comprising a female interlock (FIL) assembly positioned within the female housing and between the first female terminal assembly and the second female terminal assembly.

27. The connector system of claim 26, wherein the FIL assembly includes a receiver with at least one electrical lead for connection to an interlock circuit contained within an electrical component in the power distribution system.

28. The connector system of claim 26, wherein a fully connected state Spoor is defined when: (i) the first receptacle of the first female terminal assembly is dimensioned to receive a portion of the first male terminal assembly, (ii) the second receptacle of the second female terminal assembly is dimensioned to receive a portion of the second male terminal assembly, and (iii) the FIL assembly receives a portion of the MIL.

29. The connector system of claim 28, when the connector system is subjected to certain operating conditions, the first internal spring member applies an outwardly directed force on an extent of the first male terminal body to retain the first male terminal assembly within the first female terminal assembly in the fully connected state $S_{FCON}$.

30. The connector system of claim 29, wherein the contact arm of the first male terminal body has a free-end placed in contact with the spring arm, and wherein a portion of the outwardly directed force exerted by the spring arm is applied to said free-end of the contact arm.

31. The connector system of claim 23, wherein the spring arm of the first internal spring member includes a centering means for aligning the first internal spring member within the first male terminal body.

32. The connector system of claim 31, wherein the spring arm has an elongated main body portion and the centering means includes a projection that extends laterally from a free end of the main body portion, and wherein the projection is configured to reside adjacent an inner surface of the first male terminal body.

33. The connector system according to claim 23, wherein the connector system is PCTS compliant.

34. The connector system according to claim 23, wherein the connector system is T4/V4/S3/D2/M2 compliant.

* * * * *